(12) United States Patent
Roth et al.

(10) Patent No.: US 12,432,054 B2
(45) Date of Patent: Sep. 30, 2025

(54) FEDERATED KEY MANAGEMENT

(71) Applicant: Amazon Technologies, Inc., Seattle, WA (US)

(72) Inventors: Gregory Branchek Roth, Seattle, WA (US); Matthew James Wren, Seattle, WA (US); Eric Jason Brandwine, Haymarket, VA (US); Brian Irl Pratt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 130 days.

(21) Appl. No.: 18/196,750

(22) Filed: May 12, 2023

(65) Prior Publication Data

US 2023/0291556 A1     Sep. 14, 2023

Related U.S. Application Data

(60) Continuation of application No. 16/869,423, filed on May 7, 2020, now Pat. No. 11,695,555, which is a
(Continued)

(51) Int. Cl.
| | |
|---|---|
| *H04L 9/08* | (2006.01) |
| *H04L 9/14* | (2006.01) |
| *H04L 9/32* | (2006.01) |

(52) U.S. Cl.
CPC ............ *H04L 9/088* (2013.01); *H04L 9/0891* (2013.01); *H04L 9/14* (2013.01); *H04L 9/321* (2013.01); *H04L 9/3247* (2013.01)

(58) Field of Classification Search
CPC ......... H04L 9/088; H04L 9/0891; H04L 9/14; H04L 9/321; H04L 9/3247
See application file for complete search history.

(56) References Cited

U.S. PATENT DOCUMENTS

| | | | |
|---|---|---|---|
| 4,782,517 A | 11/1988 | Bernardis et al. | |
| 4,868,877 A | 9/1989 | Fischer | |

(Continued)

FOREIGN PATENT DOCUMENTS

| | | |
|---|---|---|
| CA | 2898995 A1 | 8/2014 |
| CN | 1647442 A | 7/2005 |

(Continued)

OTHER PUBLICATIONS

Japanese Revocation of Reconsideration for Patent Application No. 2017-232031 dated Sep. 29, 2020, 5 pages.

(Continued)

*Primary Examiner* — Chau Le
(74) *Attorney, Agent, or Firm* — Davis Wright Tremaine LLP

(57) ABSTRACT

A system uses information submitted in connection with a request to determine if and how to process the request. The information may be electronically signed by a requestor using a key such that the system processing the request can verify that the requestor has the key and that the information is authentic. The information may include information that identifies a holder of a key needed for processing the request, where the holder of the key can be the system or another, possibly third party, system. Requests to decrypt data may be processed to ensure that a certain amount of time passes before access to the decrypted data is provided, thereby providing an opportunity to cancel such requests and/or otherwise mitigate potential security breaches.

20 Claims, 34 Drawing Sheets

| KeyID | Key Version | Usability | Counter |
|---|---|---|---|
| ⋮ | ⋮ | ⋮ | ⋮ |
| 31415926 | 1 | Retired | 4294967296 |
| 31415926 | 2 | Retired | 4294967296 |
| 31415926 | 3 | Retired | 4294967296 |
| 31415926 | 4 | Active | 1048576 |
| 31415927 | 1 | Active | 2097152 |
| ⋮ | ⋮ | ⋮ | ⋮ |

Related U.S. Application Data continuation of application No. 15/376,451, filed on Dec. 12, 2016, now Pat. No. 10,666,436, which is a division of application No. 13/765,209, filed on Feb. 12, 2013, now Pat. No. 9,705,674.

(56) References Cited

U.S. PATENT DOCUMENTS

| | | |
|---|---|---|
| 4,908,759 A | 3/1990 | Alexander, Jr. et al. |
| 4,918,728 A | 4/1990 | Matyas et al. |
| 5,054,067 A | 10/1991 | Moroney et al. |
| 5,146,498 A | 9/1992 | Smith |
| 5,201,000 A | 4/1993 | Matyas et al. |
| 5,495,533 A | 2/1996 | Linehan et al. |
| 5,633,931 A | 5/1997 | Wright |
| 5,675,653 A | 10/1997 | Nelson, Jr. |
| 5,826,245 A | 10/1998 | Sandberg-Diment |
| 5,862,220 A | 1/1999 | Perlman |
| 5,870,477 A | 2/1999 | Sasaki et al. |
| 5,933,503 A | 8/1999 | Schell et al. |
| 6,012,144 A | 1/2000 | Pickett |
| 6,175,625 B1 | 1/2001 | Safford et al. |
| 6,185,679 B1 | 2/2001 | Coppersmith et al. |
| 6,195,622 B1 | 2/2001 | Altschuler et al. |
| 6,199,162 B1 | 3/2001 | Luyster |
| 6,240,187 B1 | 5/2001 | Lewis |
| 6,259,789 B1 | 7/2001 | Paone |
| 6,336,186 B1 | 1/2002 | Dyksterhouse et al. |
| 6,356,941 B1 | 3/2002 | Cohen |
| 6,505,299 B1 | 1/2003 | Zeng et al. |
| 6,546,492 B1 | 4/2003 | Walker et al. |
| 6,816,595 B1 | 11/2004 | Kudo |
| 6,934,249 B1 | 8/2005 | Bertin et al. |
| 6,934,702 B2 | 8/2005 | Faybishenko et al. |
| 7,149,698 B2 | 12/2006 | Guheen et al. |
| 7,194,424 B2 | 3/2007 | Greer et al. |
| 7,295,671 B2 | 11/2007 | Snell |
| 7,362,868 B2 | 4/2008 | Madoukh et al. |
| 7,376,967 B1 | 5/2008 | Hughes et al. |
| 7,400,733 B1 | 7/2008 | Cam-Winget et al. |
| 7,490,248 B1 | 2/2009 | Valfridsson et al. |
| 7,565,419 B1 | 7/2009 | Kwiatkowski et al. |
| 7,620,680 B1 | 11/2009 | Lamport |
| 7,680,905 B1 | 3/2010 | Roberts et al. |
| 7,707,288 B2 | 4/2010 | Dawson et al. |
| 7,716,240 B2 | 5/2010 | Lim |
| 7,756,808 B2 | 7/2010 | Weigt et al. |
| 7,774,826 B1 | 8/2010 | Romanek et al. |
| 7,865,446 B2 | 1/2011 | Armingaud et al. |
| 7,877,607 B2 | 1/2011 | Circenis et al. |
| 7,882,247 B2 | 2/2011 | Sturniolo et al. |
| 7,894,604 B2 | 2/2011 | Nishioka et al. |
| 7,894,626 B2 | 2/2011 | Wang et al. |
| 7,937,432 B2 | 5/2011 | Rowley |
| 7,953,978 B2 | 5/2011 | Greco et al. |
| 7,970,625 B2 | 6/2011 | Reicher et al. |
| 7,991,747 B1 | 8/2011 | Upadhyay et al. |
| 8,024,562 B2 | 9/2011 | Gentry et al. |
| 8,024,582 B2 | 9/2011 | Kunitz et al. |
| 8,051,187 B2 | 11/2011 | Noy et al. |
| 8,060,596 B1 | 11/2011 | Wootton et al. |
| 8,065,720 B1 | 11/2011 | Ebrahimi et al. |
| 8,091,125 B1 | 1/2012 | Hughes et al. |
| 8,111,828 B2 | 2/2012 | Raman et al. |
| 8,131,663 B1 | 3/2012 | Taylor |
| 8,140,679 B2 | 3/2012 | Hatanaka |
| 8,140,847 B1 | 3/2012 | Wu |
| 8,185,931 B1 | 5/2012 | Reeves |
| 8,213,602 B2 | 7/2012 | Mamidwar |
| 8,219,869 B2 | 7/2012 | Ahn et al. |
| 8,224,796 B1 | 7/2012 | Shinde et al. |
| 8,224,979 B2 | 7/2012 | Herz et al. |
| 8,230,050 B1 | 7/2012 | Brandwine et al. |
| 8,244,745 B2 | 8/2012 | Lim |
| 8,245,037 B1 | 8/2012 | Durgin et al. |
| 8,245,039 B2 | 8/2012 | Jones |
| 8,251,283 B1 | 8/2012 | Norton |
| 8,261,320 B1 | 9/2012 | Serenyi et al. |
| 8,295,492 B2 | 10/2012 | Suarez et al. |
| 8,296,434 B1 | 10/2012 | Miller et al. |
| 8,302,170 B2 | 10/2012 | Kramer et al. |
| 8,312,064 B1 | 11/2012 | Gauvin |
| 8,315,387 B2 | 11/2012 | Kanter et al. |
| 8,321,560 B1 | 11/2012 | Pai et al. |
| 8,370,648 B1 | 2/2013 | Natanzon |
| 8,379,857 B1 | 2/2013 | Zheng |
| 8,387,127 B1 | 2/2013 | Narver et al. |
| 8,416,709 B1 | 4/2013 | Marshall et al. |
| 8,443,367 B1 | 5/2013 | Taylor et al. |
| 8,468,455 B2 | 6/2013 | Jorgensen et al. |
| 8,494,168 B1 | 7/2013 | Tolfmans |
| 8,538,020 B1 | 9/2013 | Miller |
| 8,555,383 B1 | 10/2013 | Marshall et al. |
| 8,565,108 B1 | 10/2013 | Marshall et al. |
| 8,572,369 B2 | 10/2013 | Schmidt-Karaca et al. |
| 8,572,758 B1 | 10/2013 | Clifford |
| 8,588,426 B2 | 11/2013 | Xin et al. |
| 8,601,263 B1 | 12/2013 | Shankar et al. |
| 8,607,358 B1 | 12/2013 | Shankar et al. |
| 8,654,970 B2 | 2/2014 | Olson et al. |
| 8,681,773 B2 | 3/2014 | Chazel et al. |
| 8,713,311 B1 | 4/2014 | Roskind |
| 8,751,807 B2 | 6/2014 | Ma et al. |
| 8,752,067 B2 | 6/2014 | Kishita |
| 8,774,403 B2 | 7/2014 | MacMillan et al. |
| 8,804,950 B1 | 8/2014 | Panwar |
| 8,850,516 B1 | 9/2014 | Hrebicek et al. |
| 8,868,914 B2 | 10/2014 | Teppler |
| 8,904,181 B1 | 12/2014 | Felsher et al. |
| 8,964,990 B1 | 2/2015 | Baer et al. |
| 8,973,008 B2 | 3/2015 | Czajkowski et al. |
| 8,989,379 B2 | 3/2015 | Katar et al. |
| 9,031,240 B2 | 5/2015 | Yang et al. |
| 9,053,460 B2 | 6/2015 | Gilbert et al. |
| 9,306,741 B1 | 4/2016 | Brainard |
| 9,367,697 B1 | 6/2016 | Roth et al. |
| 9,547,771 B2 | 1/2017 | Roth et al. |
| 9,705,674 B2 | 7/2017 | Roth et al. |
| 2001/0011226 A1 | 8/2001 | Greer et al. |
| 2001/0052071 A1 | 12/2001 | Kudo et al. |
| 2002/0029337 A1 | 3/2002 | Sudia et al. |
| 2002/0076044 A1 | 6/2002 | Pires |
| 2002/0126850 A1 | 9/2002 | Allen et al. |
| 2002/0135611 A1 | 9/2002 | Deosaran et al. |
| 2002/0141590 A1 | 10/2002 | Montgomery |
| 2003/0021417 A1 | 1/2003 | Vasic et al. |
| 2003/0037237 A1 | 2/2003 | Abgrall et al. |
| 2003/0081790 A1 | 5/2003 | Kallahalla et al. |
| 2003/0084290 A1 | 5/2003 | Murty et al. |
| 2003/0093694 A1 | 5/2003 | Medvinsky et al. |
| 2003/0110376 A1 | 6/2003 | Wiener et al. |
| 2003/0131238 A1 | 7/2003 | Vincent |
| 2003/0145203 A1* | 7/2003 | Audebert ............ G06Q 20/341 713/169 |
| 2003/0163701 A1 | 8/2003 | Ochi et al. |
| 2003/0172269 A1 | 9/2003 | Newcombe |
| 2003/0188181 A1 | 10/2003 | Kunitz et al. |
| 2003/0188188 A1 | 10/2003 | Padmanabhan et al. |
| 2003/0219129 A1 | 11/2003 | Whelan et al. |
| 2004/0009815 A1 | 1/2004 | Zotto et al. |
| 2004/0093499 A1 | 5/2004 | Arditi et al. |
| 2004/0107345 A1 | 6/2004 | Brandt et al. |
| 2004/0143733 A1 | 7/2004 | Ophir et al. |
| 2004/0151308 A1 | 8/2004 | Kacker |
| 2004/0193915 A1 | 9/2004 | Smith et al. |
| 2004/0215987 A1 | 10/2004 | Farkas et al. |
| 2004/0223608 A1 | 11/2004 | Oommen et al. |
| 2005/0004978 A1 | 1/2005 | Reed et al. |
| 2005/0010760 A1 | 1/2005 | Goh et al. |
| 2005/0018842 A1 | 1/2005 | Fu et al. |
| 2005/0021712 A1 | 1/2005 | Chassapis et al. |
| 2005/0050317 A1 | 3/2005 | Kramer et al. |
| 2005/0120232 A1 | 6/2005 | Hori et al. |
| 2005/0123142 A1 | 6/2005 | Freeman et al. |

(56) References Cited

U.S. PATENT DOCUMENTS

| | | |
|---|---|---|
| 2005/0149677 A1 | 7/2005 | Shimada et al. |
| 2005/0165859 A1 | 7/2005 | Geyer et al. |
| 2005/0195743 A1 | 9/2005 | Rochberger et al. |
| 2005/0246778 A1 | 11/2005 | Usov et al. |
| 2005/0273629 A1 | 12/2005 | Abrams et al. |
| 2006/0010323 A1 | 1/2006 | Martin et al. |
| 2006/0018468 A1 | 1/2006 | Toba et al. |
| 2006/0021018 A1 | 1/2006 | Hinton et al. |
| 2006/0031301 A1 | 2/2006 | Herz et al. |
| 2006/0123010 A1 | 6/2006 | Landry et al. |
| 2006/0143685 A1 | 6/2006 | Vasishth et al. |
| 2006/0155829 A1 | 7/2006 | Annic |
| 2006/0168248 A1 | 7/2006 | Sack |
| 2006/0190724 A1 | 8/2006 | Adams et al. |
| 2006/0195575 A1 | 8/2006 | Delany et al. |
| 2006/0204003 A1 | 9/2006 | Takata et al. |
| 2006/0206932 A1 | 9/2006 | Chong |
| 2006/0288232 A1 | 12/2006 | Ho et al. |
| 2006/0291664 A1 | 12/2006 | Suarez et al. |
| 2007/0033637 A1 | 2/2007 | Yami et al. |
| 2007/0050641 A1 | 3/2007 | Flynn et al. |
| 2007/0055862 A1 | 3/2007 | Sharma et al. |
| 2007/0055921 A1 | 3/2007 | Challenor |
| 2007/0136599 A1 | 6/2007 | Suga |
| 2007/0140480 A1 | 6/2007 | Yao |
| 2007/0143851 A1 | 6/2007 | Nicodemus et al. |
| 2007/0150480 A1 | 6/2007 | Hwang et al. |
| 2007/0168292 A1 | 7/2007 | Jogand-Coulomb et al. |
| 2007/0179987 A1 | 8/2007 | Lim |
| 2007/0180153 A1 | 8/2007 | Cornwell et al. |
| 2007/0198656 A1 | 8/2007 | Mazzaferri et al. |
| 2007/0220279 A1 | 9/2007 | Northcutt et al. |
| 2007/0230704 A1 | 10/2007 | Youn et al. |
| 2007/0230706 A1 | 10/2007 | Youn |
| 2007/0239987 A1 | 10/2007 | Hoole et al. |
| 2007/0283446 A1 | 12/2007 | Yami et al. |
| 2008/0005024 A1 | 1/2008 | Kirkwood |
| 2008/0016337 A1 | 1/2008 | Morgan et al. |
| 2008/0019516 A1 | 1/2008 | Fransdonk |
| 2008/0019527 A1 | 1/2008 | Youn et al. |
| 2008/0022376 A1 | 1/2008 | Ke et al. |
| 2008/0025514 A1 | 1/2008 | Coombs |
| 2008/0034200 A1 | 2/2008 | Polcha et al. |
| 2008/0046984 A1 | 2/2008 | Bohmer et al. |
| 2008/0082827 A1 | 4/2008 | Agrawal et al. |
| 2008/0084996 A1 | 4/2008 | Chen et al. |
| 2008/0112561 A1 | 5/2008 | Kim et al. |
| 2008/0127279 A1 | 5/2008 | Futa et al. |
| 2008/0172562 A1 | 7/2008 | Cachin et al. |
| 2008/0183656 A1 | 7/2008 | Perng et al. |
| 2008/0247540 A1 | 10/2008 | Ahn et al. |
| 2008/0294711 A1 | 11/2008 | Barber |
| 2008/0298590 A1 | 12/2008 | Katar et al. |
| 2008/0319909 A1 | 12/2008 | Perkins et al. |
| 2009/0025087 A1 | 1/2009 | Peirson, Jr. et al. |
| 2009/0034733 A1 | 2/2009 | Raman et al. |
| 2009/0092252 A1* | 4/2009 | Noll ............ H04L 9/083 380/277 |
| 2009/0106552 A1 | 4/2009 | Mohamed |
| 2009/0117877 A1* | 5/2009 | Yang ............ H04W 12/0431 455/411 |
| 2009/0158033 A1 | 6/2009 | Jeong et al. |
| 2009/0158430 A1 | 6/2009 | Borders |
| 2009/0165076 A1 | 6/2009 | DeCusatis et al. |
| 2009/0165114 A1 | 6/2009 | Baum et al. |
| 2009/0196418 A1 | 8/2009 | Tkacik et al. |
| 2009/0232300 A1 | 9/2009 | Zucker et al. |
| 2009/0241114 A1 | 9/2009 | Kirihata |
| 2009/0245519 A1 | 10/2009 | Cachin et al. |
| 2009/0276364 A1 | 11/2009 | Iaia et al. |
| 2009/0276514 A1 | 11/2009 | Subramanian |
| 2009/0300356 A1 | 12/2009 | Crandell |
| 2010/0008499 A1 | 1/2010 | Lee et al. |
| 2010/0011448 A1 | 1/2010 | Wagner |
| 2010/0014662 A1 | 1/2010 | Jutila |
| 2010/0017626 A1 | 1/2010 | Sato et al. |
| 2010/0036779 A1 | 2/2010 | Sadeh-Koniecpol et al. |
| 2010/0074445 A1 | 3/2010 | Nefedov et al. |
| 2010/0088126 A1 | 4/2010 | Iaia et al. |
| 2010/0095118 A1 | 4/2010 | Meka |
| 2010/0115614 A1 | 5/2010 | Barile et al. |
| 2010/0138218 A1 | 6/2010 | Geiger |
| 2010/0153670 A1 | 6/2010 | Dodgson et al. |
| 2010/0161830 A1 | 6/2010 | Noy et al. |
| 2010/0162347 A1 | 6/2010 | Barile |
| 2010/0165876 A1 | 7/2010 | Shukla et al. |
| 2010/0174919 A1 | 7/2010 | Ito et al. |
| 2010/0185850 A1 | 7/2010 | Liu |
| 2010/0185863 A1 | 7/2010 | Rabin et al. |
| 2010/0211781 A1 | 8/2010 | Auradkar et al. |
| 2010/0235635 A1 | 9/2010 | Kshirsagar et al. |
| 2010/0241848 A1 | 9/2010 | Smith et al. |
| 2010/0242088 A1 | 9/2010 | Thomas |
| 2010/0250965 A1 | 9/2010 | Olson et al. |
| 2010/0254537 A1 | 10/2010 | Buer et al. |
| 2010/0266132 A1 | 10/2010 | Bablani |
| 2010/0268788 A1 | 10/2010 | Arimilli et al. |
| 2010/0269171 A1 | 10/2010 | Raz et al. |
| 2010/0289627 A1 | 11/2010 | McAllister et al. |
| 2010/0303241 A1 | 12/2010 | Breyel |
| 2010/0306850 A1 | 12/2010 | Barile et al. |
| 2010/0316219 A1 | 12/2010 | Boubion et al. |
| 2010/0325732 A1 | 12/2010 | Mittal et al. |
| 2011/0022642 A1 | 1/2011 | deMilo et al. |
| 2011/0055558 A1 | 3/2011 | Liu et al. |
| 2011/0072264 A1 | 3/2011 | McNulty |
| 2011/0083163 A1 | 4/2011 | Auvenshine et al. |
| 2011/0083190 A1 | 4/2011 | Brown et al. |
| 2011/0087898 A1 | 4/2011 | Williams |
| 2011/0099362 A1 | 4/2011 | Haga et al. |
| 2011/0113466 A1 | 5/2011 | Stringham et al. |
| 2011/0113467 A1 | 5/2011 | Agarwal et al. |
| 2011/0116636 A1 | 5/2011 | Steed |
| 2011/0119487 A1 | 5/2011 | Alexander et al. |
| 2011/0145571 A1 | 6/2011 | Schmidt-Karaca et al. |
| 2011/0154031 A1 | 6/2011 | Banerjee et al. |
| 2011/0154057 A1 | 6/2011 | England et al. |
| 2011/0173435 A1 | 7/2011 | Liu et al. |
| 2011/0178933 A1 | 7/2011 | Bailey, Jr. |
| 2011/0191462 A1 | 8/2011 | Smith |
| 2011/0209064 A1 | 8/2011 | Jorgensen et al. |
| 2011/0213971 A1 | 9/2011 | Gurel et al. |
| 2011/0244440 A1 | 10/2011 | Saxon et al. |
| 2011/0246765 A1 | 10/2011 | Schibuk |
| 2011/0252071 A1 | 10/2011 | Cidon |
| 2011/0258437 A1 | 10/2011 | McKelvey et al. |
| 2011/0258443 A1 | 10/2011 | Barry |
| 2011/0261964 A1 | 10/2011 | Kahler et al. |
| 2011/0289134 A1 | 11/2011 | de los Reyes et al. |
| 2011/0289314 A1 | 11/2011 | Whitcomb |
| 2011/0296497 A1 | 12/2011 | Becker |
| 2011/0302398 A1 | 12/2011 | Ureche et al. |
| 2011/0320819 A1 | 12/2011 | Weber et al. |
| 2012/0030961 A1 | 2/2012 | Hanaoka et al. |
| 2012/0042162 A1 | 2/2012 | Anglin et al. |
| 2012/0079289 A1 | 3/2012 | Weng et al. |
| 2012/0096272 A1 | 4/2012 | Jasper et al. |
| 2012/0114118 A1 | 5/2012 | Verma |
| 2012/0124612 A1 | 5/2012 | Adimatyam et al. |
| 2012/0131354 A1 | 5/2012 | French |
| 2012/0134495 A1 | 5/2012 | Liu |
| 2012/0140923 A1 | 6/2012 | Lee et al. |
| 2012/0144233 A1 | 6/2012 | Griffith et al. |
| 2012/0151551 A1 | 6/2012 | Readshaw et al. |
| 2012/0159148 A1 | 6/2012 | Behren et al. |
| 2012/0170753 A1 | 7/2012 | Pandrangi et al. |
| 2012/0191979 A1 | 7/2012 | Feldbau |
| 2012/0198042 A1 | 8/2012 | Dunbar et al. |
| 2012/0204032 A1* | 8/2012 | Wilkins ............ H04L 9/321 713/170 |
| 2012/0216041 A1 | 8/2012 | Naono et al. |
| 2012/0243685 A1 | 9/2012 | Tanaka et al. |
| 2012/0254090 A1 | 10/2012 | Burris et al. |
| 2012/0260094 A1 | 10/2012 | Asim et al. |

(56) References Cited

U.S. PATENT DOCUMENTS

| | | |
|---|---|---|
| 2012/0266218 A1 | 10/2012 | Mattsson |
| 2012/0281839 A1 | 11/2012 | Arnold et al. |
| 2012/0290850 A1 | 11/2012 | Brandt et al. |
| 2012/0291101 A1 | 11/2012 | Ahlstrom et al. |
| 2012/0297183 A1 | 11/2012 | Mukkara et al. |
| 2012/0297200 A1 | 11/2012 | Thom et al. |
| 2012/0300936 A1 | 11/2012 | Green |
| 2012/0303961 A1 | 11/2012 | Kean et al. |
| 2012/0311675 A1 | 12/2012 | Ham et al. |
| 2012/0314854 A1 | 12/2012 | Waters |
| 2012/0321078 A1 | 12/2012 | Chambers et al. |
| 2012/0321086 A1 | 12/2012 | D'Souza et al. |
| 2012/0323717 A1 | 12/2012 | Kirsch |
| 2012/0323990 A1 | 12/2012 | Hayworth |
| 2012/0331284 A1 | 12/2012 | Kouladjie et al. |
| 2012/0331293 A1 | 12/2012 | Ma et al. |
| 2013/0003978 A1 | 1/2013 | Brettle et al. |
| 2013/0013931 A1* | 1/2013 | O'Hare .............. H04L 9/3231 713/189 |
| 2013/0031255 A1 | 1/2013 | Maloy et al. |
| 2013/0031356 A1 | 1/2013 | Prince et al. |
| 2013/0044878 A1 | 2/2013 | Rich et al. |
| 2013/0097320 A1 | 4/2013 | Ritter et al. |
| 2013/0103834 A1 | 4/2013 | Dzerve et al. |
| 2013/0111217 A1 | 5/2013 | Kopasz et al. |
| 2013/0145160 A1* | 6/2013 | Bursell .............. G06F 21/6218 713/168 |
| 2013/0156188 A1 | 6/2013 | Xu et al. |
| 2013/0157619 A1 | 6/2013 | Di Luoffo et al. |
| 2013/0159732 A1 | 6/2013 | Leoutsarakos |
| 2013/0163753 A1 | 6/2013 | MacMillan et al. |
| 2013/0166703 A1 | 6/2013 | Hammer et al. |
| 2013/0167196 A1 | 6/2013 | Spencer et al. |
| 2013/0177829 A1 | 7/2013 | Homma |
| 2013/0198521 A1 | 8/2013 | Wu |
| 2013/0212576 A1 | 8/2013 | Huang et al. |
| 2013/0283045 A1 | 10/2013 | Li et al. |
| 2013/0290716 A1 | 10/2013 | Gavrilov |
| 2013/0312094 A1 | 11/2013 | Zecheru |
| 2013/0316682 A1 | 11/2013 | Vieira |
| 2013/0326233 A1 | 12/2013 | Tolfmans |
| 2013/0346747 A1 | 12/2013 | Ignatchenko et al. |
| 2014/0012751 A1 | 1/2014 | Kuhn et al. |
| 2014/0020072 A1 | 1/2014 | Thomas |
| 2014/0047549 A1 | 2/2014 | Bostley, III et al. |
| 2014/0115327 A1* | 4/2014 | Gorbach .............. H04L 9/0825 713/165 |
| 2014/0122866 A1 | 5/2014 | Haeger et al. |
| 2014/0164774 A1 | 6/2014 | Nord et al. |
| 2014/0177829 A1 | 6/2014 | MacMillan et al. |
| 2014/0201533 A1 | 7/2014 | Kruglick |
| 2014/0229732 A1 | 8/2014 | Roth et al. |
| 2014/0229739 A1 | 8/2014 | Roth et al. |
| 2015/0222604 A1 | 8/2015 | Ylonen |
| 2018/0045189 A1 | 2/2018 | Lee et al. |

FOREIGN PATENT DOCUMENTS

| | | |
|---|---|---|
| CN | 1740944 A | 3/2006 |
| CN | 101281578 A | 10/2008 |
| CN | 101573910 A | 11/2009 |
| CN | 101741547 A | 6/2010 |
| CN | 101753302 A | 6/2010 |
| CN | 102130768 A | 7/2011 |
| CN | 102271037 A | 12/2011 |
| CN | 102318263 A | 1/2012 |
| CN | 102656591 A | 9/2012 |
| JP | 2000215240 A | 8/2000 |
| JP | 2000295209 A | 10/2000 |
| JP | 2001209582 A | 8/2001 |
| JP | 2002140534 A | 5/2002 |
| JP | 2003188871 A | 7/2003 |
| JP | 2004208184 A | 7/2004 |
| JP | 2005057417 A | 3/2005 |
| JP | 2005197912 A | 7/2005 |
| JP | 2005258801 A | 9/2005 |
| JP | 2005533438 A | 11/2005 |
| JP | 2006099548 A | 4/2006 |
| JP | 2006149501 A | 6/2006 |
| JP | 2006279848 A | 10/2006 |
| JP | 2006319543 A | 11/2006 |
| JP | 2007037197 A | 2/2007 |
| JP | 2007081482 A | 3/2007 |
| JP | 2007507760 A | 3/2007 |
| JP | 2007293468 A | 11/2007 |
| JP | 2008015669 A | 1/2008 |
| JP | 2008134789 A | 6/2008 |
| JP | 2008541273 A | 11/2008 |
| JP | 2008306418 A | 12/2008 |
| JP | 2009171448 A | 7/2009 |
| JP | 2009213064 A | 9/2009 |
| JP | 2009246800 A | 10/2009 |
| JP | 2010024071 A | 2/2010 |
| JP | 2010072916 A | 4/2010 |
| JP | 2010128824 A | 6/2010 |
| JP | 2011019129 A | 1/2011 |
| JP | 2011159053 A | 8/2011 |
| JP | 2012073374 A | 4/2012 |
| JP | 2012178010 A | 9/2012 |
| JP | 2012221420 A | 11/2012 |
| JP | 2014501955 A | 1/2014 |
| KR | 101145766 B1 | 5/2012 |
| WO | 0154099 A1 | 7/2001 |
| WO | 2004008676 A2 | 1/2004 |
| WO | 2009060283 A1 | 5/2009 |
| WO | 2009104285 A1 | 8/2009 |
| WO | 2010001150 A1 | 1/2010 |
| WO | 2010093559 A2 | 8/2010 |
| WO | 2011083343 A2 | 7/2011 |
| WO | 2011089712 A1 | 7/2011 |
| WO | 2012060979 A1 | 5/2012 |
| WO | 2012109640 A2 | 8/2012 |
| WO | 2013145517 A1 | 10/2013 |

OTHER PUBLICATIONS

Korean Decision of Grant for Patent Application No. 10-2017-7022249 dated Sep. 6, 2019, 3 pages.

Korean Notice of Preliminary Amendment, dated Apr. 4, 2019, for Patent Application No. 10-2017-7022249, 8 pages.

Krawczyk et al., "HMAC-based Extract-and-Expand Key Derivation Function (HKDF)," Internet Engineering Task Force (IETF), May 2010, retrieved Sep. 22, 2015, from https://tools.ietf.org/html/rfc5869, 14 pages.

Manulis, et al., "Group Signatures: Authentication with Privacy," retrieved from https ://www.bsi.bund.de/SharedDocs/Downloads/EN/BSI/Publications/Studies/GruPA/GruPA.pdf?_blob=publicationFile, Published May 15, 2010, 267 pages.

Marshall et al., U.S. Appl. No. 12/892,665 entitled "Network Data Transmission Auditing." filed Sep. 28, 2010. 59 pages.

Marshall et al., U.S. Appl. No. 12/892,741 entitled "Network Data Transmission Analysis." filed Sep. 28, 2010. 61 pages.

Nist, "Implementation Guidance for FIPS PUB 140-1 and the Cryptographic Module Validation Program," Jan. 10, 2002, 63 pages.

Nist, "Implementation Guidance for FIPS PUB 140-2 and the Cryptographic Module Validation Program," Initial Release Mar. 28, 2003, 205 pages.

Olexiy et al., "Starting Share Files with NFS," Linux Journal, dated Jan. 1, 2002, retrieved on Jan. 2, 2018, from http://www.linuxjournal.com/article/4880?paqe=0,0, 13 pages.

Rahumed et al., "A Secure Cloud Backup System with Assured Deletion and Version Control," 2011 International Conference on Parallel Processing Workshops, IEEE Computer Society, 8 pages.

Rescorla, "Diffie-Hellman Key Agreement Method," Network Working Group, RTFM Inc., Jun. 1999, retrieved on Sep. 22, 2015, from https://tools.ietf.org/html/rfc2631, 13 pages.

Rescorla, "Diffie-Hellman Key Agreement Method," Network Working Group, RTFM Inc., Jun. 1999, retrieved on Sep. 22, 2015, from https://tools.ietf.orq/html/rfc2631, 13 pages.

(56) References Cited

OTHER PUBLICATIONS

Roth et al., "Amendments to Specification," U.S. Appl. No. 13/764,963, filed Feb. 12, 2013, 48 pages.
Roth et al., "Automatic Key Rotation," U.S. Appl. No. 13/764,944, filed Feb. 12, 2013.
Roth et al., "Data Loss Prevention Techinques," U.S. Appl. No. 13/932,872, filed Jul. 1, 2013.
Roth et al., "Data Security Service," U.S. Appl. No. 13/764,963, filed Feb. 12, 2013, 48 pages.
Roth et al., "Data Security Service," U.S. Appl. No. 13/764,963, filed Feb. 12, 2013.
Roth et al., "Device Coordination," U.S. Appl. No. 13/916,915, filed Jun. 13, 2013.
Roth et al., "Key Rotation Techniques," U.S. Appl. No. 13/916,999, filed Jun. 13, 2013.
Roth et al., "Negotiating a Session With a Cryptographic Domain," U.S. Appl. No. 13/916,964, filed Jun. 13, 2013.
Roth et al., "Virtual Service Provider Zones," U.S. Appl. No. 13/932,824, filed Jul. 1, 2013.
Roth et al., U.S. Appl. No. 13/491,403 entitled "Flexibly Configurable Data Modification Services," filed Jun. 7, 2012.
Roth et al., U.S. Appl. No. 13/764,995 entitled "Policy Enforcement With Associated Data." filed Feb. 12, 2013.
Roth et al., U.S. Appl. No. 13/765,020 entitled "Data Security With a Security Module." filed Feb. 12, 2013.
Roth et al., U.S. Appl. No. 13/765,209 entitled "Federated Key Management." filed Feb. 12, 2013.
Roth et al., U.S. Appl. No. 13/765,239 entitled "Delayed Data Access." filed Feb. 12, 2013.
Roth et al., U.S. Appl. No. 13/765,265 entitled "Data Security Service." filed Feb. 12, 2013.
Roth et al., U.S. Appl. No. 13/765,283 entitled "Secure Management of Information Using a Security Module." filed Feb. 12, 2013.
Sieloff, "The new systems administrator: The role of becoming root," Inside Solaris, Oct. 2002, 8(10):6-9.
Stack Exchange, "Storing secrets in software," by ninefingers, Stack Exchange Security Blog, dated Sep. 6, 2011, retrieved on Jan. 2, 2018, from http://security.blogoverflow.com/2011/09/storing-secrets-in-software/, 3 pages.
Wikipedia, "IEEE P1363" an Institute of Electrical and Electronics Engineers (IEEE) standardization project for public-key cryptography," retrieved Sep. 22, 2015, from https://en.wikipedia.org/wiki/IEEE P1363, 3 pages.
Wikipedia, "Key derivation function, " retrieved Sep. 22, 2015, from https://en.wikipedia.org/wiki/Key_derivation_function, 4 pages.
Zhu et al., "Algorithms for assigning substrate network resources to virtual network components", IEEE Infocom 2006, Apr. 2006, 12 pages.
European Communication pursuant to Article 94(3) EPC for Patent Application No. 14751881.5 dated Oct. 25, 2018, 5 pages.
European Communication Rule 69 for Patent Application No. 19187650.7 dated Nov. 7, 2019, 7 pages.
European Communication Under Rule 71 (3) EPC for Application No. 14752191.8, Intention to Grant, dated Mar. 22, 2019, 75 pages.
European Official Communication Pursuant to Article 94(3) EPC for Patent Application No. 14751256.0 dated Jan. 3, 2018, 5 pages.
European Official Letter for Patent Application No. 14751881.5 dated Feb. 21, 2018, 3 pages.
European Patent Office Communication Pursuant to Article 94(3) EPC, Application No. 19203674.7, dated Mar. 17, 2023, 4 pages.
European Rule 71 (3) Communication Patent Application No. 14751881.5 dated Feb. 21, 2020, 109 pages.
Extended European Search Report mailed Sep. 14, 2016, European Patent Application No. 14751612.4, filed Feb. 7, 2014, seven pages.
Guttman et al., "An Introduction to Computer Security: The NIST Handbook," Special Publication 800-12, Oct. 1, 1995, Sections 17.6 and 18.3.2 and Section 19 for cryptographic tools, XP055298016, retrieved on Aug. 26, 2016, from http://www.davidsalomon.name/CompSec/auxiliary/handbook.pdf.

IEEE, "Draft Standard for Identity-based Public-key Cryptography Using Pairings," IEEE P1363.3/D1, Apr. 2008, retrieved Sep. 22, 2015, from http://grouper.ieee.org/groups/1363/IBC/material/P1363.3-D1-200805.pdf, 85 pages.
India First Examination Report for Patent Application No. 7420/DELNP/2015 dated Oct. 21, 2019, 6 pages.
India First Examination Report for Patent Application No. 7421/DELNP/2015 dated Dec. 27, 2019, 7 pages.
India First Examination Report for Patent Application No. 7426/DELNP/2015 dated Dec. 26, 2019, 8 pages.
India First Examination Report for Patent Application No. 7428/DELNP/2015 dated Jan. 29, 2020, 8 pages.
India First Examination Report for Patent Application No. 7428/DELNP/2015 dated Nov. 17, 2021, 7 pages.
India First Examination Report for Patent Application No. 7474/DELNP/2015 dated Dec. 26, 2019, 7 pages.
Intellectual Property Office of Singapore Search Report dated Sep. 16, 2022 for Application No. 10202108884Y, 3 pages.
Intellectual Property Office of Singapore Written Opinion dated Sep. 19, 2022 for Application No. 10202108884Y, 7 pages.
Intellectual Property Office of Singapore Written Opinion dated Sep. 9, 2022, Patent Application No. 10202108884Y, filed Feb. 7, 2014.
International Search Report and Written Opinion mailed Apr. 29, 2014, in International Patent Application No. PCT/US2014/015404, filed Feb. 7, 2014.
International Search Report and Written Opinion mailed May 28, 2014, in International Patent Application No. PCT/US2014/15697, filed Feb. 11, 2014.
International Search Report and Written Opinion mailed May 30, 2014, in International Patent Application No. PCT/US2014/015408, filed Feb. 7, 2014.
International Search Report and Written Opinion mailed May 30, 2014, in International Patent Application No. PCT/US2014/015410, filed Feb. 7, 2014.
International Search Report and Written Opinion mailed May 30, 2014, International Patent Application No. PCT/US2014/015414, filed Feb. 7, 2014.
International Search Report and Written Opinion mailed Oct. 28, 2014, International Patent Application No. PCT/US2014/044861, filed Jun. 30, 2014.
Itani et al., "Privacy as a Service: Privacy-Aware Data Storage and Processing in Cloud Computing Architectures," 2009 Eighth IEEE International Conference on Dependable, Autonomic and Secure Computing, pp. 711-716.
Japan Official Notice of Rejection for Application No. 2020-114298 mailed Aug. 16, 2022, 3 pages.
Japanese Appeal Decision for Patent Application No. 2015-558070 dated Feb. 18, 2020, 3 pages.
Japanese Appeal Decision for Patent Application No. 2016-511994 dated Mar. 12, 2019, 3 pages.
Japanese Decision on Final Rejection for Patent Application No. 2017-232031 dated Mar. 3, 2020, 4 pages.
Japanese Final Decision of Rejection for Patent Application No. 2015-558056 dated Mar. 13, 2018, 18 pages.
Japanese Final Decision on Rejection for Patent Application No. 2015-558070 dated Apr. 3, 2018, 7 pages.
Japanese Notice and Report for Revocation of Reconsideration Report for Patent Application No. 2015-558043 dated Mar. 9, 2018, 6 pages.
Japanese Notice for Revocation of Reconsideration for Patent Application No. 2017-232031 dated Sep. 29, 2020, 2 pages.
Japanese Notice of Allowance for Patent Application No. 2015-558042, dated Dec. 27, 2017, 6 pages.
Japanese Notice of Allowance for Patent Application No. 2017-217362 dated Sep. 17, 2019, 6 pages.
Japanese Notice of Allowance for Patent Application No. 2018-133603, dated May 21, 2019, 6 pages.
Japanese Notice of Allowance for Patent Application No. 2020-114298, mailed May 9, 2023, 6 pages.
Japanese Notice of Allowance, dated Oct. 2, 2018, for Patent Application No. 2015-558056, 6 pages.

(56) References Cited

OTHER PUBLICATIONS

Japanese Notice of Final Rejection for Patent Application No. 2015-558070 dated Sep. 3, 2019, 8 pages.
Japanese Notice of Final Rejection for Patent Application No. 2017-232031 dated Mar. 26, 2019, 13 pages.
Japanese Notice of Rejection for Patent Application No. 2017-217362 dated Feb. 12, 2019, 9 pages.
Japanese Notice of Rejection for Patent Application No. 2017-232031 dated Apr. 27, 2021, 23 pages.
Japanese Notice of Rejection for Patent Application No. 2019-190480 dated Jan. 26, 2021, 7 pages.
Japanese Notice of Rejection, dated Sep. 4, 2018, for Patent Application No. 2015-558043, 25 pages.
Japanese Notice of Revocation for Reconsideration and Report, dated Dec. 4, 2018, for Patent Application No. 2015-558070, 4 pages.
Japanese Office Action for Patent Application No. 2020-114298 dated Sep. 28, 2021, 11 pages.
Japanese Official Notice of Rejection for Patent Application No. 2017-232031 dated Dec. 21, 2021, 4 pages.
Japanese Report on Notice of Allowance for Patent Application No. 2015-558044 dated Mar. 27, 2018, 6 pages.
"IEEE P1363" Wikipedia: The Free Encyclopedia. Published Sep. 4, 2015. Retreived Sep. 23, 2015 from <https://en.wikipedia.org/w/index.php?title=IEEE_P1363&oldid=679395829>. 3 pages.
"Key derivation function" Wikipedia: The Free Encyclopedia. Published Sep. 1, 2015. Retreived Sep. 23, 2015 from <https://en.wikipedia.org/w/index.php?title=Key_derivation_function&oldid=678938533>. 4 pages.
Australian Examination Report No. 1 for Patent Application No. 2017204853 dated Jun. 29, 2018, 4 pages.
Australian Examination Report No. 2, dated Mar. 5, 2019, for Patent Application No. 2017204853, 3 pages.
Australian Notice of Acceptance for Patent Application No. 2017204853 dated May 16, 2019, 3 pages.
Barker et al., "Recommendation for Random No. Generation Using Deterministic Random Bit Generators," National Institute Standards and Technology Special Publication 800-90A, Jan. 2012, 136 pages.
Bernstein et al., "The Poly1305-AES Message-Authentication Code," Lecture Notes in Computer Science, Department of Mathematics, Statistics, and Computer Science (M/C 249), The University of Illinois at Chicago, Feb. 21, 2005, 18 pages.
Bethencourt et al., "Ciphertext-Policy Attribute-Based Encryption," IEEE Symposium on Security and Privacy 2007. pp. 321-334. May 20-23, 2007.
Brazil Preliminary Office Action for Patent Application No. BR1120150193781 dated Mar. 3, 2020, 7 pages.
Canadian Notice of Allowance for Patent Application No. 2,899,008 dated Dec. 21, 2020, 1 page.
Canadian Notice of Allowance for Patent Application No. 2,899,014 dated Feb. 8, 2018, 1 page.
Canadian Notice of Allowance for Patent Application No. 2,899,027 mailed May 11, 2020, 1 page.
Canadian Notice of Allowance, dated Jun. 25, 2019, for Patent Application No. 2,898,995, 1 page.
Canadian Office Action for Patent Application No. 2,898,995 dated Jul. 3, 2018, 9 pages.
Canadian Office Action for Patent Application No. 2,898,995 dated Jul. 31, 2020, 3 pages.
Canadian Office Action for Patent Application No. 2,899,008 dated Feb. 19, 2020, 2 pages.
Canadian Office Action for Patent Application No. 2,899,008 dated Mar. 1, 2019, 4 pages.
Canadian Office Action for Patent Application No. 2,899,008 dated Mar. 14, 2018, 4 pages.
Canadian Office Action for Patent Application No. 2,899,008 dated Oct. 19, 2021, 3 pages.
Canadian Office Action for Patent Application No. 2,899,019 dated Feb. 17, 2020, 5 pages.
Canadian Office Action for Patent Application No. 2,899,019 dated Feb. 3, 2021, 3 pages.
Canadian Office Action for Patent Application No. 2,899,019 dated Jul. 3, 2018, 8 pages.
Canadian Office Action for Patent Application No. 2,899,019 dated Mar. 25, 2019, 8 pages.
Canadian Office Action for Patent Application No. 2,899,027 dated Jul. 17, 2018, 6 pages.
Canadian Office Action for Patent Application No. 2,899,027 dated May 13, 2019, 6 pages.
Canadian Patent Office Notice of Allowance of Application No. 2,899,008 dated Oct. 27, 2022, 1 page.
China IPO Notice of Second Office Action for Patent Application No. 202010838180.6 dated May 30, 2023, 7 pages.
China National Intellectual Property Administration Notice on Grant of Patent Right for Invention for Application No. 201911354068.9 dated May 16, 2023, 3 pages.
Chinese Decision on Rejection for Patent Application No. 201480011965.9 dated Jan. 15, 2018, 6 pages.
Chinese Decision on Rejection for Patent Application No. 201480013039.5 dated Apr. 12, 2019, 15 pages.
Chinese First Office Action for Patent Application No. 201480020482.5, dated Dec. 28, 2017, 11 pages.
Chinese Fourth Office Action for Patent Application No. 201480011965.9 dated May 20, 2019, 5 pages.
Chinese Notice of Grant for Patent Application No. 201480013039.5 dated Jun. 4, 2020, 4 pages.
Chinese Notice on Grant for Patent Application No. 201480011965.9 dated Aug. 22, 2019, 4 pages.
Chinese Notice on Grant of Patent for Application No. 201480020500.X dated Dec. 28, 2017, 4 pages.
Chinese Notice on the Second Office Action for Patent Application No. 201480020517.5 dated Jan. 3, 2018, 8 pages.
Chinese Notice to Grant for Patent Application No. 201480020482.5 dated Oct. 10, 2019, 4 pages.
Chinese Patent Office Notice of First Office Action in Application No. 202010838180.6 dated Jan. 3, 2023, 13 pages.
Chinese Second Office Action for Patent Application No. 201480020482.5 dated Jul. 19, 2018, 28 pages.
Chinese Second Office Action, dated Sep. 25, 2018, for Patent Application No. 201480013039.5, 11 pages.
Chinese Third Office Action dated Mar. 15, 2019 for Patent Application No. 201480020482.5, 19 pages.
Chinese Third Office Action for Patent Application No. 201480013039.5 dated Dec. 13, 2019, 7 pages.
Chinese Third Office Action for Patent Application No. 201480020517.5 dated Jul. 25, 2018, 6 pages.
Chowdhury et al., "Network Virtualization: State of the Art and Research Challenges", IEEE Communications Magazine, Jul. 2009, 7 pages.
Chowdhury et al., "Virtual Network Embedding With Coordinated Node and Link Mapping", IEEE INFOCOM 2009, Apr. 2009, 9 pages.
European Communication 94(3) for Patent Application No. 19187650.7 dated Aug. 6, 2021, 7 pages.
European Communication 94(3) for Patent Application No. 19203674.7 dated Sep. 2, 2021, 4 pages.
European Communication pursuant to Article 94(3) EPC for Application No. 14751237.0 dated May 28, 2018, 4 pages.
European Communication pursuant to Article 94(3) EPC for Application No. 14751612.4 dated Jan. 3, 2018, 4 pages.
European Communication pursuant to Article 94(3) EPC for Application No. 14751881.5 dated Jul. 2, 2019, 4 pages.
European Communication Under Rule 71 (3) EPC for Application No. 19187650.7, Intention to Grant, dated Sep. 26, 2023, 81 pages.
Japanese Notice of Rejection for Patent Application No. 2023-094952 dated Aug. 27, 2024, 7 pages.
Canadian IPO Office Action dated Dec. 4, 2023, Application No. 3,173,681, 4 pages.
China National Intellectual Property Administration Notice of Rejection, Application No. 202010838180.6 dated Oct. 19, 2023, 9 pages.
Canadian IPO Office Action dated Aug. 21, 2024, Application No. 3, 190,899, 8 pages.

(56) References Cited

OTHER PUBLICATIONS

Intellectual Property Office of Singapore, "Search Report and Written Opinion" in Application No. 10202108884Y, Jul. 18, 2024, 8 pages.
Intellectual Property Office of Singapore, "Search Report and Written Opinion" in Application No. 10202108884Y, Sep. 9, 2022, 10 pages.
Japanese Final Decision of Rejection for Patent Application No. 2023-094952 dated Mar. 11, 2025, 3 pages.
Canadian IPO Office Action dated Feb. 24, 2025, Application No. 3,190,899, 6 pages.
Canadian Notice of Allowance of Patent Application No. 3, 173,681 dated May 8, 2025, 1 page.
European Communication Under Rule 71 (3) EPC for Application No. 19203674.7, Intention to Grant, dated May 16, 2025, 127 pages.

\* cited by examiner

| KeyID | Key Version | Usability | Counter |
|---|---|---|---|
| ⋮ | ⋮ | ⋮ | ⋮ |
| 31415926 | 1 | Retired | 4294967296 |
| 31415926 | 2 | Retired | 4294967296 |
| 31415926 | 3 | Retired | 4294967296 |
| 31415926 | 4 | Active | 1048576 |
| 31415927 | 1 | Active | 2097152 |
| ⋮ | ⋮ | ⋮ | ⋮ |

FIG. 28

FEDERATED KEY MANAGEMENT

CROSS-REFERENCE TO RELATED APPLICATIONS

This application is a continuation of U.S. patent application Ser. No. 16/869,423, filed May 7, 2020, now issued as U.S. Pat. No. 11,695,555, entitled "FEDERATED KEY MANAGEMENT," which is a continuation of U.S. patent application Ser. No. 15/376,451, filed Dec. 12, 2016, now issued as U.S. Pat. No. 10,666,436, entitled "FEDERATED KEY MANAGEMENT," which is a division of U.S. patent application Ser. No. 13/765,209, filed Feb. 12, 2013, now issued as U.S. Pat. No. 9,705,674, entitled "FEDERATED KEY MANAGEMENT," the full disclosures of which are incorporated by reference for all purposes herein. This application also incorporates by reference for all purposes the full disclosures of U.S. patent application Ser. No. 13/764,944, filed Feb. 12, 2013, now issued as U.S. Pat. No. 10,467,422, entitled "AUTOMATIC KEY ROTATION," U.S. patent application Ser. No. 13/764,963, filed Feb. 12, 2013, now issued as U.S. Pat. No. 9,590,959, entitled "DATA SECURITY SERVICE," U.S. patent application Ser. No. 13/765,020, filed Feb. 12, 2013, now issued as U.S. Pat. No. 9,367,697, entitled "DATA SECURITY WITH A SECURITY MODULE," U.S. patent application Ser. No. 13/764,995, filed Feb. 12, 2013, now issued as U.S. Pat. No. 9,547,771, entitled "POLICY ENFORCEMENT WITH ASSOCIATED DATA," U.S. patent application Ser. No. 13/765,239, filed Feb. 12, 2013, now issued as U.S. Pat. No. 10,210,341, entitled "DELAYED DATA ACCESS," U.S. patent application Ser. No. 13/764,963, filed Feb. 12, 2013, now issued as U.S. Pat. No. 9,590,959, entitled "DATA SECURITY SERVICE," and U.S. patent application Ser. No. 13/765,283, filed Feb. 12, 2013, now issued as U.S. Pat. No. 10,211,977, entitled "SECURE MANAGEMENT OF INFORMATION USING A SECURITY MODULE."

BRIEF DESCRIPTION OF THE DRAWINGS

Various embodiments in accordance with the present disclosure will be described with reference to the drawings, in which:

FIG. 28 shows an illustrative example of a representation of a database that may be used to track key use in accordance with at least one embodiment;

DETAILED DESCRIPTION

Figure 1:
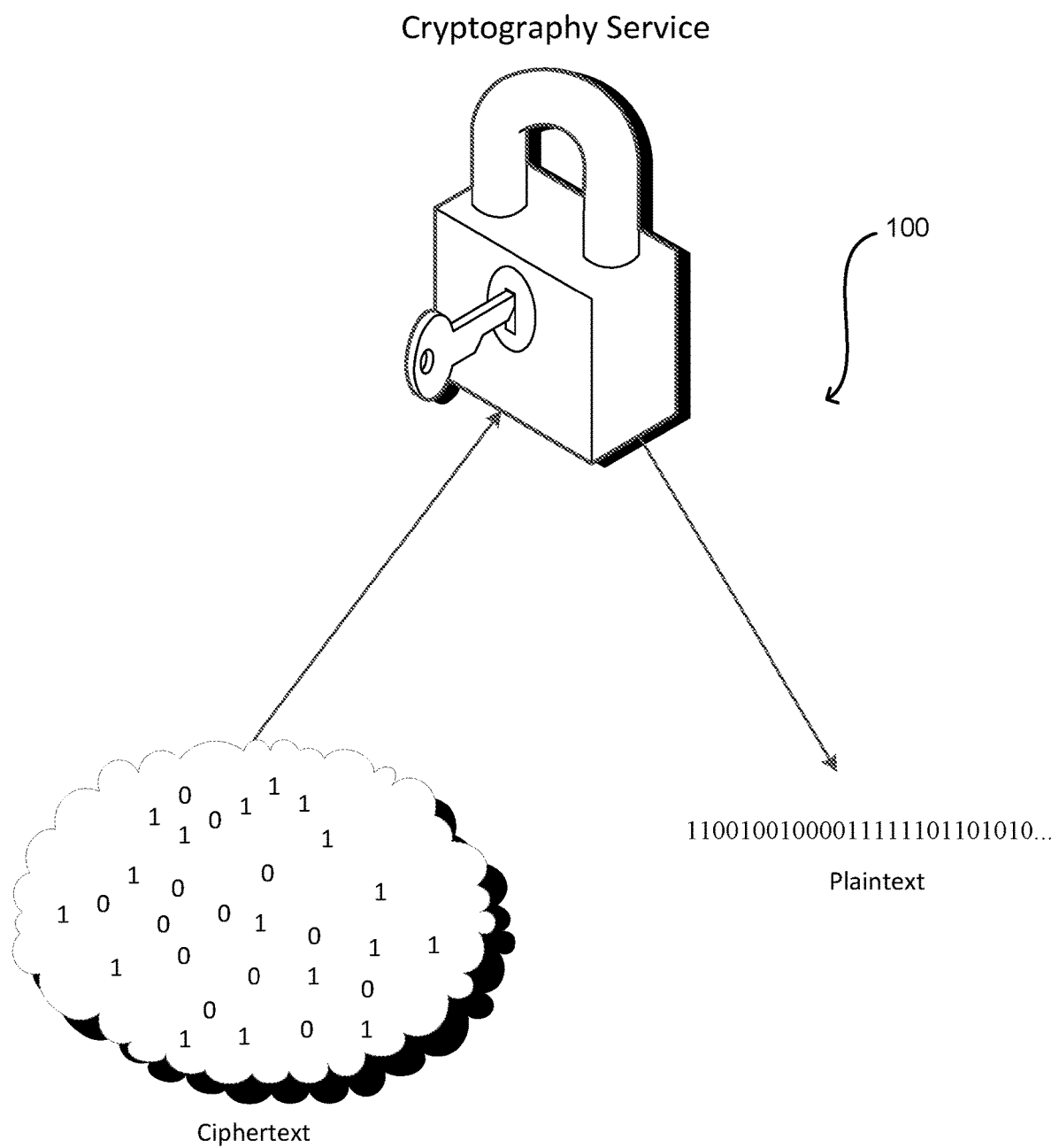
FIG. 1 shows an illustrative diagram representing various aspects of the present disclosure in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein allow for enhanced data security in environments involving distributed computing resources. In one example, a distributed computing environment includes one or more data services which may be implemented by appropriate computing resources. The data services may allow various operations to be performed in connection with data. As one illustrative example, the distributed computing environment includes one or more data storage services. Electronic requests may be transmitted to the data storage service to perform data storage operations. Example operations are operations to store data using the data storage service and using the data storage service to retrieve data stored by the data storage service. Data services, including data storage services, may also perform operations that manipulate data. For example, in some embodiments, a data storage service is able to encrypt data.

Various embodiments of the present disclosure include distributed computing environments that include cryptography services that are implemented using appropriate computing resources. A cryptography service may be implemented by a distributed system that receives and responds to electronic requests to perform cryptographic operations, such as encryption of plaintext and decryption of ciphertext. In some embodiments, a cryptography service manages keys. In response to a request to perform a cryptographic operation, the cryptography service may execute cryptographic operations that use the managed keys. For example, the cryptography service can select an appropriate key to perform the cryptographic operation, perform the cryptographic operation, and provide one or more results of the cryptographic operation in response to the received request. In an alternative configuration, the cryptography service can produce an envelope key (e.g., a session key that is used to encrypt specific data items) and return the envelope key to the system invoking the cryptographic operations of the service. The system can then use the envelope key to perform the cryptographic operation.

In some embodiments, the cryptography service manages keys for multiple tenants of a computing resource service provider. A tenant of the computing resource may be an entity (e.g., organization or individual) operating as a customer of the computing resource provider. The customer may remotely and programmatically configure and operate resources that are physically hosted by the computing resource provider. When a customer submits a request to the cryptography service to perform a cryptographic operation (or when an entity submits a request to the cryptography service), the cryptography service may select a key managed by the cryptography service for the customer to perform the cryptographic operation. The keys managed by the cryptography service may be securely managed so that other users and/or data services do not have access to the keys of others. A lack of access by an entity (e.g., user, customer, service) to the key of another entity may mean that the entity does not have an authorized way of obtaining the key of the other and/or that the entity does not have an authorized way of causing a system that manages the key of the other of using the key at the entity's direction. For example, the cryptography service may manage keys so that, for a customer, other customers both do not have access to the customer's key(s) and are unable to cause the cryptography service to use the customer's key(s) to perform cryptographic operations. As another example, the cryptography service may manage keys so that other services, such as a data storage service, are unable to cause the cryptography service to use some or all keys to perform cryptographic operations. Unauthorized access to a key may be prevented by appropriate security measures so that, for example, unauthorized access is difficult or impossible. Difficulty may be due to computational impracticality and/or due to a need for an unauthorized (e.g., illegal, tortious, and/or otherwise disallowed such as a. compromise of authorization credentials) to occur for access to be gained. Systems in accordance with the various embodiments may be configured to ensure an objective measure of computational impracticality to gain access to a key. Such measures may be, for example, measured in terms of an amount of time, on average, it would take a computer having a defined unit of computational ability (e.g., certain operations per unit of time) to crack encrypted information needed for authorized access to the key.

As noted, a cryptography service may receive requests from various entities, such as customers of a computing resource provider. A cryptography service may also receive requests from entities internal to the computing resource provider. For example, in some embodiments, data services implemented by the computing resource provider may transmit requests to a cryptography service to cause the cryptography service to perform cryptographic operations. As one example, a customer may transmit a request to a data storage service to store a data object. The request may indicate that the data object should be encrypted when stored. The data storage service may communicate a request to a cryptography service to perform a cryptographic operation. The cryptographic operation may be, for example, encryption of a key used by the data storage service to encrypt the data object. The cryptographic operation may be encryption of the data object itself. The cryptographic operation may be to generate an envelope key that the data storage service can use to encrypt the data object.

Systems in accordance with the various embodiments implement various security measures to provide enhanced data security. For example, in various embodiments, the manner in which a cryptography service can utilize keys it manages is limited. For example, in some embodiments, a cryptography service is configured to only use a key corresponding to a customer upon appropriate authorization. If a request to use a customer's key purportedly originates from the customer (i.e., from a computing device operating on behalf of the customer), the cryptography service may be configured to require that the request be electronically (digitally) signed using appropriate credentials owned by the customer. If the request to use the customer's key originated from another data service, the cryptography service may be configured to require that the data service provide proof that a signed request to the data service has been made by the customer. In some embodiments, for example, the data service is configured to obtain and provide a token that serves as proof of an authenticated customer request. Other security measures may also be built into a configuration of an electronic environment that includes a cryptography service. For example, in some embodiments, a cryptography service is configured to limit key use according to context. As one illustrative example, the cryptography service may be configured to use a key for encryption for requests from a customer or from a data service acting on behalf of the customer. However, the cryptography service may be configured to only use a key for decryption for requests from the customer (but not from another data service). In this manner, if the data service is compromised, the data service would not be able to cause the cryptography service to decrypt data.

Various security measures may be built into a cryptography service and/or its electronic environment. Some security measures may be managed according to policies which, in some embodiments, are configurable. As one example, a cryptography service may utilize an application programming interface (API) that enables users to configure policies on keys. A policy on a key may be information that, when processed by a cryptography service, is determinative of whether the key may be used in certain circumstances. A policy may, for instance, limit identities of users and/or systems able to direct use of the key, limit times when the key can be used, limit data on which the key can be used to perform cryptographic operations on, and provide other limitations. The policies may provide explicit limitations (e.g., who cannot use the keys) and/or may provide explicit authorizations (e.g., who can use the keys). Further, policies may be complexly structured to generally provide conditions for when keys can and cannot be used. When a request to perform a cryptographic operation using a key is received, any policies on the key may be accessed and processed to determine if the request can, according to policy, be fulfilled.

Various embodiments of the present disclosure are related to the enforcement of policy associated with keys, where the keys may be managed by a cryptography service. Users of the cryptography service, such as customers of a computing resource provider hosting the cryptography service, may specify policies on keys to be enforced by the cryptography service. The policies may encode restrictions and/or privileges in connection with who can direct the cryptography service to use the keys, what operations the keys can be used to perform, in which circumstances the key can be used and/or other key uses.

In an embodiment, data associated with ciphertext is used in the enforcement of policy. The data associated with the ciphertext may be data that is obtained through use of a cipher, such as modes of the advanced encryption standard (AES). For example, input to a cryptographic algorithm may include plaintext to be encrypted and associated data. The cryptographic algorithm may use a key to encrypt the plaintext and provide authentication output, such as a message authentication code (MAC) that enables a determination whether the associated data has been altered. The authentication output may be determined based at least in part on the associated data and the plaintext.

Policy enforcement may be based at least in part on associated data. For example, some policies may require associated data to have a particular value before decrypted ciphertext (i.e., plaintext) is provided. The authentication output (e.g., MAC) may be used to ensure that the associated data has not been altered and, therefore, that enforcement of the policy is performed correctly. The associated data may be any suitable data, and the data itself may be specified explicitly or implicitly by policy. For example, a policy may specify that decrypted ciphertext (plaintext) can be provided only if a request to decrypt the ciphertext is submitted by a user having a user identifier encoded in associated data used to encrypt the ciphertext. In this manner, if another user requests decryption of the ciphertext (without impersonating the user having the user identifier), the request will not be fulfilled due to a conflict with policy. As another example, a policy may state that decrypted ciphertext can be provided only if the ciphertext is tagged with specified information. As yet another example, a policy may state that decrypted ciphertext may be provided if tagged with associated data equal to a hash of the plaintext, hash of the ciphertext, or other specified values. Generally, embodiments of the present disclosure allow for rich policy enforcement around the input or output of a cryptographic algorithm before output of the cryptographic algorithm is revealed. In some embodiments, associated data can itself represent policy.

Various embodiments of the present disclosure also allow for policy around key use. For instance, in some embodiments, keys are automatically rotated to prevent the keys from being used enough time to enable successful cryptographic attacks that can reveal the keys. To prevent a key from being used enough times to result in a potential security breach, a cryptography service or other system utilizing keys may track operations performed with keys. When a key identified by a key identifier (KeyID) is used in a threshold number of operations, the key may be retired (e.g., unusable for future encryption operations, but usable for future decryption operations) and replaced with a new key to be identified by the KeyID. In this manner, new keys are produced in a timely basis. Further, various embodiments of the present disclosure perform such key rotation in a manner that is transparent to certain entities. As one example, a customer of a computing resource provider or other entity may submit requests to a cryptography service to perform operations using a key identified by a KeyID. The cryptography service may perform key rotation independent of any request from the entity to perform the key rotation. From the point of view of the customer or other entity, requests may still be submitted using a specified KeyID without any reprogramming or other reconfiguration necessary due to a key having been retired and replaced with a new key.

In some embodiments, multiple systems supporting a cryptography or other service simultaneously have access to keys and are used to fulfill requests to perform cryptographic operations. For example, a cryptography service may utilize a cluster of security modules, at least some of which redundantly store one or more keys. The service may allocate operations to the security modules and maintain its own counter. When a security module uses its allocation (e.g., performs an allocated number of operations using a key), the service may check whether the key is still usable or whether the key should be retired. It should be noted that security modules (or other computer systems) may be configured to perform multiple types of operations using a key, such as encryption, decryption, electronic signature generation, and the like. In some embodiments, not all types of operations cause a security module to use a portion of an allocation of operations. For example, decryption operations may not result in allocated operations being used whereas encryption operations may result in allocated operations used. Generally, in various embodiments, cryptographic operations that result in generation of new information (e.g., ciphertexts and/or electronic signatures) may result in allocated operations being used whereas cryptographic operations that do not result in the generation of new information may not result in allocated operations being used. Further, different types of operations may result in different numbers of cryptographic operations being performed. As one example, encryption of plaintexts may vary in the amount of cryptographic operations required based at least in part on the size of the plaintexts. Use of block ciphers, for instance, may cause an allocated cryptographic operation to be used for each block of ciphertext generated.

If a total number of operations available for a key is still usable, the service may allocate additional operations to the security module. If the key should be retired (e.g., because a counter so indicates), the service may cause security modules that redundantly store the key to retire the key and replace the key with a new key, where the new key may be generated or otherwise obtained by one security module and securely passed to the remaining security modules. In some embodiments, other security modules instead use up their allocated operations under the older key. If a security module malfunctions, becomes inoperable, is intentionally taken offline (e.g., for maintenance) and/or otherwise becomes unavailable for performing cryptographic operations without providing information regarding how many operations it has performed using one or more keys, the service may treat the unavailability as use of its allocation. For example, if a security module is allocated one million operations for each key in a set of keys, and the security module becomes inoperable, the service may operate as if the security module performed one million operations for each of the set of keys. For example, the service may allocate additional operations to the security module or another security module, adjusting a counter accordingly, and/or may cause one or more of the keys to be retired and replaced, should corresponding counters indicate that replacement is necessary.

Embodiments of the present disclosure also allow for enhanced data security through annotations and/or federated key management techniques. In some embodiments, requests submitted to a service (such as a cryptography service or other data service) may include or otherwise be associated with an annotation (referred to also as a key access annotation) containing information that enables enforcement of policy. In an embodiment, the key access annotation must satisfy one or more conditions before a corresponding request can be fulfilled. In some embodiments, the one or more conditions include a condition that the annotation be electronically signed using a key that is associated with a KeyID, where the KeyID identifies a different key usable for fulfilling the request. The presence of a valid electronic signature may both indicate that the information in the annotation has not been modified and also prove possession of the key used to generate the electronic signature.

In some embodiments, a key access annotation may include an identifier of a holder of a key usable to fulfill the request. The holder of the key may be an entity hosting a system that receives the request or may be another system, such as a system of a third party. A system receiving the request may detect the presence of the identifier and, as appropriate according to the identifier, either process the request itself or transmit the request to the identified key holder for processing. The entity receiving the request and/or the key holder may verify the electronic signature for the enforcement of policy, such as described above and elsewhere herein. For example, if the electronic signature is not valid, the receiver of the request may not pass the request on to a key holder identified in the annotation. Similarly, the key holder may deny the request should it determine that the electronic signature be invalid. The entity receiving the request and the key holder may verify the same electronic signature or, in some embodiments, the request includes at least two signatures, one for the receiver of the request and one for the key holder. Each signature may be generated using a key corresponding to the entity intended to verify the signature.

Embodiments of the present disclosure also allow for enhanced data security through forced delays before certain types of requests are fulfilled. For instance, in some embodiments, decryption of certain data requires a delay before plaintext is provided in response to a corresponding request. During the delay, various actions may be taken to notify interested parties of the pending request to decrypt the information. In this manner, interested parties (e.g., a compliance officer of an organization or other person authorized to allow the plaintext to be provided) are provided an opportunity to cancel the request before plaintext is provided. In various embodiments a request is easily cancelled. For example, the requirements for canceling the request may be less stringent than the requirements for the request to be fulfilled. In this manner, unauthorized data leaks are easily detectable and/or preventable.

FIG. 1 is an illustrative diagram 100 demonstrating various embodiments of the present disclosure. In an embodiment, a cryptography service performs cryptographic operations which may include application of one or more calculations in accordance with one or more cryptographic algorithms. As illustrated in FIG. 1, the cryptography service enables a user or a service to generate plaintext from ciphertext. In an example configuration the cryptographic service can be used to encrypt/decrypt keys and these keys can be used to encrypt/decrypt data, such as data stored in a data storage service. For example, the cryptography service receives a request to generate plaintext from ciphertext encrypted under a key. The cryptography service determines that the requestor is an authorized entity; decrypts the key using a master key and returns the now decrypted key to the service, which can generate plaintext from the ciphertext using the decrypted key. In another configuration, the cryptography service receives ciphertext and processes the received ciphertext into plaintext which is provided as a service by the cryptography service. In this example, the ciphertext may be provided to the cryptography service as part of an electronic request to the cryptography service from an authorized entity, which may be a customer of a computing resource provider that operates the cryptography service and/or which may be another service of the computing resource provider. The cryptography service illustrated in FIG. 1 may utilize one or more cryptographically strong algorithms to encrypt data. Such cryptographically strong algorithms may include, for example, Advanced Encryption Standard (AES), Blowfish, Data Encryption Standard (DES), Triple DES, Serpent, or Twofish, and depending on the specific implementation selected, may be either asymmetric or symmetric key systems. Generally, the cryptography service may utilize any encryption and/or decryption algorithm (cipher) or combination of algorithms that utilizes data managed by the cryptography service.

As will be discussed below in more detail, the cryptography service can be implemented in a variety of ways. In an embodiment, the cryptography service is implemented by a computer system configured in accordance with the description below. The computer system may itself comprise one or more computer systems. For example, a cryptography service may be implemented as a network of computer systems collectively configured to perform cryptographic operations in accordance with the various embodiments. Or put another way, the computer system could be a distributed system. In an embodiment, ciphertext is information that has been encrypted using a cryptographic algorithm. In the example of FIG. 1, the ciphertext is the plaintext in an encrypted form. The plaintext may be any information and while the name includes no word text, plaintext and ciphertext may be information encoded in any suitable form and does not necessarily include textual information but it may include textual information. For example, as illustrated in FIG. 1, plan text and ciphertext comprise sequences of bits. Plaintext and ciphertext may also be represented in other ways and generally in any manner by which encryption and decryption can be performed by a computer system.

Figure 2:
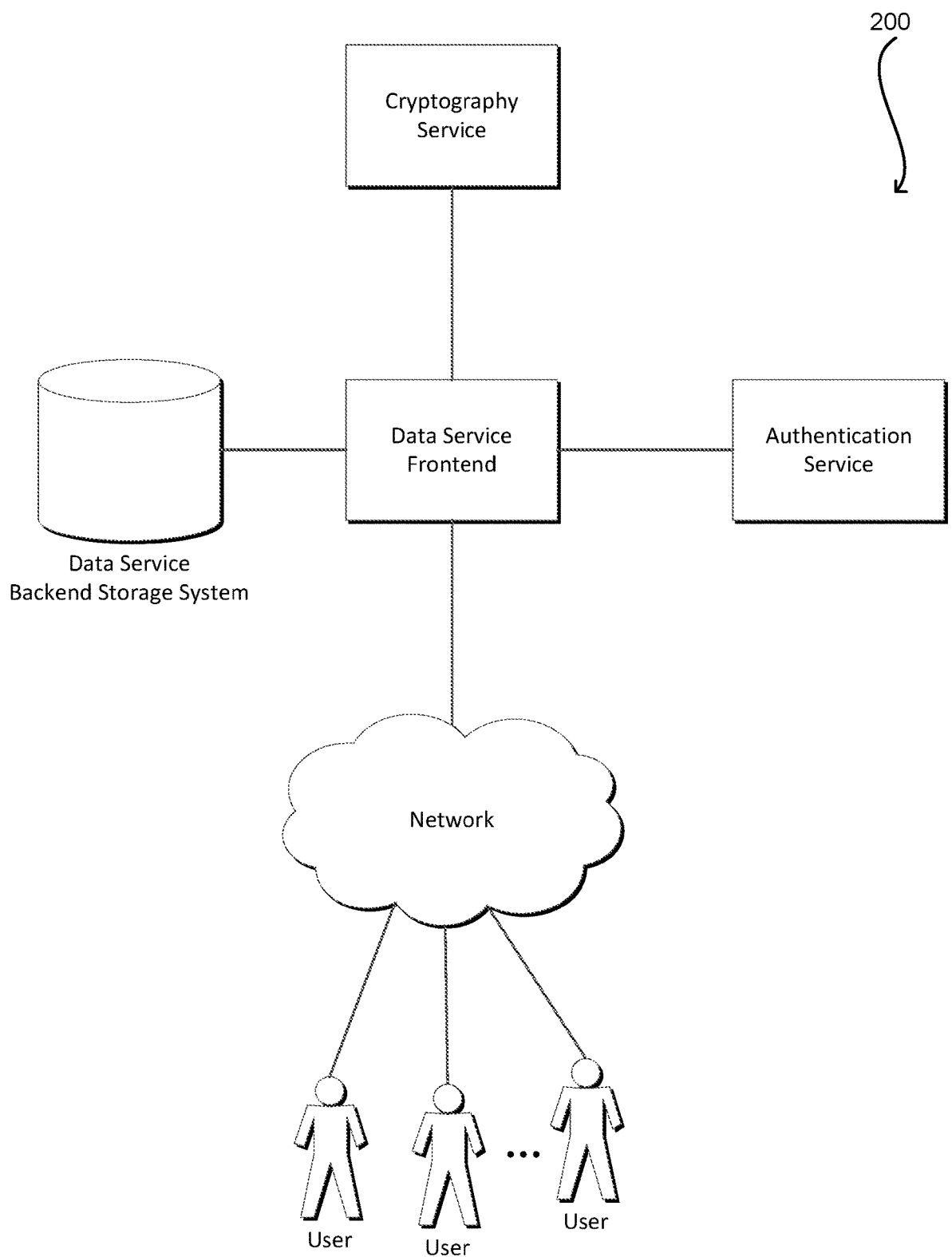
FIG. 2 shows an illustrative example of an environment in which various aspects of the present disclosure may be implemented.

FIG. 2 shows an illustrative example of an environment 200 in which a cryptography service, such as illustrated in FIG. 1, may be implemented. In the environment of 200, various components operate together in order to provide secure data related services. In this particular example, the environment 200 includes a cryptography service, an authentication service, a data service frontend and a data service backend storage system. In an embodiment, the cryptography service is configured in the environment 200 to perform cryptographic operations, such as by receiving plaintext from a data service frontend and providing ciphertext in return or providing envelope keys to services, so that the services can use the envelope keys to perform encryption operations. The cryptography service may perform additional functions, such as described below, such as secure storage of keys for performance of cryptographic operations, such as converting plaintext into ciphertext and decrypting ciphertext into plaintext. The cryptography service may also perform operations involved in policy enforcement, such as by enforcing policy associated with keys stored therein. Example policies that may be enforced by a cryptography service are provided below. The data service frontend in an embodiment is a system configured to receive and respond to requests transmitted over a network from various users. The requests may be requests to perform operations in connection with data stored or to be stored in the data service backend storage system. In the environment 200, the authentication service, cryptography service, data service frontend and data service backend storage system may be systems of a computing resource provider that utilizes the systems to provide services to customers represented by the users illustrated in FIG. 2. The network illustrated in FIG. 2 may be any suitable network or combination of networks, including those discussed below.

The authentication service in an embodiment is a computer system configured to perform operations involved in authentication of the users. For instance, the data service frontend may provide information from the users to the authentication service to receive information in return that indicates whether or not the user requests are authentic. Determining whether user requests are authentic may be performed in any suitable manner and the manner in which authentication is performed may vary among the various embodiments. For example, in some embodiments, users electronically sign messages transmitted to the data service frontend. Electronic signatures may be generated using secret information (e.g., a private key of a key pair associated with a user) that is available to both an authenticating entity (e.g., user) and the authentication service. The request and signatures for the request may be provided to the authentication service which may, using the secret information, compute a reference signature for comparison with the received signature to determine whether the request is authentic. If the request is authentic, the authentication service may provide information that the data service frontend can use to prove to other services, such as the cryptography service, that the request is authentic, thereby enabling the other services to operate accordingly. For example, the authentication service may provide a token that another service can analyze to verify the authenticity of the request. Electronic signatures and/or tokens may have validity that is limited in various ways. For example, electronic signatures and/or tokens may be valid for certain amounts of time. In one example, electronic signatures and/or tokens are generated based at least in part on a function (e.g., a Hash-based Message Authentication Code) that takes as input a timestamp, which is included with the electronic signatures and/or tokens for verification. An entity verifying a submitted electronic signature and/or token may check that a received timestamp is sufficiently current (e.g., within a predetermined amount of time from a current time) and generate a reference signature/token using for the received timestamp. If the timestamp used to generate the submitted electronic signature/token is not sufficiently current and/or the submitted signature/token and reference signature/token do not match, authentication may fail. In this manner, if an electronic signature is compromised, it would only be valid for a short amount of time, thereby limiting potential harm caused by the compromise. It should be noted that other ways of verifying authenticity are also considered as being within the scope of the present disclosure.

The data service backend storage system in an embodiment is a computer system that stores data in accordance with requests received through the data service frontend. As discussed in more detail below, the data service backend storage system may store data in encrypted form. Data in the data service backend storage system may also be stored in unencrypted form. In some embodiments, an API implemented by the data service frontend allows requests to specify whether data to be stored in the data service backend storage system should be encrypted. Data that is encrypted and stored in the data service backend storage system may be encrypted in various ways in accordance with the various embodiments. For example, in various embodiments, data is encrypted using keys accessible to the cryptography service, but inaccessible to some or all other systems of the environment 200. Data may be encoded by the cryptography service for storage in the data service backend storage system and/or, in some embodiments, data may be encrypted by another system, such as a user system or a system of the data service frontend, using a key that was decrypted by the cryptography service. Examples of various ways by which the environment 200 may operate to encrypt data are provided below.

Numerous variations of the environment 200 (and other environments described herein) are considered as being within the scope of the present disclosure. For example, the environment 200 may include additional services that may communicate with the cryptography service and/or authentication service. For example, the environment 200 may include additional data storage services (which may each comprise a frontend system and a backend system) which may store data in different ways. For instance, one data storage service may provide active access to data where the data storage service performs data storage services in a synchronous manner (e.g., a request to retrieve data may receive a synchronous response with the retrieved data). Another data storage service may provide archival data storage services. Such an archival data storage service may utilize asynchronous request processing. For example, a request to retrieve data may not receive a synchronous response that includes the retrieved data. Rather, the archival data storage service may require a second request to be submitted to obtain the retrieved data once the archival data storage service is ready to provide the retrieved data. As another example, the environment 200 may include a metering service which receives information from the cryptography service (and/or other services) and uses that information to produce accounting records. The accounting records may be used to bill customers for usage of the cryptography service (and/or other services). Further, information from the cryptography service may provide an indication of how charges should be incurred. For instance, in some instances customers may be provided bills for use of the cryptography service. In other instances, charges for use of the cryptography service may be rolled into usage charges of other services, such as a data service that utilizes the cryptography service as part of its operations. Usage may be metered and billed in various ways, such as per operation, per period of time, and/or in other ways. Other data services may also be included in the environment 200 (or other environments described herein).

In addition, FIG. 2 depicts users interacting with the data service frontend. It should be understood that users may interact with the data service frontend through user devices (e.g., computers) which are not illustrated in the figure. Further, the users depicted in FIG. 2 (and elsewhere in the figures) may also represent non-human entities. For example, automated processes executing on computer systems may interact with the data service frontend as described herein. As one illustrative example, an entity represented by a user in FIG. 2 may be a server that, as part of its operations, uses the data service frontend to store and/or retrieve data to/from the data service backend storage system. As yet another example, an entity represented by a user in FIG. 2 may be an entity provided as a service of a computing resource provider that operates one or more of the services in FIG. 2. For instance, a user in FIG. 2 may represent a virtual or other computer system of a program execution service offered by the computing resource provider. Other variations, including variations of other environments described below, are also considered as being within the scope of the present disclosure.

Figure 3:
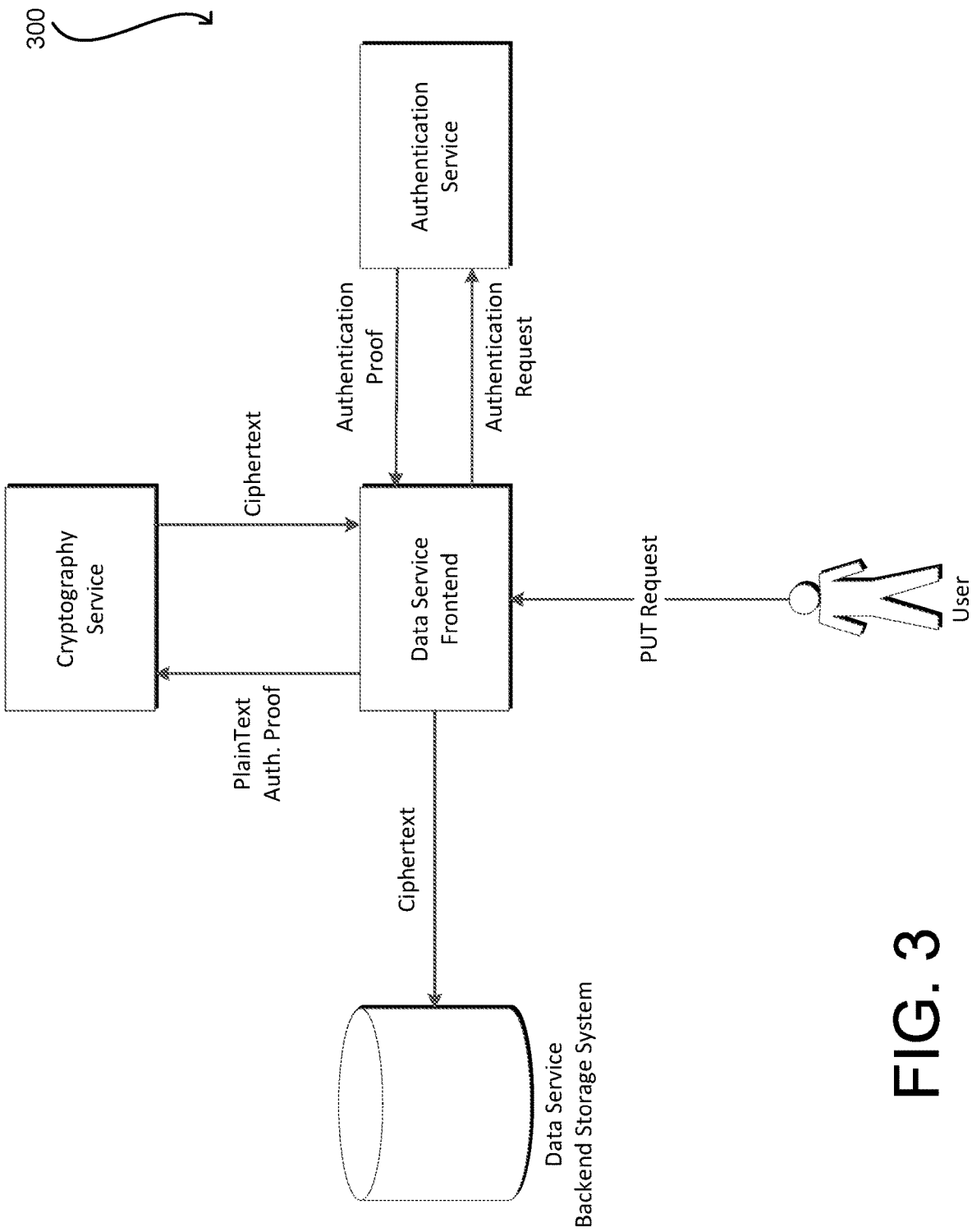
FIG. 3 shows an illustrative example of an environment in which various aspects of the present disclosure may be implemented and an example flow of information among the various components of the environment in accordance with at least one embodiment.

For example, FIG. 3 shows an illustrative example of an environment 300 in which various embodiments of the present disclosure may be implemented. As with FIG. 2, the environment in FIG. 3 includes an authentication service, a data service frontend system (data service front end), a cryptography service and a data service backend storage system. The authentication service, data service frontend, cryptography service and data service backend storage system may be configured such as described above in connection with FIG. 2. For example, users may access the data service frontend through a suitable communications network, although such network is not illustrated in the figure. In the example environment 300 illustrated in FIG. 3, arrows representing a flow of information are provided. In this example, a user transmits a PUT request to the data service frontend. The PUT request may be a request to store specified data in the data service backend storage system. In response to the PUT request, the data service frontend may determine whether the PUT request is authentic, that is if the user has submitted the request in the manner the requested operation can be performed in accordance with authentication policy implemented by the system.

In FIG. 3, an illustrative example of how such authentication decisions may be made is illustrated. In this particular example, the data service frontend submits an authentication request to the authentication service. The authentication service may use the authentication request to determine if the PUT request from the user is authentic. If the request is authentic, the authentication service may provide authentication proof to the data service frontend. The authentication proof may be an electronic token or other information that is usable by another service, such as the cryptography service, to independently determine that an authentic request was received. In one illustrative example, the PUT request is transmitted with a signature for the PUT request. The PUT request and its signature are provided through the authentication service, which independently computes what a signature should be if authentic. If the signature generated by the authentication service matches that signature provided by the user, the authentication service may determine that the PUT request was authentic and may provide authentication proof in response. Determining whether the PUT request is authentic may also include one or more operations in connection with the enforcement of policy. For example, if the signature is valid but policy otherwise indicates that the PUT request should not be completed (e.g., the request was submitted during a time disallowed by policy), the authentication service may provide information indicating that the request is not authentic. (It should be noted, however, that such policy enforcement may be performed by other components of the environment 300.) The authentication service may generate the signature, such as by using a key shared by the authentication service and the user. The authentication proof, as noted, may be information from which another service, such as the cryptography service, can independently verify that a request is authentic. For example, using the example of the cryptography service illustrated in FIG. 3, the authentication proof may be generated based at least in part on a key shared by both the authentication service and the cryptography service, such as a key that is inaccessible to other services.

As illustrated in FIG. 3, the data service frontend, upon receipt of authentication proof from the authentication service, provides plaintext and authentication proof to the cryptography service. The plaintext and authentication proof may be provided according to an API call or other electronic request to the cryptography service (e.g., an Encrypt API call). The cryptography service may analyze the authentication proof to determine whether to encrypt the plaintext.

It should be noted that additional information may be provided to the cryptography service. For example, an identifier of a key to be used to encrypt the plaintext may be provided as an input parameter to the API call from the data service frontend (which, in turn, may have received the identifier from the user). However, it should be noted that an identifier may not be transmitted to the cryptography service. For instance, in various embodiments, it may be otherwise determinable which key to use to encrypt the plaintext. For example, information transmitted from the data service frontend to the cryptography service may include information associated with the user, such as an identifier of the user and/or an organization associated with the user, such as an identifier of a customer on behalf of which the user has submitted the PUT request. Such information may be used by the cryptography service to determine a default key to be used. In other words, the key may be implicitly specified by information that is usable to determine the key. Generally, determination of the key to be used may be performed in any suitable manner. Further, in some embodiments, the cryptography service may generate or select a key and provide an identifier of the generated or selected key to be used later. Another example API parameter can be an identifier for a master key for the customer account the encryption operation is being performed for.

As illustrated in FIG. 3, if the authentication proof is sufficient to the cryptography service for the plaintext to be encrypted, the cryptography service can perform one or more cryptographic operations. In an embodiment, the one or more cryptographic operations can include an operation to generate an envelope key to be used to encrypt the plaintext. The envelope key can be a randomly generated symmetric key or a private key of a key pair. After the envelope key is generated, the cryptographic service can encrypt the envelope key with the master key specified in the API call and cause the encrypted envelope key to be persistently stored (e.g., by storing the encrypted key in a storage service or some other durable storage) or discarded. In addition, the cryptographic service can send a plaintext version of the envelope key as well as and the encrypted envelope key to the data service frontend. The data service can then use the plaintext version of the envelope key to encrypt the plaintext (i.e., the data associated with the encryption request) and cause the envelope key to be stored in persistent storage in association with an identifier for the master key used to encrypt the envelope key. In addition, the data service can discard the plaintext version of the envelope key. As such, in an embodiment after the data service discards the plaintext version of the envelope key it will no longer be able to decrypt the ciphertext.

In an alternative embodiment, the cryptographic operation can involve encrypting the plaintext. For example, the cryptographic service encrypts the plaintext and provides ciphertext to the data service frontend storage system. The data service frontend may then provide the ciphertext to the data service backend storage system for persistent storage in accordance with its operation. Other information may also be transmitted from the data service frontend to the data service backend storage system. For example, an identifier of the key used to encrypt the plaintext to generate ciphertext may be provided with the ciphertext for storage by the data service backend storage system. Other information, such as metadata identifying the user and/or the user's organization, may also be provided.

As with all environments described herein, numerous variations are considered as being within the scope of the present disclosure. For example, the flow of information among the various components of the environment 300 may vary from that which is shown. For example, information flowing from one component to another component through an intermediate component (e.g., data from the authentication service to the cryptography service and/or data from the cryptography service to the data service backend storage system) may be provided directly to its destination and/or through other intermediate components of the environment 300 (which are not necessarily included in the figure). As another example, PUT requests (and, below, GET requests) are provided for the purpose of illustration. However, any suitable request for performing the operations described may be used.

Figure 4:
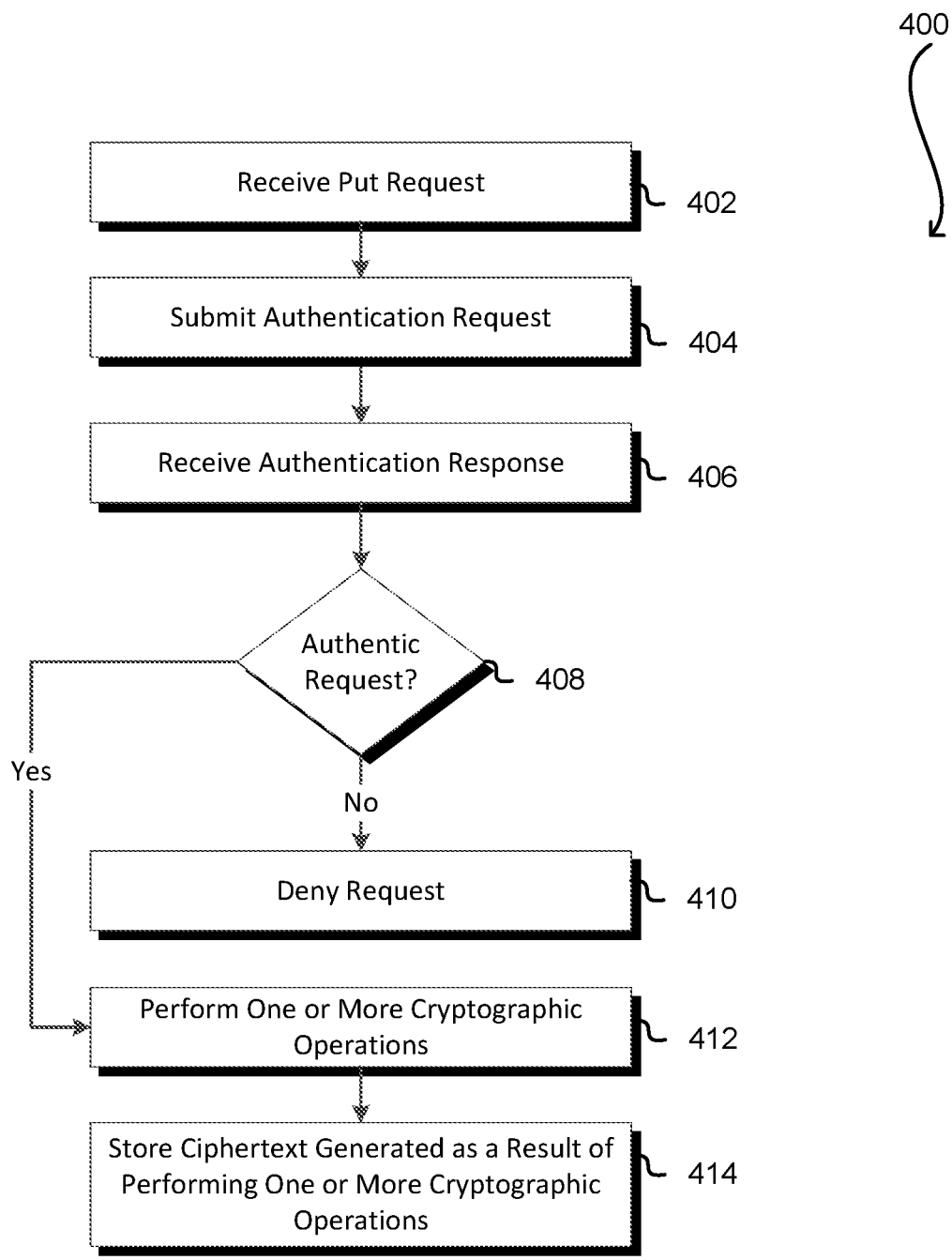
FIG. 4 shows example steps of an illustrative process for storing ciphertext, in accordance with at least one embodiment.

FIG. 4 shows an illustrative example of a process 400 which may be used to store data in a data storage service in accordance with an embodiment. The process 400 may be performed, for example, by the data service frontend illustrated in FIG. 3. Some or all of the process 400 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

As illustrated in FIG. 4, the process 400 includes receiving 402 a PUT request. The PUT request may be electronically received over a network and may include information associated with the request, such as information required for authentication, such as an electronic signature of the PUT request. In response to having received the PUT request, the process 400 may include submitting 404 an authentication request. For example, the system performed in the process 400 may submit (e.g., via an appropriately configured API call) an authentication request to a separate authentication service, such as described above in connection with FIG. 3. Similarly, a data service frontend that performs its own authentication may submit the authentication request to an authentication module implemented by the data service frontend. Generally, the authentication request may be submitted in any suitable manner in accordance with the various embodiments.

Upon submission of the authentication request, an authentication response is received 406 by the entity to which the authentication request was submitted 404. For example, referring to FIG. 3, the authentication service may provide a response to the data service frontend that includes proof of the authentication for use by other services. Other information, such as an indication of whether or not authentication was successful, may also be transmitted. A determination may be made 408 whether the request is authentic. Authenticity of the request may depend from one or more factors checked by an entity, such as by an authentication service, or a combination of entities that collectively perform such checks. Authenticity may, for example, require that the request provide necessary valid credentials (e.g., an electronic signature generated by a secret key shared by the checking entity) and/or that policy allows the request to be fulfilled. From the perspective of a system that submits 404 an authentication request and receives an authentication response, authenticity may depend from the received authentication response. Accordingly, in an embodiment, the determination 408 whether the request is authentic may be performed based at least in part of the received authentication response. For example, if authentication was not authentic, the authentication response so indicates and the determination 408 may be made accordingly. Similarly, the response may implicitly indicate that the authentication request is authentic, such as by not including information that would be included if the request was authentic. If it is determined 408 that the PUT request is not authentic, then the PUT request may be denied 410. Denying the PUT request may be performed in any suitable manner and may depend upon the various embodiments in which the process 400 is being performed. For example, denying 410, the PUT request may include transmitting a message to a user that submitted the PUT request. The message may indicate that the request was denied. Denying the request may also include providing information about why the request was denied, such as an electronic signature not being correct or other reasons that may be used for determining how to resolve any issues that resulted in the PUT request not being authentic or authorized.

If it is determined 408 that the PUT request is authentic and authorized, then, in an embodiment, the process 400 includes performing 412 one or more cryptographic operations that result in the plaintext being encrypted. For example, a request (e.g., an appropriately configured API call) may be submitted to a cryptography service to provide a key to be used for performing the one or more cryptographic operations. The request provided to the cryptography service may be provided with proof of the PUT request being authentic so that the cryptography service can independently determine whether to perform the cryptographic operation (e.g., to encrypt the plaintext and provide ciphertext or generate an envelope key that can be used to encrypt the plaintext). However, in various embodiments, authentication proof may not be provided to the cryptography service and, for example, the cryptography service may operate in accordance with the request that it receives. For example, if the cryptography service receives a request from the data service frontend, the cryptography service may rely on the fact that the data service frontend has already independently verified authentication of the request. In such an embodiment and other embodiments, the data service frontend may authenticate itself with the cryptography service to provide an additional layer of security. The cryptography service may generate or otherwise obtain a key, encrypt the obtained key or otherwise obtain the encrypted key (e.g., from memory), and provide the obtained key and the encrypted obtained key in response to the request. The obtained key may be encrypted using a key identified in the request to the cryptography service. The obtained key may be used to encrypt the plaintext and, after encrypting the plaintext, the obtained key may be discarded (e.g., irrevocably removed from memory). In alternate embodiments, a system performing the process 400 may generate or otherwise obtain the key used to perform the one or more cryptographic operations, provide the obtained key to the cryptography service to be encrypted.

In some embodiments, performing the one or more cryptographic operations may result in ciphertext being generated. Ciphertext generated as a result of one or more cryptographic operations may be stored 414 for possible retrieval at a later time. As noted above, storage of the ciphertext may include storage of additional information that would enable the decryption of the ciphertext at later time. For instance, the ciphertext may be stored with an identifier of a key used to encrypt the plaintext into the ciphertext so that the key having that identifier may later be used to decrypt the ciphertext to obtain the plaintext. Storage of the ciphertext may also be performed in any suitable manner. For example, storage of the ciphertext may be performed by a data service backend storage system, such as described above.

Figure 5:
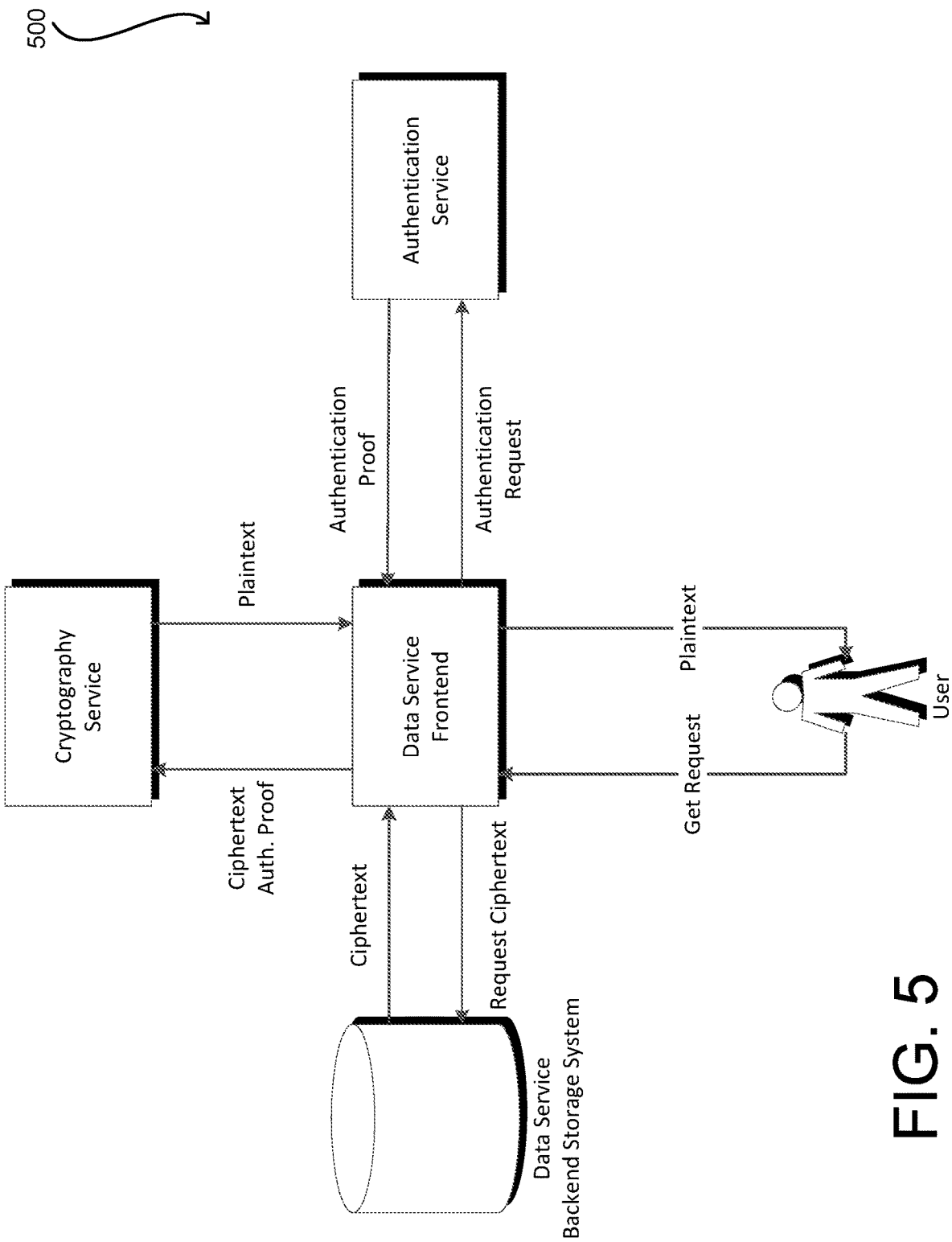
FIG. 5 shows an illustrative example of an environment in which various aspects of the present disclosure may be implemented and an example flow of information among the various components of the environment in accordance with at least one embodiment.

FIG. 5, accordingly, shows an illustrative example of an environment 500 and the flow of information illustrating how plaintext may be obtained. The environment 500 in this example includes an authentication service, a cryptography service, a data service frontend and a data service backend storage system. The authentication service, cryptography service, data service frontend and a data service backend storage system may be systems such as described above. As illustrated in FIG. 5, the data service frontend is configured to receive a GET request from a user and provide plaintext in response. In order to do this, the data service frontend may also be configured to submit authentication requests to an authentication service which itself may be configured to, if appropriate, provide to the data service frontend authentication proof. The data service frontend may also be configured to send a request to the cryptographic service to cause it to execute one or more cryptographic operations related to decrypting the data. In an embodiment where envelope keys are used, the data service can submit a request (e.g., an API call) to the cryptographic service that includes or specifies the encrypted envelope key (or an identifier for the encrypted envelope key) authentication proof, and an identifier of the master key used to encrypt the envelope key to the cryptographic service. The cryptographic service can determine whether the authentication proof is sufficient to allow the operation and, if the authentication proof is sufficient, decrypt the envelope key. The decrypted envelope key can be sent back to the data service, which can use the key to decrypt the encrypted plaintext. The data service can then discard the decrypted plaintext key.

In an alternative embodiment, the data service frontend may be configured to provide the received authentication proof to the cryptography service with ciphertext for the cryptography service to decrypt. The cryptography service may, accordingly, be configured to determine whether the authentication proof is sufficient to allow decryption of the ciphertext and, if the authentication proof is sufficient, decrypt the ciphertext using an appropriate key (which may be identified to the cryptography service by the data service frontend), and provide the decrypted ciphertext (plaintext) to the data service frontend. To provide ciphertext to the cryptography service, the data service frontend may be configured to obtain (e.g., via an appropriately configured API call) the ciphertext from the data service backend storage system.

Figure 6:
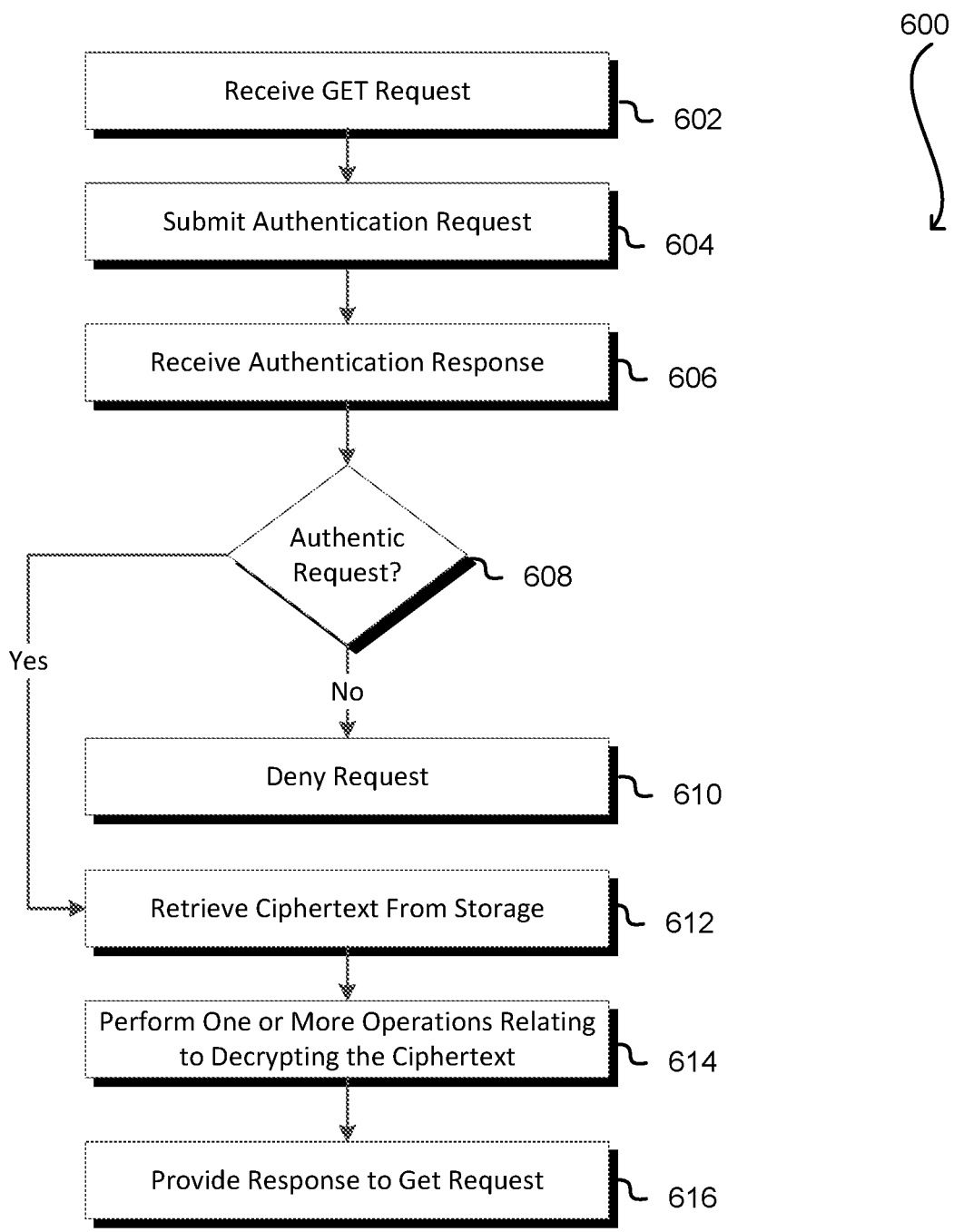
FIG. 6 shows example steps of an illustrative process for responding to a request to retrieve data, in accordance with at least one embodiment.

FIG. 6 shows an illustrative example of a process 600 which may be used to obtain plaintext in accordance with various embodiments. The process 600 may be performed, for example, by the data service frontend system (data service frontend) illustrated above in connection FIG. 5, although the process 600 and variations thereof may be performed by any suitable system. In an embodiment, the process 600 includes receiving 602 a GET request (or other appropriate request) from a user. Receiving the GET request may be performed such as described above in connection with other types of requests. Upon receipt 602 of the GET request, an authentication request may be submitted 604 to an authentication service or in any manner such as described above. An authentication response 606 may, accordingly, be received. Based at least in part on the receive authentication response 606, a determination may be made 608 whether the GET request is authentic. If it is determined 608 that the GET request is not authentic, the process 600 may include denying 610 the request which, as described above, may be performed in various manners in accordance with the various embodiments.

If it is determined 608 that the GET request is authentic, the process 600 may include retrieving ciphertext from storage. Retrieving 612 ciphertext from storage may be performed in any suitable manner. For example, referring to the environment 500 discussed above in connection with FIG. 5, the data service frontend may submit a request for the ciphertext to the data service backend storage system and may receive the ciphertext in response. Generally, ciphertext may be obtained from storage in any suitable manner. Upon receipt of the ciphertext, the process 600 may include performing 614 one or more operations relating to decrypting the ciphertext. For example, in an embodiment, the data storage service may send a request to the cryptographic service to perform one or more cryptographic operations relating to decrypting the ciphertext 614. In one example configuration, the data service can send the cryptographic service an API call that includes the encrypted envelope key (or an identifier for the encrypted envelope key) authentication proof, and an identifier of the master key used to encrypt the envelope key to the cryptographic service. The cryptographic service can determine whether the authentication proof is sufficient to allow the operation and, if the authentication proof is sufficient, decrypt the envelope key. The decrypted envelope key can be sent back to the data service, which can use the key to decrypt the encrypted plaintext.

In another configuration, the ciphertext may be provided to a cryptography service such as the cryptography service described above in connection with FIG. 5. Other information may also be provided to the cryptography service such as proof of authentication that can be used by the cryptography service to determine whether or not to decrypt the ciphertext. In addition, in some embodiments, an identifier of a key to be used by the cryptography service to decrypt the ciphertext may be provided to the cryptography service. However, in other embodiments, the key may be implicitly indicated to the cryptography service. For example, the cryptography service may use a default key associated with a customer that is indicated to the cryptography service. Generally, any manner by which the cryptography service can determine which key to use to decrypt the ciphertext may be used.

As illustrated in FIG. 6, after the ciphertext is decrypted, the process 600 may include providing 616 a response to the GET request. Providing a response to the GET request may be performed in various ways in accordance with the various embodiments. For example, providing the response to the GET request may include providing the plaintext. In other embodiments, the plaintext may be a key that is used to decrypt other encrypted information which is then provided in response to the GET request. Generally, depending on the role of the plaintext in a particular embodiment of the disclosure, providing a response to the GET request may be performed in various ways.

Figure 7:
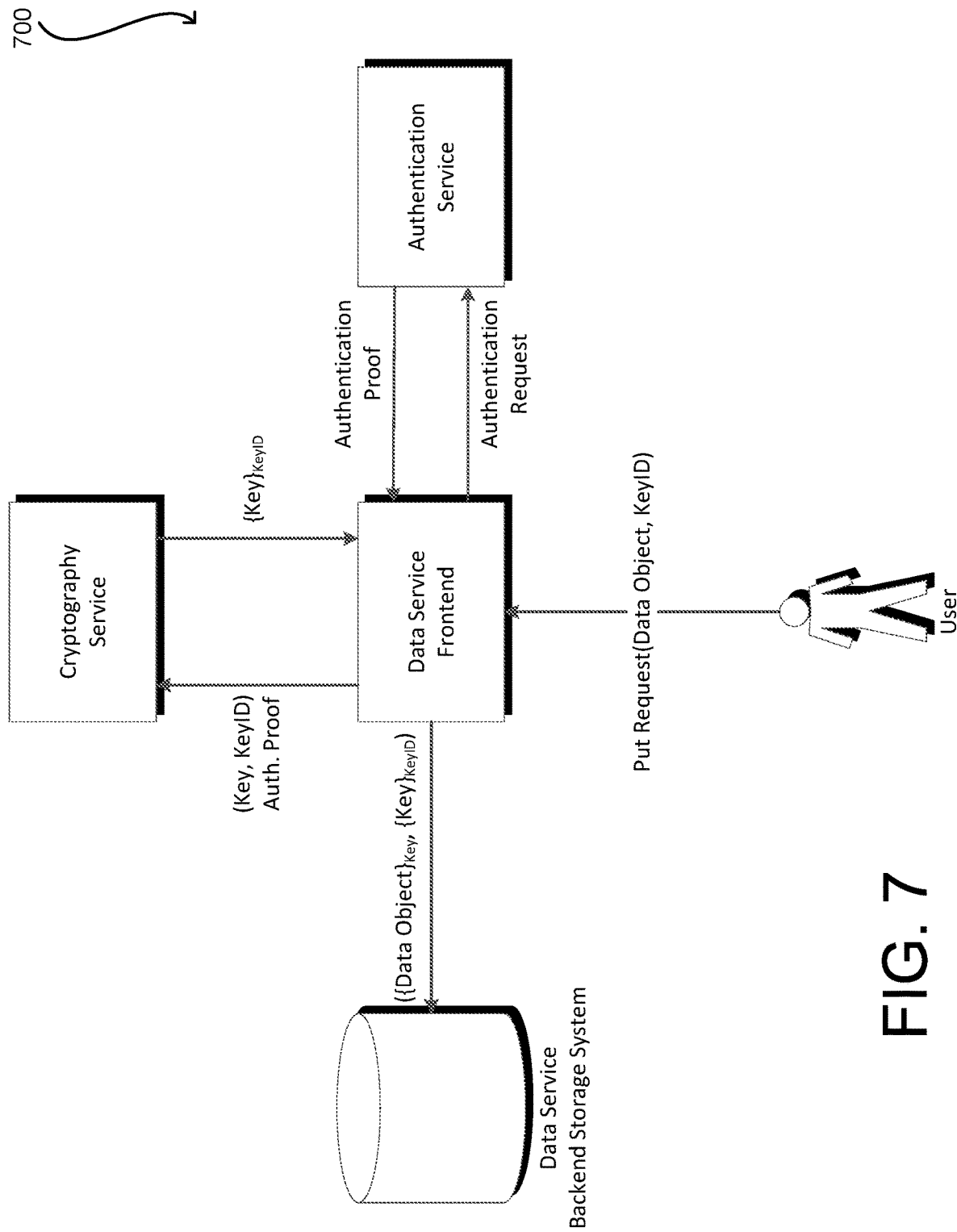
FIG. 7 shows an illustrative example of an environment in which various aspects of the present disclosure may be implemented and an example flow of information among the various components of the environment in accordance with at least one embodiment.

As noted, various embodiments of the present disclosure allow for data to be stored by a data storage service in various ways. FIG. 7 shows an illustrative example of an environment 700 with arrows indicating information flow in accordance with such embodiment. As illustrated in FIG. 7, environment 700 includes an authentication service, a cryptography service, a data service frontend and a data service backend storage system, such as described above. In this particular example, the data service frontend is a computer system configured to receive PUT requests from various users. PUT requests may include or specify data objects to be stored by a data service backend storage system. PUT requests may also specify a key identifier for a key to be used to encrypt the data object. The data service frontend may also be configured to interact with an authentication service, such as described above, in order to provide authentication proof to a cryptography service that is operable to receive keys and key identifiers and provide in response keys encrypted by the keys identified by the key identifiers. The data service frontend may then cause storage in a data service backend storage system. The data that may be stored may include a data object encrypted by the key. The data that may be stored may also include the key encrypted by the key identified by the key identifier. As discussed elsewhere, herein, the encrypted data object and encrypted key may be stored in different services.

As illustrated in FIG. 7, the data service frontend is configured to provide encrypted information to the data service backend storage system for storage. In this example, the data service frontend is configured to provide a data object encrypted under a key and the key encrypted under another key having a KeyID. It should be noted that, for the purpose of illustration, curly bracket notation is used to denote encryption. In particular, information inside of curly brackets is the information that is encrypted under a key specified in subscript. For example, {Data Object}Key denotes that the data "Data Object" is encrypted under the key "Key." It should be noted that a key identifier may also appear in subscript using this curly bracket notation. When a key identifier appears in subscript, the information inside the curly brackets is encrypted under a key identified by the key identifier. For example, {Data Object}KeyID denotes that the data object "Data Object" is encrypted under a key identified by the key identifier "KeyID." Similarly, {Key}KeyID denotes that the key "Key" is encrypted under the key identified by the key identifier "KeyID." In other words, this disclosure makes use of both keys and key identifiers in subscript and the meaning of the subscript should be clear from context. The ciphertext may include additional metadata usable to determine the identity of the associated decryption key.

Figure 8:
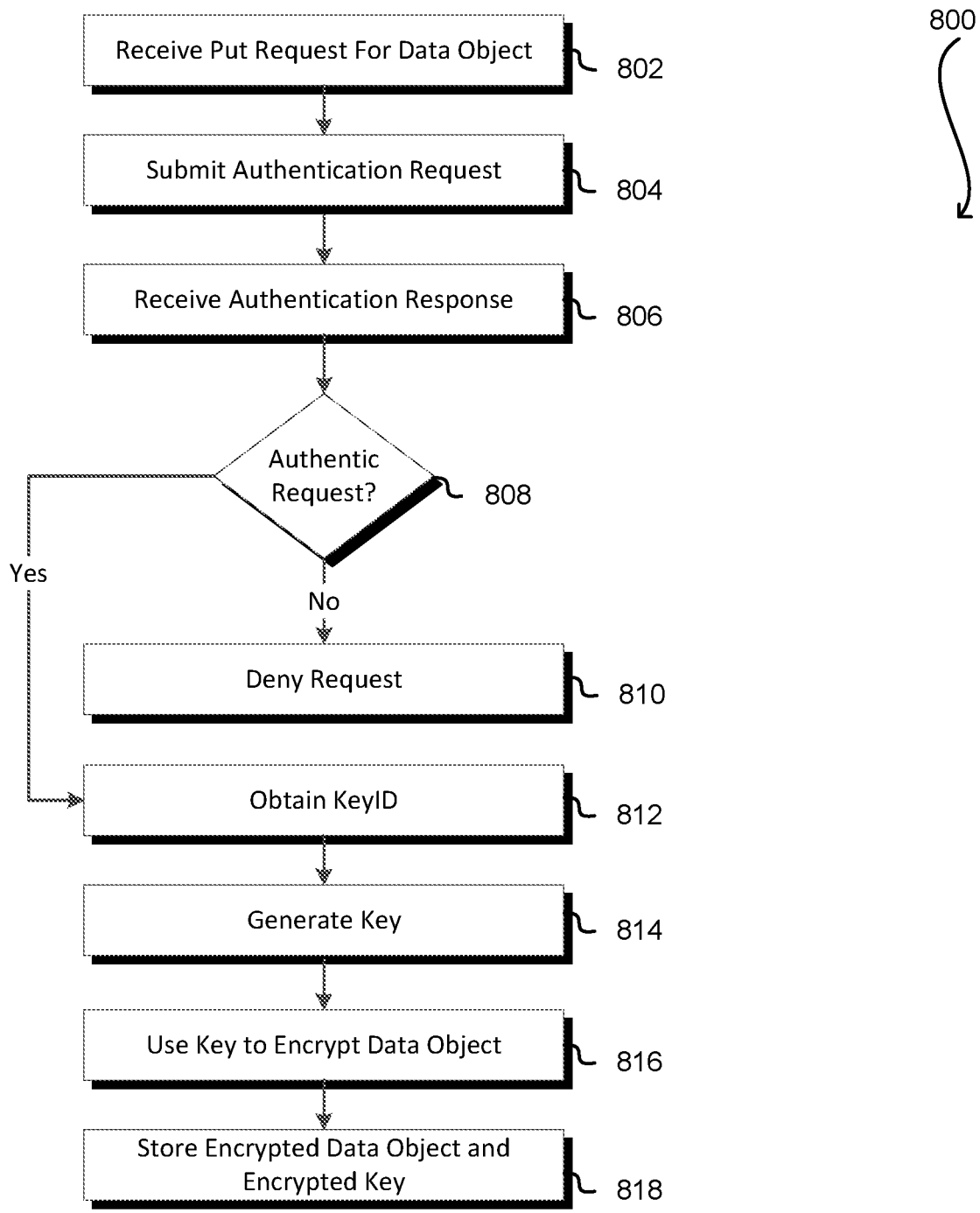
FIG. 8 shows example steps of an illustrative process for responding to a request to store data, in accordance with at least one embodiment.

FIG. 8 shows an illustrative example of a process 800 which may be performed to store a data object in a data storage system, such as the data service backend storage system described above in connection with FIG. 7. The process 800 may be performed by any suitable system, such as by the data service frontend system described above in connection with FIG. 7. In an embodiment, the process 800 includes receiving 802 a PUT request for a data object. Receiving the PUT request for the data object may be performed in any suitable manner, such as described above. It should be noted that the data object can be received in connection with the request or may be received from another service. For example, the request may include an identifier for a data object that may be obtained from another service using the identifier. As with other processes described above, the process 800 in an embodiment includes submitting 804 an authentication request and receiving 806 an authentication response. The authentication response that was received 806 may be used to determine 808 whether the PUT request is an authentic request. If it is determined 808 that the PUT request is not authentic, the process 800 may include denying 810 the request such as described above. If it is determined 808 that the PUT request is authentic, the process 800 may include obtaining 812 a key identifier (KeyID), such as a keyID for a master key used to encrypt envelope keys. Obtaining 812 the KeyID may be performed in any suitable manner and the manner in which the KeyID is obtained may vary in accordance with the various embodiments. For example, as illustrated in FIG. 7, the PUT request may specify the KeyID. As another example, the identity of the user, or otherwise associated with the user, may be used to obtain an identifier or a default key. As another example, the ciphertext may provide an indication of the associated key ID. As yet another example, one or more policy determinations may be used to determine which key identifier to obtain.

In an embodiment, the process 800 also includes generating 814 a key, such as an envelope key. Generating the key may be performed in any suitable manner by, for example, the cryptographic service or the service requesting encryption operations from the cryptographic service (e.g., a data storage service). For example, the key may be generated using a key derivation function using appropriate input to the key derivation function. Example key derivation functions include KDF1, defined in IEEE Std 1363 2000, key derivation functions defined in ANSI X9.42, and HMAC-based key derivation functions, such as the HMAC-Based Extract-and-Expand Key Derivation Function (HKDF) specified in RFC 5869. As another example, the key may be generated by a random or pseudo random number generator, a hardware entropy source or a deterministic random bit generator such as is specified by National Institute of Standards and Technology Special Publication (NIST SP) 800-90A. It should be noted that while FIG. 8 shows the process 800 including generating 814 a key, the key may be obtained in other ways such as by retrieval from storage. In other words, the key may have been pre-generated.

Continuing with the process 800 illustrated in FIG. 8, in an embodiment, the process 800 includes using 816 the generated key to encrypt a data object. For example, in an embodiment where the cryptographic service generates the key, the cryptographic service can provide the key, the KeyID, and an encrypted copy of the key to the data service. For example, referring to FIG. 7, the data service frontend may receive the envelope key and the KeyID for the master key used to encrypt the envelope key from the cryptography service with any other relevant information, such as authentication proof. The plaintext copy of the encryption key may then be used to encrypt the data object. The plaintext copy of the encryption key can be discarded and the encrypted data object as well as the encrypted key may then be stored 818. For example, referring to FIG. 7, the data service frontend may transmit to the encrypted data object and the encrypted key to the data service backend storage system for storage. In a configuration where the service generates the key, the service can provide the key and the KeyID to the cryptography service. For example, the data service frontend may send the envelope key and the KeyID for the master key used to encrypt the envelope key to the cryptography service with any other relevant information, such as authentication proof. The plaintext copy of the encryption key may then be used to encrypt the data object. The service can discard the plaintext copy of the encryption key and the encrypted data object as well as the encrypted key may then be stored. For example, referring to FIG. 7, the data service frontend may transmit to the encrypted data object and the encrypted key to the data service backend storage system for storage.

The encrypted data object and the encrypted envelope key may be stored without the plaintext version of key, that is, the plaintext key may be inaccessible to the data service backend storage system and one or more other systems. The key under which the data object is encrypted (e.g., the master key) may be made inaccessible in any suitable manner. In some embodiments this is achieved by storing it in memory accessible only to the cryptographic service. In some other embodiments this can be achieved by storing the master key in a hardware or other security module or otherwise under the protection of a hardware or other security module. In some embodiments, the memory location storing the plaintext envelope key (e.g., memory of the data service) may be allowed to be overwritten or memory location storing the key may be intentionally overwritten to render inaccessible the key to the data service frontend. As another example, the plaintext envelope key may be maintained in volatile memory that eventually ceases to store the key. In this manner, the envelope key is only accessible if it is decrypted using a key identified by the KeyID or otherwise obtained in an unauthorized manner, such as by cracking the key without the key identified by the KeyID, which may be computationally impractical. In other words, the key identified by the KeyID is required for authorized access to the key under which the data object is encrypted. Thus, if the data service backend storage system of FIG. 7 is compromised, such compromise would not provide access to the unencrypted data object because decrypting the data object would require access to the key, which is only obtainable through decryption using the key identified by the KeyID or through other ways which are not computationally feasible.

Figure 9:
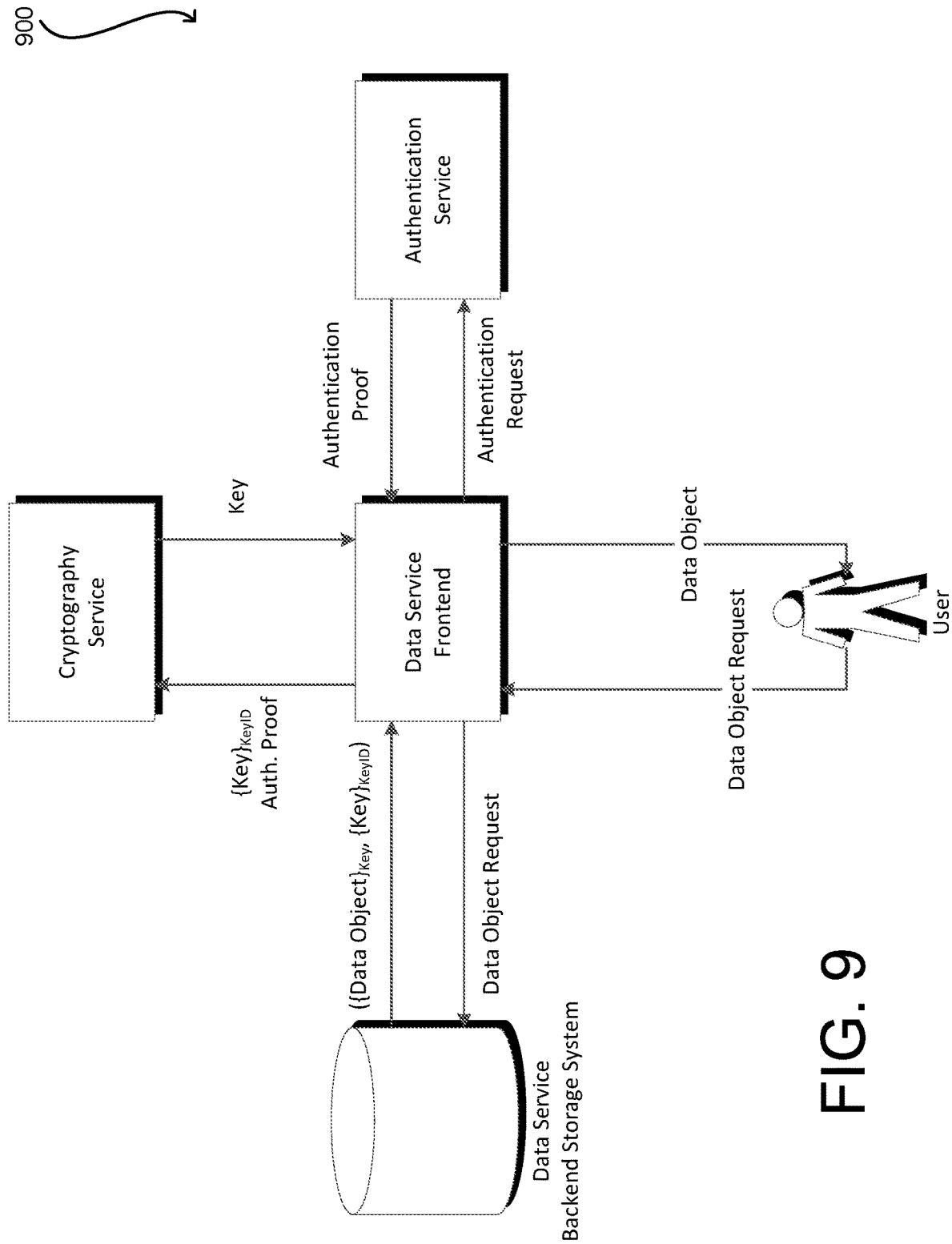
FIG. 9 shows an illustrative example of an environment in which various aspects of the present disclosure may be implemented and an example flow of information among the various components of the environment in accordance with at least one embodiment.

As noted, various embodiments of the present disclosure allow users to both store data objects and retrieve them in a secure manner. FIG. 9, accordingly, shows an illustrative example of an environment 900 which may be used to obtain data objects from storage. As illustrated in FIG. 9, the environment 900 includes an authentication service, a cryptography service, a data service frontend system and a data service backend storage system. The authentication service, cryptography service, data service frontend and data service backend storage system may be computer systems such as described above. As illustrated in FIG. 9, the data service frontend system is configured to receive data object requests and provide data objects in response. In order to provide the data objects in response, the data storage frontend system in this embodiment is configured to interact with the authentication service, the cryptography service, and the data service backend storage system as illustrated in FIG. 9. For example, in various embodiments, the data service frontend system is configured to submit authentication requests to the authentication service and receives authentication proof in response to the requests. As another example, the data service frontend is configured to provide keys encrypted by a key identified by a KeyID and authentication proof to a cryptography service which is operable to determine whether to provide the key based, at least in part, on the authentication proof and, if determined to provide the key, then provide the key to the data service frontend. The data service frontend may also be configured to provide other information, such as the KeyID, to the cryptography service. Although, in some embodiments, the KeyID may be implicitly indicated to the cryptography service, such as through association with other information provided to the cryptography service. It should also be noted that, in some embodiments, the user provides the KeyID to the data service frontend in connection with submitting requests to the data service frontend. Also, as illustrated in FIG. 9, the data service frontend in an embodiment is configured to request the data object from the data service backend storage system and receive in response the data object encrypted by the key and the key encrypted by a key identified by the KeyID. In some embodiments the cryptographic service may be operable to refuse to perform decryption of a ciphertext not generated using a key associated with a specified KeyID.

Figure 10:
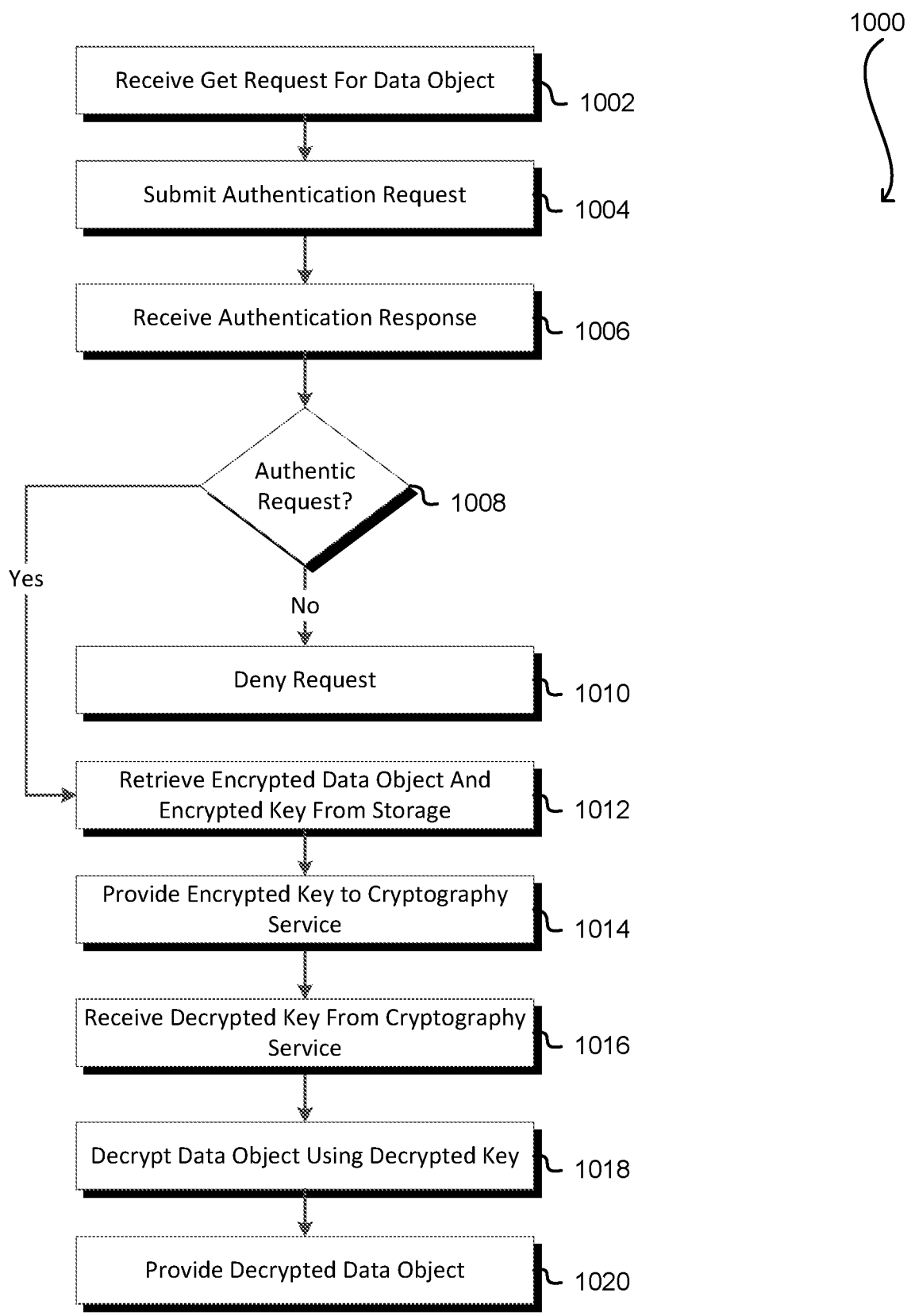
FIG. 10 shows example steps of an illustrative process for responding to a request to retrieve data, in accordance with at least one embodiment.

The data service frontend, in an embodiment, is configured to use the key received from the cryptography service to decrypt the data object and provide the decrypted data object to the user. FIG. 10, accordingly, shows an illustrative example of a process 1000 which may be used to provide the decrypted object in accordance with various embodiments.

The process 1000 may be performed by any suitable system such as the data service frontend system described in connection with FIG. 9. In an embodiment, the process 1000 includes receiving 1002 a GET request for a data object. Receiving the GET request for the data object may be performed in any suitable manner such as described above in connection with other types of requests. For example, the GET request for the data object may include information used to authenticate the request and/or other information. The process 1000, accordingly, in an embodiment, as with other processes described herein, includes submitting 1004 an authentication request to an authentication system and receiving 1006 an authentication response. Submitting the authentication request and receiving the authentication response may be performed in any suitable manner, such as described above. The authentication response may be used to determine 1008 whether or not the GET request is authentic. If it is determined 1008 that the GET request is not authentic, the process 1000 in an embodiment includes denying 1010 the request. If, however, it is determined 1008 that the GET request is authentic, the process 1000 in an embodiment includes retrieving 1012 the encrypted data object and an encrypted key from storage. For example, the data service frontend system may obtain the encrypted data object and encrypted key from the data service backend storage system illustrated above in connection with FIG. 9.

In an embodiment, the process 1000 includes providing 1014 the encrypted envelope key to a cryptography service. Providing 1014 the encrypted envelope key to the cryptography service may be performed in any suitable manner and may be provided with other information, such as authentication proof that enables the cryptography service to determine whether to decrypt the encrypted key. In addition, providing 1014 the encrypted envelope key to the cryptography service may include providing an identifier of a key required for authorized decryption of the encrypted envelope key to enable the cryptography service to select a key identified by the identifier from among multiple keys managed by the cryptography service. As noted above, however, keys may be implicitly identified. The cryptography service may, accordingly, select an appropriate key and decrypt the encrypted key. Accordingly, in an embodiment, the process 1000 includes receiving 1016 the decrypted envelope key from the cryptography service. For example, if the cryptography service determines that the authentication proof is valid and/or that decryption of the encrypted is allowable according to any applicable policies, the cryptography service may provide the decrypted key to a system attempting to decrypt the data object. The data object may then be decrypted 1018 using the decrypted envelope key. The decrypted data object may then be provided 1020 to the requestor, such as the user or other system that submitted the GET request.

Figure 11:
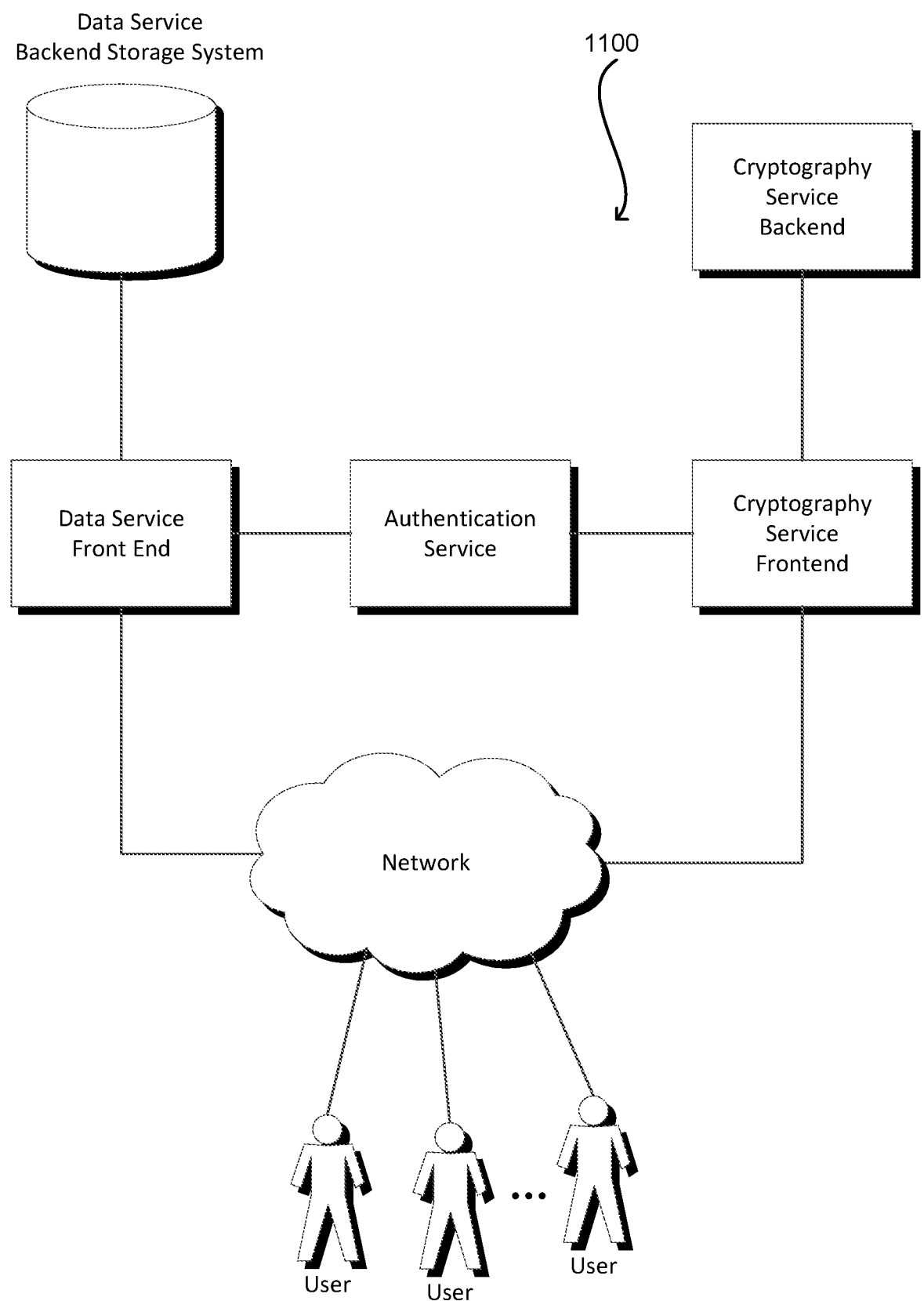
FIG. 11 shows an illustrative example of an environment in which various aspects of the present disclosure may be implemented.

In many instances, it is desirable for users (i.e., generally devices utilizing a cryptography service) to interact directly with the cryptography service. FIG. 11 accordingly shows an illustrative example of an environment 1100 which allows for direct user access to a cryptography service. In environment 1100, included is an authentication service, a data service frontend and a data service backend storage system. The authentication service, data service frontend and data service backend storage system may be as described above. For example, the data service frontend may be configured to receive and respond to requests from users as illustrated in FIG. 11 over a suitable network. As part of responding to requests from the users over the network, the data service frontend may also be configured to interact with the authentication service in order to determine whether user requests are authentic and/or enforce policy on the requests. The data service frontend may also be configured to interact with the data service backend storage system as part of fulfilling user requests. User requests may include, for example, PUT requests to store data in the backend storage system and GET requests to retrieve data from the data service backend storage system. As above, other requests may also be used in accordance with the various embodiments, such as requests to delete data stored in the data service backend storage system, requests to update the data stored in the data service backend storage system and the like.

In the particular example of FIG. 11, in the environment 1100, the cryptography service includes a cryptography service frontend and a data service backend. As with the data service frontend, the cryptography service frontend is configured to receive and respond to requests from users over the network. The cryptography service frontend is also configured to interact with the authentication service to determine whether user requests are authentic. Determining whether user requests are authentic may be performed in a simple manner such as described above. It should be noted that, while the cryptography service frontend and the data service frontend interact with the same authentication service, the cryptography service frontend and the data service frontend may interact with different authentication services. Further, the cryptography service frontend may be configured to enforce policy when responding to user requests.

The cryptography service frontend, in an embodiment, is configured to interact with the cryptography service backend. The cryptography service backend is configured, in accordance with instructions received from the cryptography service frontend, to perform cryptographic operations. Cryptographic operations include encryption, decryption and hash calculations and others. The environment 1100 may be used, for example, by users to have plaintext encrypted by the cryptography service so that the encrypted data can be stored in the data service backend storage system. Examples of such use of the environment 1100 are provided below. In addition, example details of an example cryptography service are also provided below.

Data may be stored in the data service backend storage system in any suitable manner such as described above. For example, techniques for storing encrypted data in the backend storage system described above may be used in the environment 1100. For example, while not illustrated, the data service frontend may communicate with the cryptography service frontend to cause the cryptography service backend to encrypt data which may then be stored in the data service backend storage system. The encrypted data may be a data object and/or an encrypted key that was used to encrypt a data object. In the environment 1100, data may be placed into the data service backend storage system in other ways as well. For example, users may provide plaintext to be encrypted by the cryptography service and may receive ciphertext in response. The users may then interact or may submit a request to the data service frontend to request that the ciphertext be stored in the data service backend storage system. The data service frontend, in this example, may store the ciphertext in any manner. For instance, the data service frontend and backend storage systems may be configured to be indifferent to whether data is encrypted.

In addition, as with all environments illustrated herein, an additional frontend system may be logically located between the users and the data service frontend and the cryptography service frontend and possibly other frontend systems in order to coordinate actions between the systems. For example, in some embodiments, users may interact with a frontend system that itself interacts with the cryptography service frontend and data service frontend so that operations from the perspective of the user are simpler. For example, a user may request that a data object be encrypted and stored and a frontend system responds to the request by appropriate interactions with the cryptography service frontend and data service frontend. From the perspective of the user, however, such may be performed by a single request. Other variations are also within the scope of the present disclosure.

Figure 12:
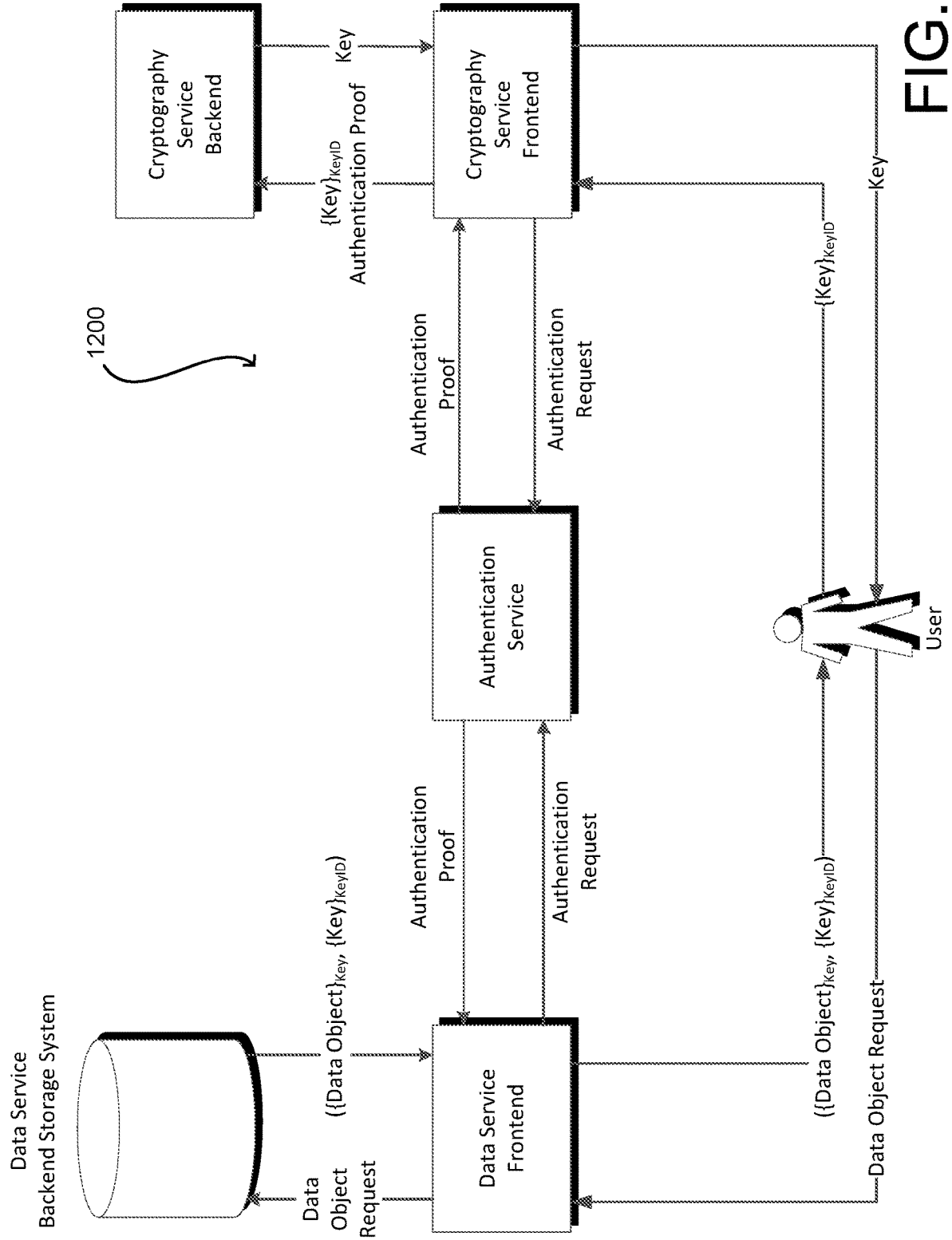
FIG. 12 shows an illustrative example of an environment in which various aspects of the present disclosure may be implemented and an example flow of information among the various components of the environment in accordance with at least one embodiment.

FIG. 12 shows an illustrative example of an environment 1200 which may be used to implement various embodiments of the present disclosure. In FIG. 12, the environment 1200 is configured to enable users to store ciphertext in a data service backend storage system. As illustrated in FIG. 12, accordingly, the environment 1200 includes a data service frontend, a data service backend storage system, an authentication service, a cryptography service frontend and a cryptography service backend. The data service backend storage system, the data service frontend, the authentication service, the cryptography service frontend, and the cryptography service backend may be systems such as described above in connection with FIG. 11. For example, as illustrated in FIG. 12, the data service frontend is configured to receive and respond to user requests and may also be configured to enforce policy on user requests. The data service frontend, as part of responding to requests, may be configured to submit authentication requests to the authentication service and receive authentication proof in response in response. Upon successful authentication, the data service frontend may be further configured to interact with the data service backend storage system to obtain encrypted data objects and possibly unencrypted data objects from the data service backend storage system, which may be then provided to a user.

As illustrated in FIG. 12, the cryptography service frontend is also configured to submit authentication requests to the authentication service and receive, in response, authentication proof. Authentication proof may be used to obtain services from the cryptography service backend. For example, the cryptography service frontend may be configured to provide ciphertext to the cryptography service backend with authentication proof and the cryptography service backend may be configured to decrypt the ciphertext and provide the ciphertext in return. As illustrated in FIG. 12, the ciphertext may be an encrypted key and the cryptography service backend may decrypt the encrypted key and provide the decrypted key, that is a plaintext key, to the cryptography service frontend, which is further configured to provide the plaintext key to the user. The user may then use the key to decrypt the encrypted data object received from the data service frontend or to decrypt encrypted data objects stored within the user's domain (e.g., within a user operated or controlled data center or computer system). In this example, the user may have obtained the encrypted key from the data service frontend. For example, the user may have submitted a request to the data service frontend for the data object and/or the key used to encrypt the data object. While illustrated in FIG. 11 as a single request, the separate requests may be made for both the data object and the key. As illustrated in FIG. 11, the data service frontend may obtain the encrypted data object and encrypted key from the data service backend storage system and provide the encrypted data object and encrypted key to the user.

It should be noted that, as with all environments illustrated herein, variations are considered as being within the scope of the present disclosure. For example, FIG. 12 shows a data object encrypted under a key and the key encrypted by another key identified by a key identifier being provided to the user. Further levels of encryption may also be used. For example, the data object may be encrypted under a key that is only accessible to the user (and/or that is not accessible by the other components of the environment 1200). A key used to encrypt the data object may also be encrypted under the key that is only accessible to the user. In this example, unauthorized access to the components of the environment 1200 (absent the user) still does not provide access to the unencrypted contents of the data object since access to the user's key is still required for authorized decryption.

As another example, in the environment 1200 illustrated in FIG. 12, the data service frontend and the data service backend storage system do not have access to the plaintext data stored by the data service backend storage system because the data service frontend and the data service backend storage system do not have access to a key needed to decrypt the encrypted data. In some embodiments, however, access may be granted to the data service frontend and/or the data service backend storage system. For instance, in an embodiment, temporary access to the key may be provided to the data service frontend to enable the data service frontend to obtain encrypted data, decrypt the encrypted data, use the decrypted data for a particular purpose (e.g., indexing), and then delete or otherwise lose access to the decrypted data. Such actions may be governed by policy enforced by the data service frontend and/or cryptography service and may require authorization from the user.

Figure 13:
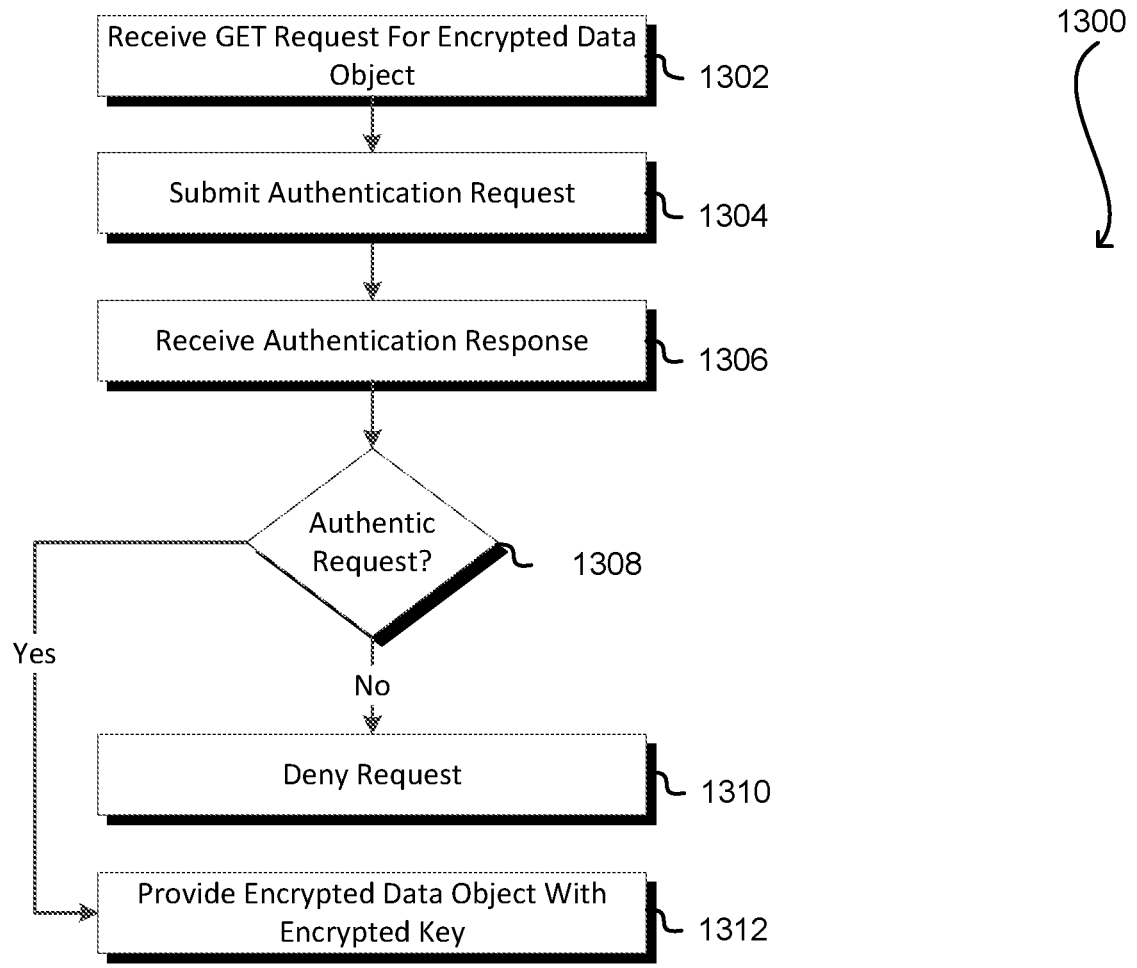
FIG. 13 shows example steps of an illustrative process for responding to a request to retrieve data, in accordance with at least one embodiment.

FIG. 13 shows an illustrative example of a process 1300 which may be used to obtain an encrypted data object and an encrypted key such as from a data service backend storage system such as described above. The process 1300, for example, may be performed by the data service frontend system described above in connection with FIG. 12. In an embodiment, the process 1300 includes receiving 1302 a GET request for an encrypted data object. Receiving the GET request may be performed in any suitable manner such as by receiving the request via an API call to the data service frontend system. As a result of having received the GET request, process 1300 may include submitting 1304 an authentication request and receiving 1306 an authentication response. Submitting 1304 the authentication request and receiving 1306 the authentication response may be performed in any suitable manner such as described above. The authentication response may be used to determine 1308 whether the GET request is authentic. If it is determined 1308 that the GET request is not authentic, the process 1300 may include denying 1310 the GET request. Denying 1310 the GET request may be performed in any suitable manner such as described above. If, however, it is determined 1308 that that GET request is authentic, the process 1300 may include providing 1312 the encrypted data object with an encrypted key that, when decrypted, is usable to decrypt the encrypted data object. It should be noted that, as with all processes described herein, numerous variations are considered as being within the scope of the present disclosure. For example, the process 1300 may be configured to respond to the GET request, when authentic, by providing the encrypted data object but without providing an encrypted key. A requester, that is a user or system that submitted the GET request, may obtain the encrypted key in other ways. For example, in some embodiments, users may store encrypted keys themselves in a data storage system under the user's control. As another example, one storage service may store the encrypted data object and another service may store the encrypted key and the user may obtain the encrypted data object and encrypted key from the respective services. As another example, another service or a third party to the user may be used to store encrypted keys and users may obtain encrypted keys upon request. Generally, any way by which encrypted keys may be provided may be used.

Figure 14:
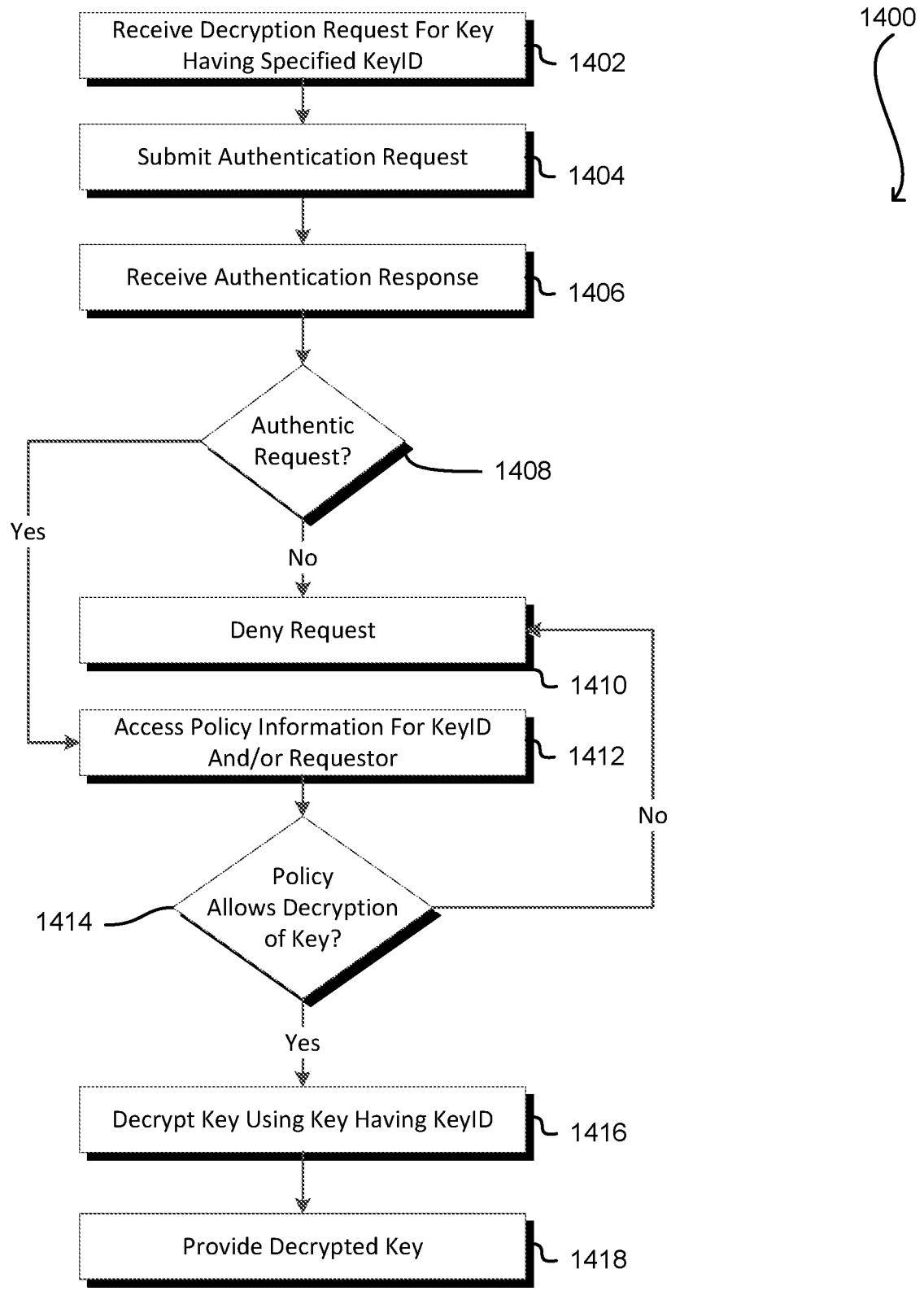
FIG. 14 shows example steps of an illustrative process for responding to a request to decrypt data, in accordance with at least one embodiment.

As illustrated in FIG. 13, the process 1300 may result in an entity having been provided a data object and an encrypted key usable to decrypt the data object. In various embodiments, the encrypted key must be decrypted in order to decrypt the data object. FIG. 14, accordingly, shows an illustrative example of a process 1400 which may be used to provide a decrypted key to an entity in need of such a decrypted key in order to use the decrypted key for decryption of an encrypted data object. The process 1400 may be performed by any suitable system such as by the cryptography service frontend system described above in connection with FIG. 12. In an embodiment, the process 1400 includes receiving 1402 a decryption to decrypt a key using another key having a specified KeyID. While the process 1400 is described in connection with decryption of a key, it should be noted that the process 1400 may be adapted for decryption of data in general. The decryption request may be received 1402 in any suitable manner such as described above (e.g., via an appropriately configured API call). Further, the decryption request may be received by any entity appropriate to the context in which the process 1400 is being performed. For instance, the decryption request may originate from the user or from another system, such as the data service frontend discussed above. The decryption request may also include data (e.g., a key) to be decrypted or a reference thereto. The KeyID may be specified also in any suitable manner. For example, in some embodiments, the decryption request includes the KeyID or a reference to the KeyID, that is, information that can be used to determine the KeyID. As discussed above, the KeyID may also be implicitly specified. For example, the KeyID may be obtained through association with available data such as an identity of a requester that submitted the decryption request. For instance, the key corresponding to the KeyID may be a default key for the requestor or for the entity on behalf of which the request was submitted.

The process 1400, in an embodiment, includes submitting 1404 an authentication request and receiving 1406 an authentication response. Submitting 1404 the authentication request and receiving 1406 the authentication response may be performed in any suitable manner such as described above. Further, as described above, the received authentication response may be used to determine 1408 whether the GET request is authentic. If it is determined 1408 that the GET request is not authentic, the process 1400 may include denying 1410 the GET request. Denying 1410 the GET request may be performed in any suitable manner such as is described above. If, however, it is determined 1408 that the GET request is authentic, the process 1400 may include accessing policy information for the specified KeyID and/or for the requester 1412. Policy information may include information including one or more policies on the KeyID and/or the requester.

In an embodiment, the accessed policy information is used to determine 1414 whether any applicable policy allows decryption of the key having the specified KeyID. If it is determined 1414 that the policy does not allow decryption of the key specified by the KeyID, the process 1400 may include denying 1410 the GET request such as described above. If, however, it is determined 1414 that policy allows decryption of the key having the specified KeyID, the process 1400 may include decrypting 1416 the key using the key identified by the KeyID. Once the key has been decrypted, using a key having the KeyID, the decrypted key may then be provided 1418 such as by transmission over a network to the requester that submitted the decryption request (or, in some embodiments, another authorized destination).

Figure 15:
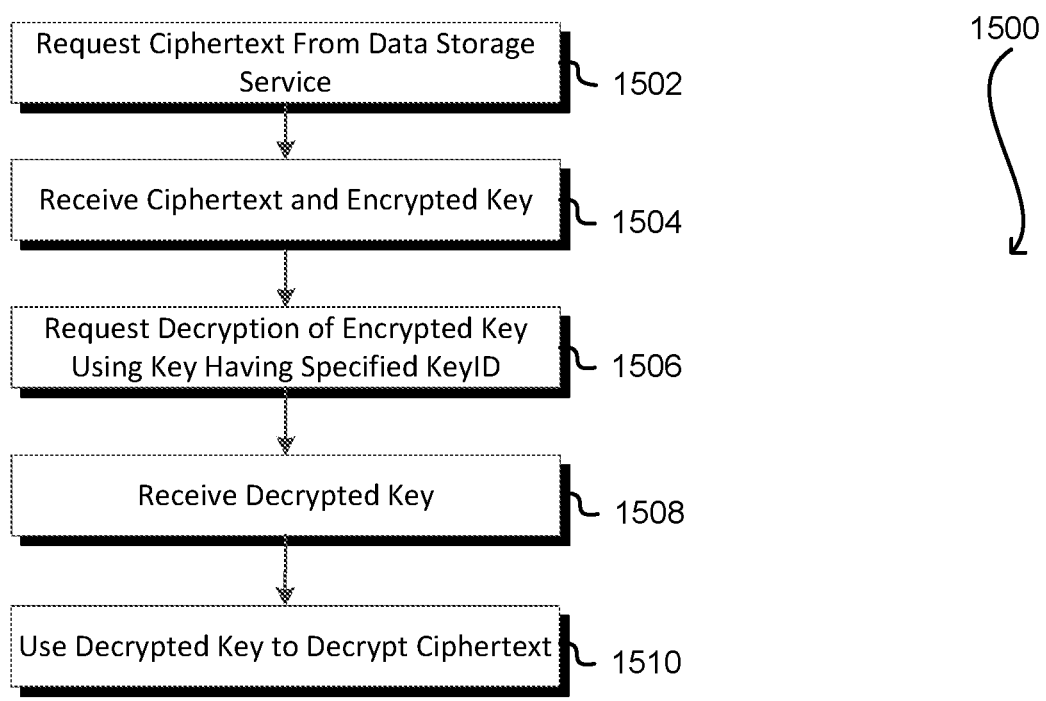
FIG. 15 shows example steps of an illustrative process for obtaining decrypted data, in accordance with at least one embodiment.

As illustrated in the environment 1200 discussed above, a user may obtain encrypted data objects and keys for decrypting the data objects in various ways. FIG. 15 shows an illustrative example of a process 1500 which may be used to obtain plaintext in accordance with various embodiments. The process 1500 may be performed by any suitable system such as by a system being operated and/or hosted by a user such as described in connection with FIG. 12. Other suitable systems include systems operating on behalf of users and not necessarily according to real time user input provided but perhaps according to preprogrammed processes.

In an embodiment, the process 1500 includes requesting 1502 ciphertext from a data storage service. Requesting 1502 ciphertext from a data storage service may be performed in any suitable manner such as described above. For example, a system performing the process 1500 may request 1502 ciphertext, using an appropriately configured API call in the environment 1200 illustrated above in connection with FIG. 12 and/or by the process 1300 described above in connection with FIG. 13.

The process 1500 may also include receiving ciphertext and an encrypted key. Receiving ciphertext and encrypted key may be performed in any suitable manner. For example, the ciphertext and encrypted key may be received in a response to the request for the ciphertext from a data storage service. Generally, however, the ciphertext and encrypted key may be received 1504 in other suitable ways. For example, the request to receive ciphertext from the data storage service may be an asynchronous request and ciphertext may be received 1504 pursuant to another request that is subsequently submitted. Further, the ciphertext and encrypted key may be provided in a single response or may be obtained separately such as by different responses (which may be from the same or from different systems). As another example, a system performing a process 1500 may locally or otherwise store encrypted keys and the encrypted key may be received from local memory.

In an embodiment, the process 1500 includes requesting decryption of the encrypted key, using a key having a specified KeyID. The KeyID may be specified in any suitable manner such as described above. Further, it should be noted that the system performing the process 1500 may be able to specify the KeyID in any suitable manner. For example, the encrypted key and/or information provided therewith may specify the KeyID. As another example, the system performing the process 1500 may have local or remote access to information that enables determining the KeyID. A local or remote database, for instance, may associate data object identifiers with key identifiers for keys used to encrypt the data objects. Generally, any manner in which the system can be enabled to specify the KeyID may be used. Further, in some embodiments, the KeyID need not be specified, such as when information provided to a cryptography service is sufficient to determine the KeyID. The request 1506 for decryption of the encrypted key may be performed in any suitable manner such as in connection with an environment discussed above in connection with FIG. 12 and/or by performance of the process 1400 described above in connection with FIG. 14.

The process 1500, in an embodiment, includes receiving 1508 the decrypted key. Receiving 1508 the decrypted key may be performed in any suitable manner. For example, the decrypted key may be received in response to a request for decryption of the encrypted key. As another example, the request for decryption of the encrypted key may be an asynchronous request and another request may have been submitted for receiving the decrypted key. Generally, the decrypted key may be received in any suitable manner. Further, as with all information flowing from one device to another, the passage of information may be performed using secure channels. For instance, the decrypted key may be once again encrypted for decryption by an entity receiving the decrypted key. Generally, any manner of secure communication may be used to pass information from one entity to another.

Once the decrypted key has been received 1508, the process 1500 may include using 1510 the decrypted key to decrypt 1510 ciphertext and therefore obtain plaintext. It should be noted that, as with all processes described herein, variations are considered as being within the scope of the present disclosure. For example, the process 1500 shows a request for ciphertext and a request for decryption of an encrypted key being performed sequentially. However, as with many operations described herein in connection with the various processes, operations need not be performed sequentially in various embodiments. For example, if a system performing the process 1500 has access to the encrypted key prior to requesting the ciphertext, or is otherwise able to do so, the system may request ciphertext and request decryption of the encrypted key in parallel or in an order different from that which is illustrated. Other variations are also considered as being within the scope of the present disclosure.

Figure 16:
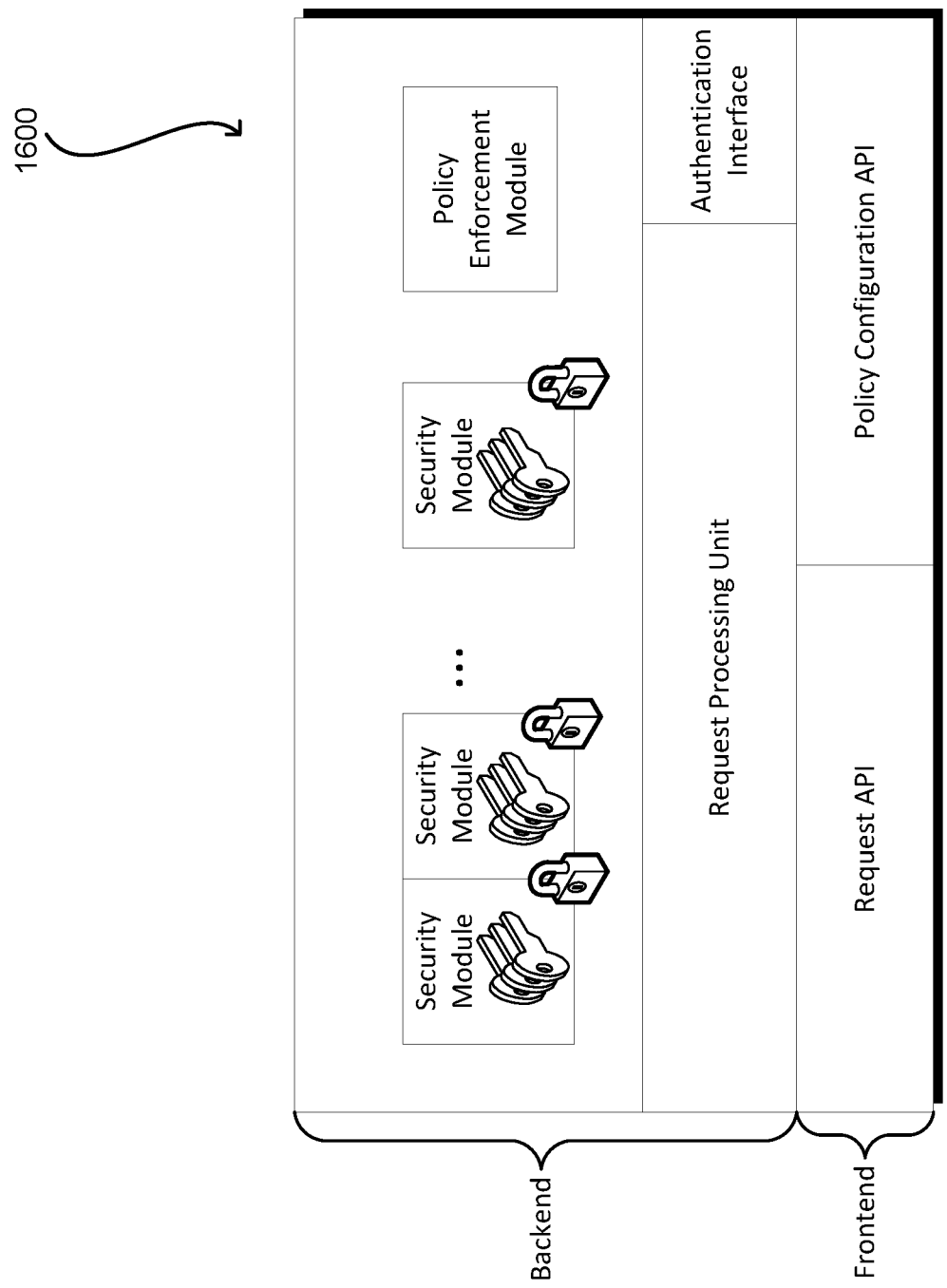
FIG. 16 shows a diagrammatic representation of an example cryptography service, in accordance with at least one embodiment.

As discussed above, various embodiments of the present disclosure are directed to providing cryptography services. Cryptography services may be provided by a cryptography service system such as described above. FIG. 16 accordingly shows an illustrative example of a cryptography service 1600 in accordance with various embodiments. As illustrated in FIG. 16 and as discussed above, the cryptography service 1600 is logically comprised of a frontend system and a backend system. Both the frontend system and the backend system may be implemented by one or more computer systems configured to perform operations described herein. For example, as illustrated in FIG. 16, the frontend system of the cryptography service 1600 implements a request API and a policy configuration API. The request API, in an embodiment, is an API configured for requesting cryptographic and other operations to be performed by the cryptography service. Thus, requests may be made to the frontend system via the request API in order for such cryptographic operations to be performed by the cryptography service.

The request API may be configured with the following example, high-level, requests available:
   CreateKey(KeyID)
   Encrypt(KeyID, Data, [AAD])
   Decrypt(KeyID, Ciphertext, [AAD])
   Shred(KeyID)
   ReKey(Ciphertext, OldKeyID, NewKeyID).

A CreateKey(KeyID) request, in an embodiment, causes the cryptography service to create a key identified by the KeyID identified in the request. Upon receipt of a request, the cryptography service may generate a key and associate the key with the KeyID. It should be known that KeyID's may be, but are not necessarily unique identifiers. For instance, a KeyID may identify a family of keys. For example, in some embodiments, key rotation is performed. Key rotation may involve replacing keys with other keys to prevent collection of enough decrypted data to allow practical cracking of a cipher used. If performed at the direction of an entity different from the cryptography service, use of the CreateKey(KeyID) request may cause the cryptography service to create a new key to replace an old key identified by the KeyID. The old key may remain identified by the KeyID, but may, for instance, be only used for decryption (of data that has already been encrypted using the old key) and not for future encryption. As another example, in some embodiments, users of the cryptography service provide their own key identifiers and there is a possibility that two different customers may provide the same identifier. In such instances, the identifier may not uniquely identify a key or even uniquely identify a family of keys. Various measures may be in place to address this. For example, an identity or other information associated with a user of the cryptography service may be used to identify the proper key or family of keys. In still other embodiments the cryptographic service may assign a KeyID randomly, sequentially, or using any other method.

It should be noted that, when a KeyID does not uniquely identify a key, various systems may be in place to enable proper functionality. For example, in various embodiments, a family of keys identified by a KeyID is finite. If a decryption operation using a key identified by a KeyID is requested, additional data (e.g., a time stamp of when the encryption was performed) may enable determining the proper key to use. In some embodiments, ciphertexts may include information indicating a key version. In some embodiments, all possible keys are used to provide different decryptions of the data. Since there are a finite number of keys, the proper decryption may be selected from those provided. In some embodiments, decryption with a key is performed in a manner that enables the cryptographic service to detect that the ciphertext was not generated based at least in part on the key, such as by using authenticated encryption. Other variations are also considered as being within the scope of the present disclosure.

An Encrypt(KeyID, Data, [AAD]) request may be used to cause the cryptography service to encrypt the specified data using a key identified by the KeyID. Additional Authenticated Data (AAD) may be used for various purposes and may be data that is not necessarily encrypted, but that is authenticated, e.g., by an electronic signature, a message authentication code or, generally, a keyed hash value included with the AAD. In some embodiments, the ciphertext is generated including at least a portion of the AAD. In some other embodiments the AAD is provided separately during decryption. In some other embodiments, the AAD is generated at decryption time based at least in part on the request and or other metadata such that decryption will only succeed when the metadata passes. In some embodiments, policy may constrain whether a cryptographic operation can be performed with respect to particular AAD. Processing of Encrypt(KeyID, Data, [AAD]) requests may require, by programming logic and/or policy enforced by the cryptography service, both that the AAD contain particular values and that the AAD be authentic (e.g., not modified since original transmission). Similarly, a Decrypt(KeyID, Ciphertext, [AAD]) request may be used to cause the cryptography service to decrypt the specified ciphertext using a key identified by the KeyID. The AAD in the Decrypt(KeyID, Ciphertext, [AAD]) request may be used such as described above. For instance, processing of the Decrypt(KeyID, Ciphertext, [AAD]) may require, by programming logic and/or policy enforced by the cryptography service, both that the AAD contain particular values and that the AAD be authentic (e.g., not modified since original transmission).

The Shred(KeyID), in an embodiment, may be used to cause the cryptography service to electronically shred a key or family of keys identified by the specified KeyID. Electronic shredding may include making the key no longer accessible. For example, use of the Shred(KeyID) request may cause the cryptography system to command one or more hardware devices to perform a SecureErase operation on one or more keys identified by the specified KeyID. Generally, the key(s) identified by the KeyID may be electronically shredded in any suitable manner, such as by overwriting data encoding the key with other data (e.g., a series of zeros or ones or a random string). If the key(s) are stored encrypted under a key, the key used to encrypt the keys may be electronically shredded, thereby causing a loss of access to the key(s). In some embodiments, the shred operation may cause decrypt operations indicating the shredded KeyID to fail at some determined point in the future. Other manners of securely and permanently destroying any possible access to the key(s) may be used.

The ReKey(Ciphertext, OldKeyID, NewKeyID) request, in an embodiment, may be used to cause the cryptography service to encrypt ciphertext under a different key. When the cryptography service receives a ReKey(Ciphertext, OldKeyID, NewKeyID) request, it may use a key identified by the OldKeyID to decrypt the specified ciphertext and then use a key identified by the NewKeyID to encrypt the decrypted ciphertext. If a key identified by the NewKeyID does not yet exist, the cryptography service may generate a key to use and associate the generated key with the specified NewKeyID, such as described in connection the Create (KeyID) request described above. In some embodiments, the ReKey operation may be operable to cause data to be transferrable between isolated instances of a cryptography service. In some embodiments, a policy might permit a rekey operation to be performed on a ciphertext but might not permit the same requestor to directly decrypt the ciphertext. In some embodiments, ReKey might support rekeying a ciphertext from a key identified by a first KeyID within a first account to a key identified by a KeyID within a second account.

Similarly, the frontend system may implement a policy configuration API which, in an embodiment, enables users to submit requests for configuring policies for the performance of cryptographic operations and for other policy-related operations. Policies may be associated with keys, groups of keys, accounts, users and other logical entities in various embodiments. Example policies, which may be configured via the policy configuration API, are provided below. In an embodiment, the cryptography service policy configuration API includes the following requests:

SetKeyPolicy(KeyID, Policy)
Suspend(KeyID, Public Key)
Reinstate(KeyID, Private Key).

In an embodiment, the SetKeyPolicy(KeyID, Policy) request may be used to cause the cryptography service to store a policy on the key (or family of keys) identified by the KeyID. A policy may be information that is determinative of whether a requested cryptographic operation can be performed in a particular context. The policy may be encoded in a declarative access control policy language, such as eXtensinble Access Control Markup Language (XACML), Enterprise Privacy Authorization Language (EPAL), Amazon Web Services Access Policy Language, Microsoft SecPol or any suitable way of encoding one or more conditions that must be satisfied for a cryptographic operation to be performed. Policies may define what operations can be performed, when the operations can be performed, which entities can make authorized requests for operations to be performed, which information is required for a particular request to be authorized, and the like. In addition, policies may be defined and/or enforced using access control lists, privileges associated with users, and/or operation bitmasks in addition to or instead of the examples given above. Example policies appear below.

In some embodiments the cryptographic service may support a suspend operation, e.g., using a Suspend(KeyID, Public Key) API call. A suspend operation enables the customer of the cryptographic service to deny the operator of the cryptographic service use of or access to a key. This can be useful to customers concerned about covert lawful orders or other circumstances in which the operator of the cryptographic service might be compelled to perform some operation using a key. It may also be useful to customers that wish to lock particular data and render it inaccessible online. In some embodiments, a suspend operation might include receiving a public key from a customer and encrypting the key specified by a given KeyID with the received public key and shredding the key specified by the KeyID, such that the provider is not able to access the suspended key unless the private key associated with the public key is provided, e.g., using a Reinstate(KeyID, Private Key) API Call that both specifies the KeyID and includes the private key. In some other embodiments, a suspend operation might involve encrypting a key associated with a specified KeyID using another key managed by the cryptographic service, including without limitation one created for the purpose of the instant suspend operation. The ciphertext produced by this operation can be provided to the customer and not retained within the cryptographic service. The original key identified by the KeyID can then be shredded. The cryptographic service may be operable to receive the provided cipertext and re-import the suspended key. In some embodiments the ciphertext may be generated in a manner that will prevent the cryptographic service from returning a decrypted version to the customer.

As illustrated in FIG. 16, the cryptography service 1600 includes a backend system that itself comprises various components in some embodiments. For example, the backend system in this example includes a request processing system which may be a subsystem of the cryptography service 1600 that is configured to perform operations in accordance with requests received through either the request API or the policy configuration API. For example, the request processing component may receive requests received via the request API and the policy configuration API determines whether such requests are authentic and are therefore fulfillable and may fulfill the requests. Fulfilling the request may include, for example, performing and/or having performed cryptographic operations. The request processing unit may be configured to interact with an authentication interface which enables the request processing unit to determine whether requests are authentic. The authentication interface may be configured to interact with an authentication system such as described above. For example, when a request is received by the request processing unit, the request processing unit may utilize the authentication interface to interact with an authentication service which may, if applicable, provide authentication proof that may be used in order to cause a performance of cryptographic operations.

The backend system of the cryptography service 1600 also, in this illustrative example, includes a plurality of a security modules (cryptography modules) and a policy enforcement module. One or more of the security modules may be hardware security modules although, in various embodiments, a security module may be any suitable computer device configured according to have capabilities described herein. Each security module in an embodiment stores a plurality of keys associated with KeyIDs. Each security module may be configured to securely store the keys so as to not be accessible by other components of the cryptography service 1600 and/or other components of other systems. In an embodiment, some or all of the security modules are compliant with at least one security standard. For example, in some embodiments, the security modules are each validated as compliant with a Federal Information Processing Standard (FIPS) outlined in FIPS Publication 140-1 and/or 140-2, such as one or more security levels outlined in FIPS Publication 140-2. In addition, in some embodiments, each security module is certified under the Cryptogrpahic Module Validation Program (CMVP). A security module may be implemented as a hardware security module (HSM) or another security module having some or all capabilities of an HSM. In some embodiments, a validated module is used to bootstrap operations. In some embodiments, customers can configure some keys that are stored in and operated on only by validated modules and other keys that are operated on by software. In some embodiments, the performance or cost associated with these various options may differ.

The security modules may be configured to perform cryptographic operations in accordance with instructions provided by the request processing unit. For example, the request processing unit may provide ciphertext and a KeyID to an appropriate security module with instructions to the security module to use a key associated with the KeyID to decrypt the ciphertext and provide in response the plaintext. In an embodiment, the backend system of the cryptography service 1600 securely stores a plurality of keys forming a key space. Each of the security modules may store all keys in the key space; however, variations are considered as being within the scope of the present disclosure. For example, each of the security modules may store a subspace of the key space. Subspaces of the key space stored by security modules may overlap so that the keys are redundantly stored throughout the security modules. In some embodiments, certain keys may be stored only in specified geographic regions. In some embodiments, certain keys may be accessible only to operators having a particular certification or clearance level. In some embodiments certain keys may be stored in and used only with a module operated by a particular third party provider under contract with the provider of data storage services. In some embodiments, constructive control of security modules may require that lawful orders seeking to compel use of keys other than as authorized by the customer to involve either additional entities being compelled or additional jurisdictions compelling action. In some embodiments, customers may be offered independent options for the jurisdiction in which their ciphertexts are stored and their keys are stored. In some embodiments, security modules storing keys may be configured to provide audit information to the owner of the keys, and the security modules may be configured such that the generation and providing of audit information not suppressible by the customer. In some embodiments, the security modules may be configured to independently validate a signature generated by the customer such that the provider (e.g., hosting the security modules) is not able to perform operations under keys stored by the security modules. In addition, some security models may store all of the key space and some security modules may store subspaces of the key space. Other variations are also considered as being the scope of the present disclosure. In instances where different security modules store different subspaces of the key space, the request processing unit may be configured such as with a relational table or other mechanism to determine which security module to instruct to perform cryptographic operations in accordance with various requests.

In an embodiment, the policy enforcement module is configured to obtain information from a request processing unit and determine, based at least in part on that information, whether the request received through the API may be performed. For example, when a request to perform cryptographic operation is received through the request API, the request processing unit may interact with the policy enforcement module to determine whether fulfillment of the request is authorized according to any applicable policy such as policy applicable to a specified KeyID in the request and/or other policies such as policy associated with the requestor. If the policy enforcement module allows fulfillment of the request, the request processing unit may, accordingly, instruct an appropriate security module to perform cryptographic operations in accordance with fulfilling the request.

As with all figures described herein, numerous variations are considered as being within the scope of the present disclosure. For example, FIG. 16 shows the policy enforcement module separate from security modules. However, each security module may include a policy enforcement module in addition to or instead of the policy enforcement module illustrated as separate. Thus, each security module may be independently configured to enforce policy. In addition, as another example, each security module may include a policy enforcement module which enforces policies different from policies enforced by a separate policy enforcement module. Numerous other variations are considered as being within the scope of the present disclosure.

Figure 17:
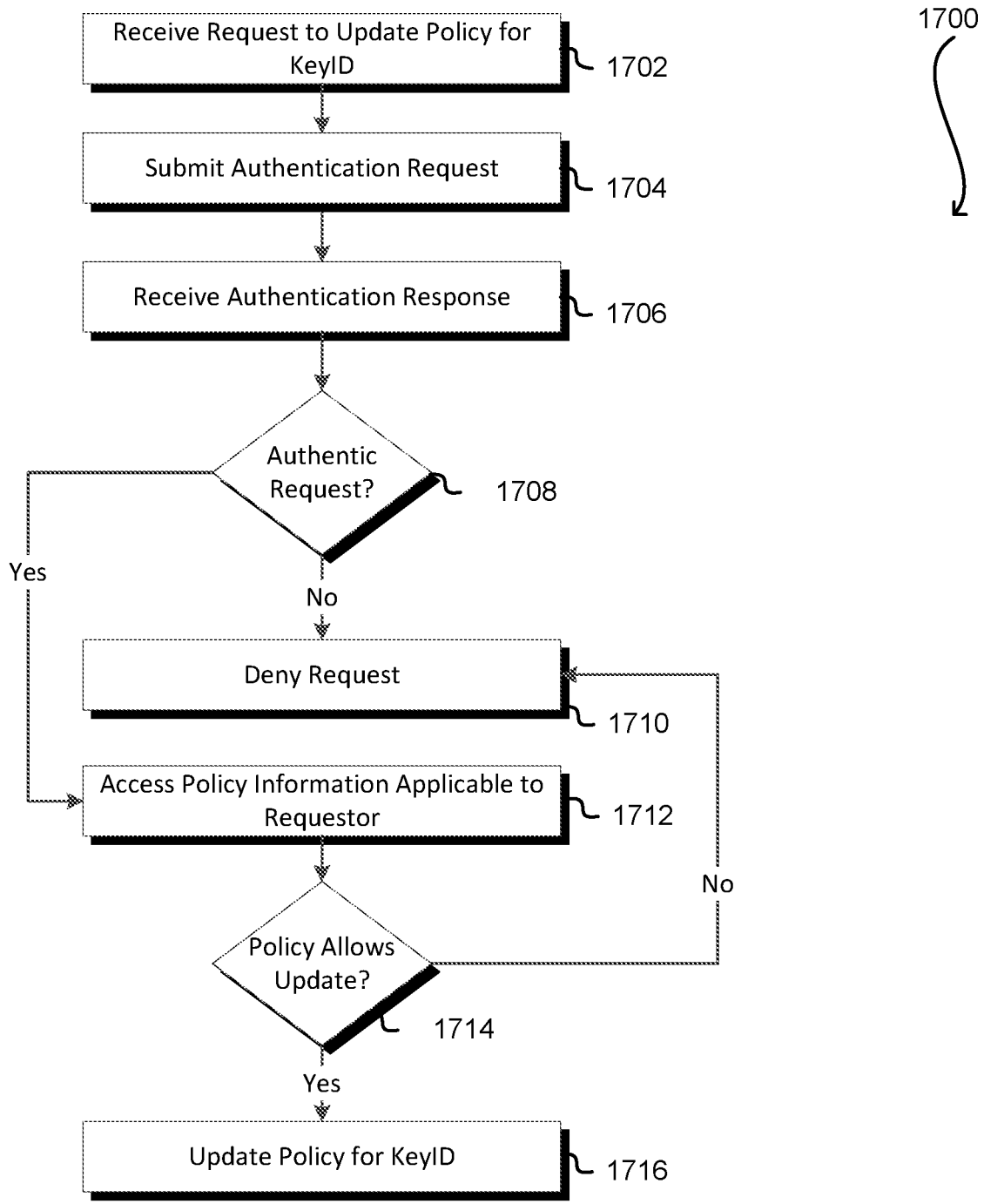
FIG. 17 shows example steps of an illustrative process for configuring policy, in accordance with at least one embodiment.

As discussed above, various policies may be configured by users in or association with KeyID such that when requests specify cryptographic operations being performed in connection with keys corresponding to KeyIDs, policy may be enforced. FIG. 17 provides an illustrative example of the process 1700 for updating policy in accordance with various embodiments. Process 1700 may be performed by any suitable system, such as by a cryptography service system, such as described above in connection with FIG. 16. In an embodiment, the process 1700 includes receiving 1702 a request to update policy for a KeyID. The request may be received 1702 in any suitable manner. For example, referring to FIG. 16 as an example, a request may be received through a policy configuration API of the frontend system of the cryptography service 1600 described above. The request may be received in any suitable manner.

The process 1700 in an embodiment includes submitting 1704 an authentication request and receiving 1706 an authentication response. Submitting 1704 the authentication request and receiving 1706 the authentication response may be performed in any suitable manner such as described above. Also as described above, the received authentication response may be used to determine 1708 whether the request to update policy for the KeyID is authentic. If it is determined 1708 that the received request to update policy for the KeyID is not authentic, the request may be denied 1710. Denying 1710 the request may be performed in any suitable manner as described above. If, however, it is determined 1708 that the received request to update policy for the KeyID is authentic, the process 1700 may include accessing 1712 policy information applicable to the requestor. The policy information may be information from which any policy applicable to the requestor may be enforced. For example, within an organization that utilizes a cryptography service performed by process 1700, only certain users of the organization may be allowed to update policy for KeyIDs. Policy information may indicate which users are able to cause the cryptography service to update policy for the KeyID and/or even whether the policy is updatable according to an existing policy. For example, a cryptography service may, in some embodiments, receive request to enforce a new policy. The cryptography service may check whether any existing policy allows the new policy to be put into place. If the cryptography service determines that the existing policy does not allow enforcement of the new policy, the request may be denied. Generally, the policy information may be any information usable for the enforcement of policy applicable to the requestor.

As illustrated in FIG. 17, the process 1700 includes using the access policy information to determine 1704 whether policy allows the requested update to be performed. If it is determined 1714 that the policy does not allow the requested update to be performed, the process 1700 may include denying 1710 the request such as described above. If, however, it is determined 1714 the policy allows the requested update to be performed, the process 1700 may include updating 1716 policy for the KeyID. Updating policy for the KeyID may include updating policy information and having the updated policy being stored in accordance with or in association with the KeyID. The updated policy information may be stored, for example, by a policy enforcement module of the cryptography service such as described above, in connection with FIG. 16.

Policy may also be enforced by other components of an electronic environment that operate in connection with a cryptography service. For instance, referring FIG. 2, discussed above, a cryptography service may provide an electronic representation of a policy to the data service frontend for the data service frontend to enforce. Such may be useful in circumstances where the data service is better suited to enforce the policy. For example, whether an action is allowed by policy may be based at least in part on information accessible to the data service frontend and not to the cryptography service. As one example, a policy may depend on data stored by the data service backend storage system on behalf of a customer associated with the policy.

Figure 18:
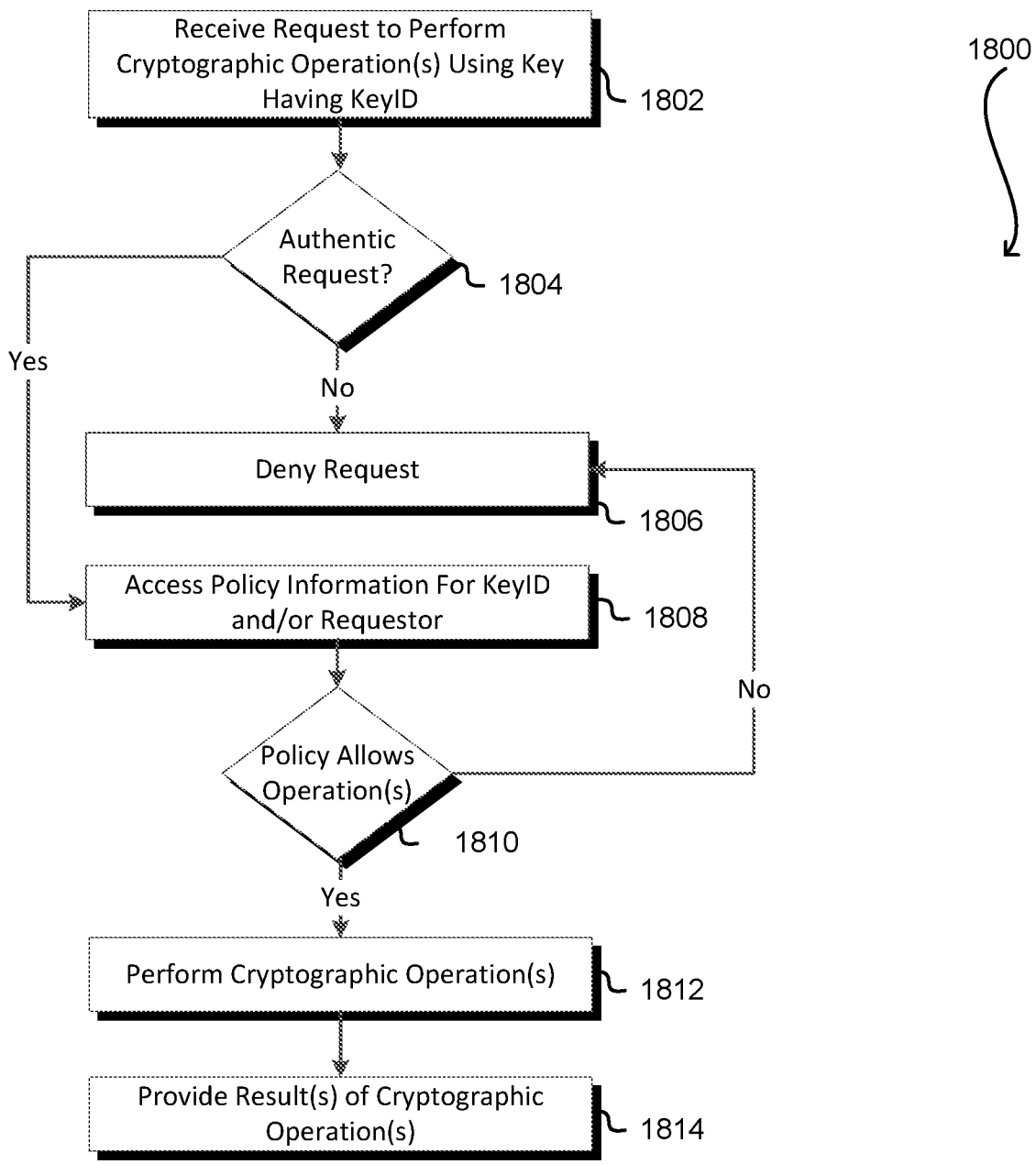
FIG. 18 shows example steps of an illustrative process for performing cryptographic operations while enforcing policy, in accordance with at least one embodiment.

As discussed above, a cryptography service may include various systems that allow for the enforcement of policy in accordance with policy on keys having KeyIDs. FIG. 18, accordingly, shows an illustrated example of a process 1800 which may be used to enforce policy. The process 1800 may be performed by any suitable system such as by a cryptography service system such as described above in connection with FIG. 16. In an embodiment, the process 1800 includes receiving 1802 a request to perform one or more cryptographic operations using a key having a KeyID. While FIG. 18 illustrates the process 1800 as being performed in connection with a request to perform one or more cryptographic operations, it should be noted that the process 1800 may be adapted for use with any request to perform an operation which is not necessarily cryptographic. Example operations are described above.

A determination may be made 1804 whether the received request is authentic. Determining whether the received request is authentic may be performed in any suitable manner such as described above. For instance, determining 1804 whether the request is authentic may include submitting an authentication request and receiving an authentication response such as described above. If it is determined 1804 that the request is not authentic, the process 1800 may include denying 1806 the request. Denying 1806 the request may be performed in any suitable manner such as described above. If, however, it is determined 1804 that the request is authentic, the process 1800 may include accessing 1808 policy information for the KeyID and/or the requestor. Accessing policy information for the KeyID and/or request may be performed in any suitable manner. For example, accessing policy information for the KeyID and/or requestor may be performed by accessing the storage policy information from one or more storage systems that store such policy information. The access policy information may be used to determine 1810 whether policy allows the one or more operations to be performed.

If it is determined 1810 that policy does not allow the one or more operations to be performed, the process 1800 may include denying 1806 the request. If, however, it is determined that policy does allow the one or more operations to be performed, the process 1800 may include performing 1812 the requested one or more cryptographic operations. One or more results of performance of the one or more cryptographic operations may be provided 1814 such as provided to the requestor that submitted the received 1802 request to perform the one or more cryptographic operations. In some embodiments information derived at least in part from allowed requests and or denied requests may be provided through an audit subsystem.

As discussed, embodiments of the present disclosure allow for flexible policy configuration and enforcement. In some embodiments, policies may state which services can perform which operations in which contexts. For example, a policy on a key may allow a data storage service to cause the cryptography service to perform encryption operations but not decryption operations. A policy on a key may also include one or more conditions on the ciphertext and/or decrypted plaintext. For example, a policy may require that the ciphertext and/or plaintext produce a certain hash value (which may be a keyed hash value) before results of an operation be provided in response to a request. Policies may specify one or more restrictions and/or permissions that are based at least in part on time, Internet Protocol (IP) from which requests originate, types of content to be encrypted/decrypted, AAD, and/or other information.

Numerous variations are considered as being within the scope of the present disclosure. For example, various embodiments discussed above discuss interaction with a separate authentication service. However, components of the environments discussed above may have their own authorization components and determining whether requests are authentic may or may not involve communication with another entity. Further, each of the environments discussed above are illustrated in connection with particular operations and capabilities enabled by the environments. The techniques discussed above in connection with different environments may be combined and, generally, environments in accordance with the present disclosure may allow for flexible use of the various techniques. As just one example, a cryptography service may be used to, upon request, encrypt both keys and other content, such as non-key data objects. As another example, a cryptography service may be configured to receive and respond to requests from both users (e.g., customers of a computing resource provider) and other services (e.g., data storage services). In some embodiments, a cryptography service and/or associated authentication service may be configured for use with a mobile device to perform encryption of stored data. In some embodiments at least one unlock pin may be validated by a cryptography service. In still other embodiments a cryptographic service, as part of an operation, may receive information generated by a hardware attestation. In some embodiments a cryptography service may be operable to provide digital rights management services with respect to content.

As discussed above, various embodiments of the present disclosure allow for rich policy enforcement and configurability. Many cryptosystems provide for authenticated encryption modes of operation where cryptographic operations can be performed to simultaneously provide confidentiality, integrity, and authenticity assurances on data. Confidentiality may be provided by encryption of plaintext data. Authenticity may be provided for both the plaintext and for associated data which may remain unencrypted. With such systems, changes to either the ciphertext or associated data may cause decryption of the ciphertext to fail.

Figure 19:
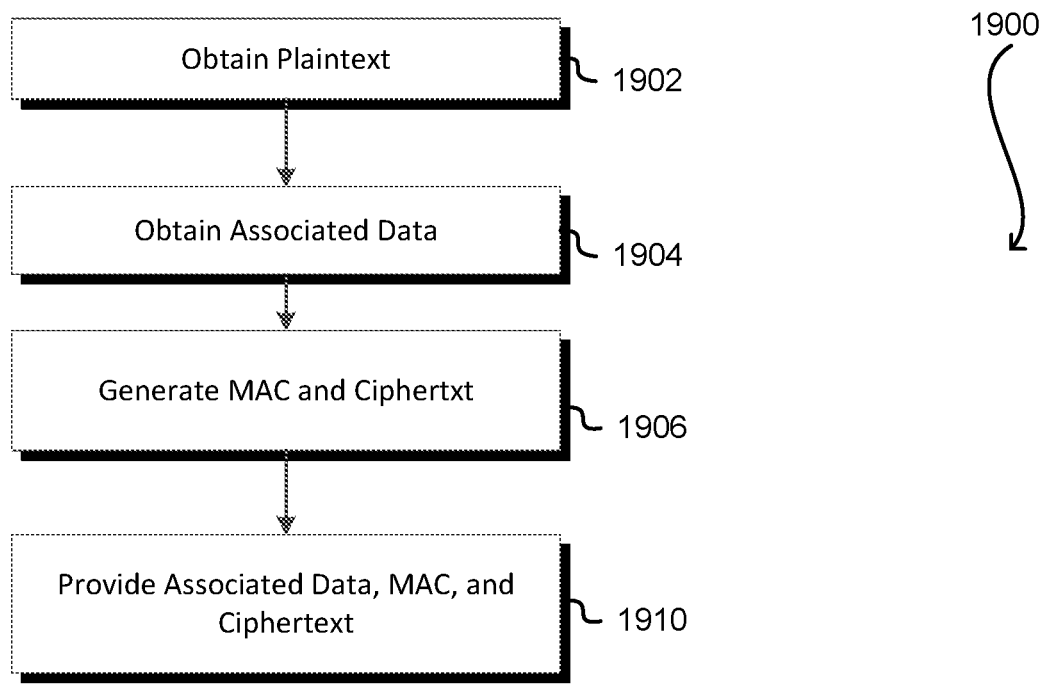
FIG. 19 shows an illustrative example of a process for encrypting data in accordance with at least one embodiment.

In an embodiment, data associated with plaintext is used in the enforcement of policy. FIG. 19, accordingly, shows an illustrative example of a process 1900 for encrypting data in a manner that allows for policy enforcement using associated data in accordance with various embodiments. The process 1900 may be performed by any suitable system, such as a cryptography service and/or a security module. As illustrated, the process 1900 includes obtaining 1902 plaintext. The plaintext may be obtained in any suitable manner. For example, in a service provider environment such as described above, a user (e.g., customer) may provide data to be encrypted. As another example, obtaining 1902 may include generating a key (to be encrypted) and/or obtaining a key to be encrypted. The key may be used, such as described above.

As shown, the process 1900 includes obtaining associated data 1904. The associated data may be any data that is associated with or is to be associated with the plaintext. The associated data 1904 may be any data on which one or more policies are, at least in part, based. Examples appear below. Further, the associated data 1904 may be encoded in any suitable manner, such as in eXtensible Markup Language (XML), JavaScript Object Notation (JSON), Abstract Syntax Notation One (ASN1), YAML Ain't Markup Language (also referred to as Yet Another Markup Language) (YAML), or another structured extensible data format. In an embodiment, the process 1900 includes generating 1906, based at least in part on the plaintext and the associated data, a message authentication code (MAC), and ciphertext 1910. The combination of a MAC and ciphertext, such as the output of the AES-GCM cipher, may be referred to as authenticated ciphertext. Generating the MAC and ciphertext may be performed in any suitable manner and generation of the MAC and ciphertext may depend on which cryptosystem(s) is/are used. For example, in an embodiment, the advanced encryption standard (AES) supports associated authenticated data (AAD) when operated in either CCM mode or GCM mode, where CCM represents Counter with CBC-MAC, GCM represents Galois/Counter Mode, and CBC represents a cipher block chaining. Using AES in either CCM or GCM mode, the plaintext and associated data may be provided as inputs to obtain output of the concatenated pair of the ciphertext and a MAC of both the plaintext and associated data. It should be noted that while AES-CCM and AES-GCM are provided for the purpose of illustration, other authenticated encryption schemes may be used and the techniques described explicitly herein can be modified accordingly. For example, techniques of the present disclosure are applicable, in general, to symmetric block ciphers supporting authenticated encryption modes. In addition, other encryption schemes are combinable with MAC functions in accordance with various embodiments of the present disclosure. Suitable encryption scheme and MAC function combinations include, but are not limited to, those where the encryption scheme is semantically secure under a chosen plaintext attack and the MAC function is not forgeable under chosen message attack. Further, while various embodiments of the present disclosure utilize ciphers that result in a single output that encodes both the ciphertext and the MAC, the MAC and ciphertext may be generated using different ciphers. Further, while MACs are used as illustrative examples, other values not generally referred to as MACs may also be used, such as general hashes, checksums, signatures, and/or other values that can be used in place of MACs. Accordingly, ciphers with automated encryption modes that support associated data include ciphers that use other cryptographic primitives in addition to or as an alternative to MACs.

Further, generating the MAC and ciphertext may be performed in various ways in accordance with various embodiments. For example, in an embodiment, the plaintext is provided to a security module, such as described above. The security module may be configured to generate the MAC. In other embodiments, a component of an electronic environment other than a security module generates the MAC and ciphertext. In such embodiments, a security module may be used to decrypt a key that, when in plaintext form, is used to generate the MAC and ciphertext. Once generated, the MAC and ciphertext (i.e., authenticated ciphertext) may be provided 1908. In some embodiments, the associated data is also provided. The MAC and ciphertext may be provided in various ways in various implementations making use of the process 1900 and variations thereof. For example, in some embodiments, the MAC, and ciphertext are provided to a user, such as described above, or provided to a data service, such as described above, for processing by the data service. Further, as noted, while the associated data may be provided, in various embodiments, the associated data is not provided and/or it is generally persisted in plaintext form. As an example, the associated data may not be provided if it is independently obtainable. As an illustrative example, if the associated data is a persistent identifier of a device (e.g., an identifier of a storage device), the associated data may be obtained at a later time when needed for policy enforcement and/or for other purposes.

Figure 20:
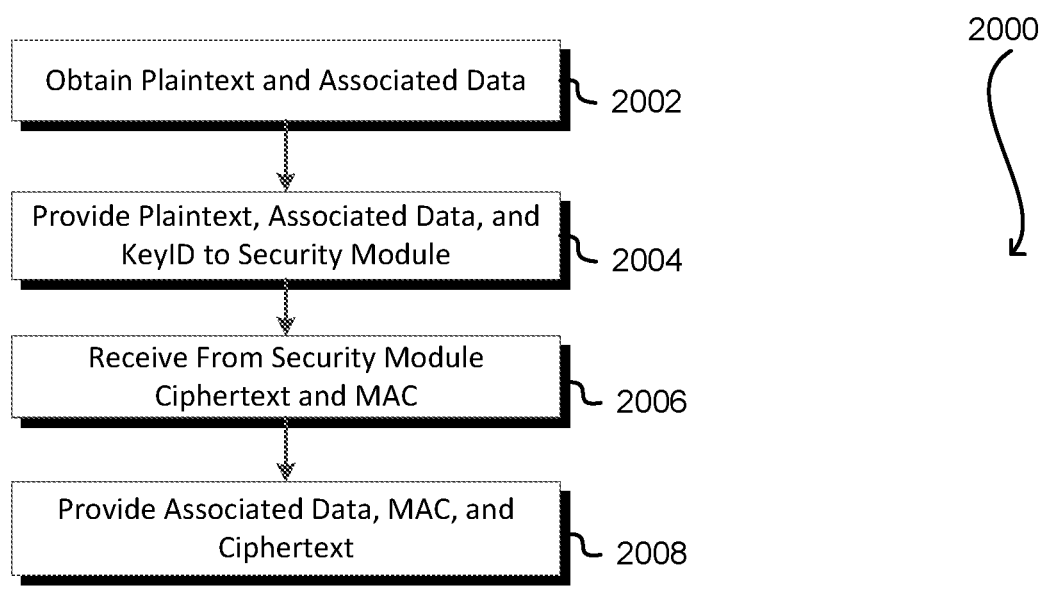
FIG. 20 shows an illustrative example of using a security module to encrypt data in accordance with at least one embodiment.

As discussed above, various embodiments of the present disclosure utilize security modules to provide enhanced data security. FIG. 20 provides an illustrative example of a process 2000 that may be used to encrypt data in a manner allowing for novel and rich policy enforcement, in accordance with various embodiments. The process 2000 may be performed by any suitable system, such as a cryptography service and/or a security module. As illustrated in FIG. 20, the process 2000 includes obtaining plaintext and associated data 2002. As above, the plaintext and associated data 2002 may be received in a single communication, in separate communications and/or from separate entities. Once obtained, the plaintext, associated data, and a KeyID are provided 2004 to a security module. The security module may be such as described above. Further, the security module may be selected from multiple security modules participating in an electronic environment, such as an environment supporting a cryptography service, such as described above. The KeyID may be as described above and may be specified in a request to encrypt the plaintext submitted to a cryptography service or may otherwise be specified. Further, in alternate embodiments of the process 2000, a KeyID may not be specified. For instance, in some embodiments, a security module may select a KeyID and/or may generate a key that is later assigned a KeyID. In such embodiments, the process 2000 may be modified to provide the KeyID from the security module.

Returning to the illustrated embodiment, the process 2000 may include receiving 2006 from the security module ciphertext and a MAC. The ciphertext may be encrypted under the key identified by the KeyID. The MAC may be a MAC over a combination of both the plaintext and associated data such that a change to the ciphertext or associated data will cause a check on the MAC to fail. As above, it should be noted that variations include those where the MAC is generated based at least in part on the associated data but independent of the plaintext. Further, as discussed above, the ciphertext and MAC may be provided together (such as from output of use of an AES-CCM or AES-GCM cipher) or may be provided separately. Once received from the security module, the MAC and ciphertext are provided 2008 to an appropriate entity, such as a user of a cryptography service or a data service that operates in connection with a cryptography service, such as described above.

Figure 21:
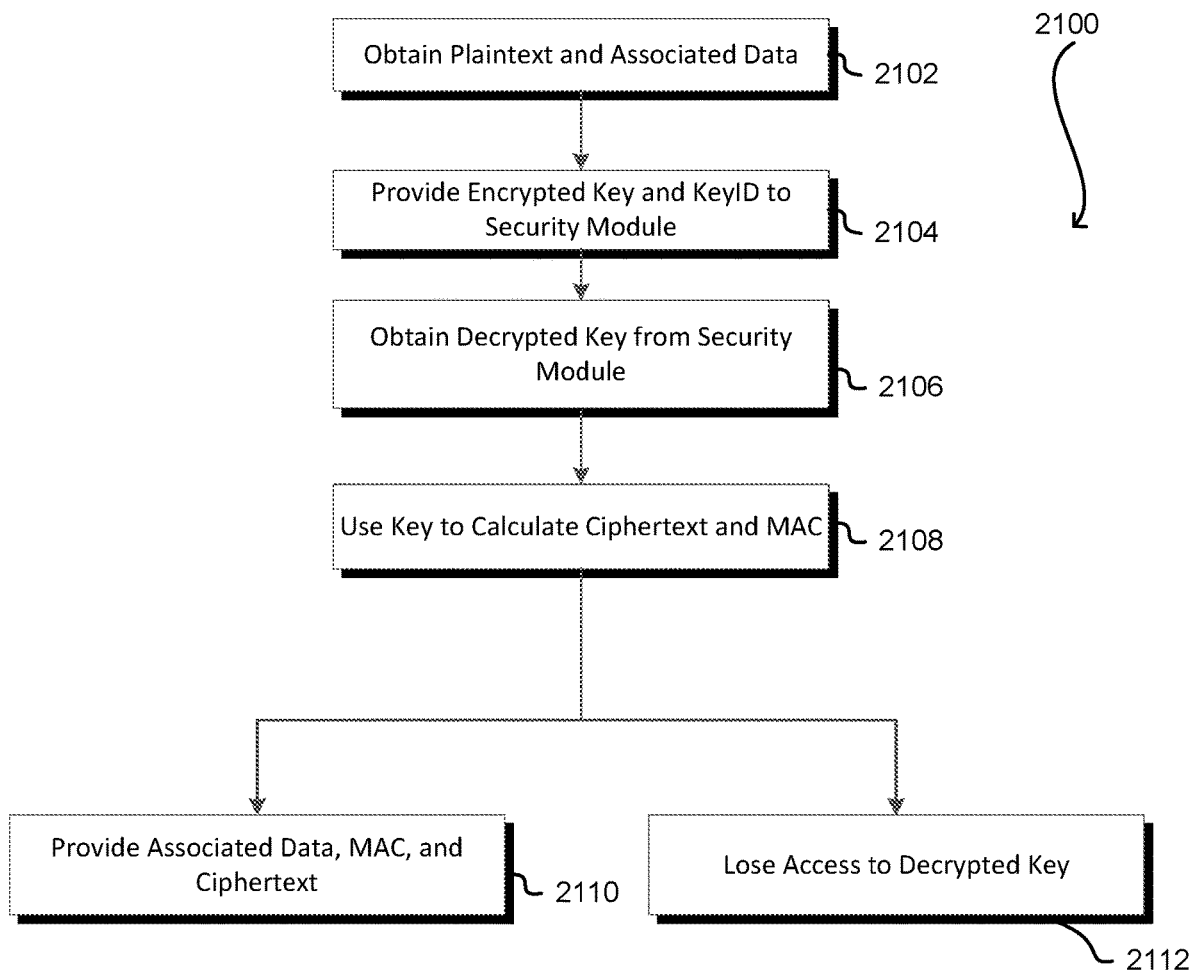
FIG. 21 shows an illustrative example of using a security module to encrypt a key used to encrypt data in accordance with at least one embodiment.

As discussed above, a security module may be used in various ways to enhance the protection of data. As discussed above, in some embodiments, security modules are used to encrypt keys that are used (in their plaintext form) to encrypt other data. FIG. 21 accordingly shows an illustrative example of a process 2100 that can be used in such circumstances. The process 2100 may be performed by any suitable system, such as a cryptography service and/or a security module. The process 2100, in an embodiment, includes obtaining 2102 plaintext and associated data, such as described above. As illustrated, the process 2100 includes providing 2104, to a security module, an encrypted key, associated data, and KeyID identifying a key usable by the security module to decrypt the encrypted key. Accordingly, the process 2100 includes obtaining a decrypted key from the security module 2106 that used the key identified by the KeyID to decrypt the encrypted key. Once obtained, the key can be used to encrypt the plaintext, thereby calculating 2108 ciphertext and a MAC. The ciphertext may be an encryption of the plaintext and the MAC may be over (i.e., based at least in part on) the associated data or both the associated data and plaintext, such as described above. Once encrypted, the process 2100 may include providing 2110 the MAC and ciphertext such as described above. Further, the process may also include losing 2112 access to the decrypted key, which may be performed in any suitable manner, such as by a SecureErase operation, overwriting memory storing the decrypted key, removing power to volatile memory storing the key and/or in any other way in which a system performs the process 2100 (e.g., a cryptography system absent its security modules). While illustrated in parallel, providing the associated data, MAC, and/or ciphertext and losing access to the key may be performed in sequence, the order of which may vary among the various embodiments.

Figure 22:
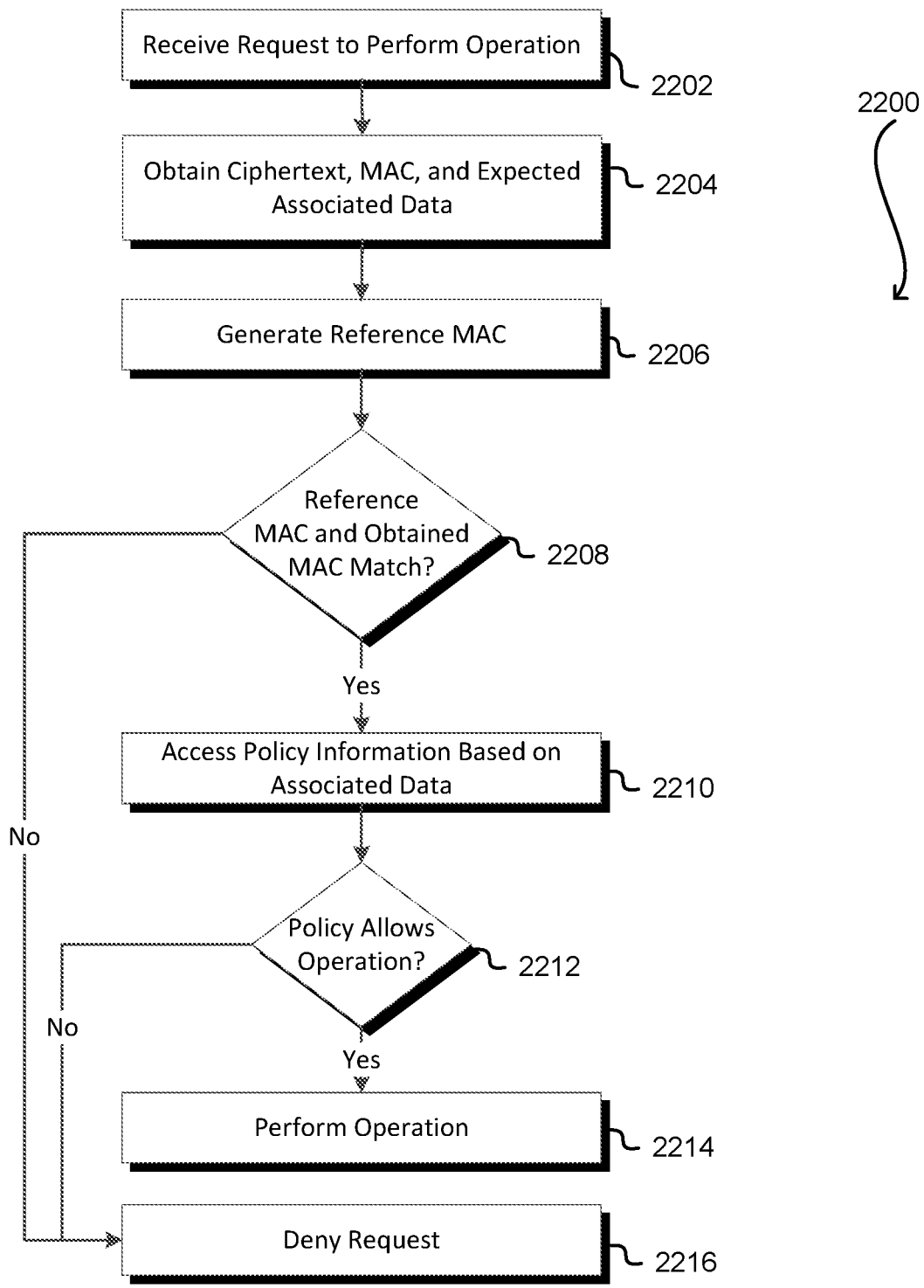
FIG. 22 shows an illustrative example of a process for enforcing policy using associated data in accordance with at least one embodiment.

FIG. 22 shows an illustrative example of a process 2200 that may be used to enforce policy using associated data, in accordance with various embodiments. The process 2200 may be performed by any suitable system, such as a cryptography service and/or a security module. In an embodiment, the process 2200 includes receiving 2202 a request to perform an operation. The request may be any request submitted to a service that processes requests. In an embodiment, the request is a request to perform a cryptographic operation submitted to a cryptography service. In response to receiving 2202 the request, the process 2200 may include obtaining 2204 ciphertext, a MAC, and expected associated data. Obtaining 2204 the ciphertext, MAC, and expected associated data may be performed in any suitable manner. For example, in some embodiments one or more of the ciphertext, MAC, and expected associated data are received in the request. Two or more of the ciphertext, MAC, and expected associated data may be received in separate requests or other communications and/or accessed from a data store, such as a local data store. For example, in an embodiment, the ciphertext and MAC are received as a concatenated pair (possibly generated from output of an AES-GCM or AES-CCM cipher) as part of the request. The expected associated data may also be part of the request or may be identified in other ways. For example, an identity of the requestor may be used, directly or indirectly, to determine the associated data. As a specific example, if the request is to perform an operation in connection with data stored in a storage device, obtaining 2204 the associated data may include obtaining an identifier of the data storage device. The identifier may be identified explicitly (e.g., as part of the request) or implicitly (e.g., because other information is available to determine that the data is stored in the data storage device). The associated data may be or may otherwise be based at least in part on the identifier of the data storage device. As discussed above, the associated data may vary greatly among the various embodiments.

In an embodiment, the process 2200 includes generating 2206 a reference MAC usable to determine the authenticity of the expected associated data. For example, the ciphertext, associated data, and an appropriate key (which may be identified in the request or may be otherwise determined) are used to generate 2206 a reference MAC. Generating the MAC may be performed in any suitable manner, such as by using the same cipher that was used to obtain the ciphertext. A determination may be made 2208 whether the reference MAC and the obtained MAC match. For example, in many cryptosystems, MACs match when they are equal, although it is contemplated that other types of matching may be used in various embodiments. If it is determined 2208 that the reference MAC and obtained MAC match, in an embodiment, the process 2200 includes accessing 2210 policy information based at least in part on the associated data. Accessing 2210 the policy information may include accessing one or more policies (i.e., electronic representations of the one or more policies) from a remote or local data store based at least in part on the one or more policies associated with a KeyID used to generate the reference MAC and/or perform another cryptographic operation.

A determination may then be made 2212, based at least in part on the accessed policy information, whether policy allows the requested operation to be performed (e.g., whether policy allows the request to be fulfilled). Determining whether the policy allows the requested operation to be performed may include determining whether the ciphertext is tagged with associated data specified by the accessed policy information. Further, while not illustrated, policy information that is not based at least in part on associated data (e.g., policies based on information other than associated data) may also be used to determine whether policy allows the operation to be performed. If determined 2212 that policy allows the operation, the process 2200 may include performing 2214 the operation. If, however, it is determined 2212 that policy does not allow the operation, and/or if determined 2208 that the reference MAC and obtained MAC do not match, the process 2200 may include denying 2216 the request, such as described above.

Various policies are enforceable using the techniques described above. For example, as noted, policies may be associated with keys such that, when enforced, the policies determine what can and/or cannot be done with the keys. As one example, a policy may state that a data service can use a key only for certain types of operations specified by the policy (or, alternatively, that certain operations are prohibited to the data service). A policy may also specify conditions on use, time of use, IP address, what may be encrypted, what may be decrypted, and the like. As one illustrative example, one policy may specify that providing a decrypted result is allowed only if a hash of the decryption matches a specified value. Thus, a cryptography or other service enforcing the policy would not provide plaintext if a hash of the plaintext was not in accordance with the policy. As another example, a policy may specify that decryption of ciphertexts is allowed only if the ciphertexts are tagged with associated data equal to or beginning with a specified value. As yet another example, a policy may specify that decryption of ciphertexts is allowed only if the ciphertexts are tagged with an identifier of a storage device encoded in associated data.

Generally, policies may specify restrictions and/or privileges that are based at least in part on the value of data associated with a ciphertext (i.e., authenticated associated data). Some additional policies include policies that specify decryption is only allowed on ciphertext tagged with an identifier of a computer requesting decryption, ciphertext tagged with an identifier of a storage volume mounted (operationally connected) to a computer requesting decryption, and/or ciphertext tagged with identifiers of other computing resources. The computing resources may also be computing resources hosted by a computing resource provider that enforces the policies. Other policies are considered as being within the scope of the present disclosure, such as policies that are based at least in part on the input and/or output of a cryptographic algorithm before the output of the cryptographic algorithm is revealed to an entity outside of the entity performing the cryptograph algorithm (e.g., revealed to a user and/or other data service outside of a cryptography service enforcing the policies). As noted above, policies may also specify conditions, which may be based at least in part on associated data, for when policies may be modified.

Figure 23:
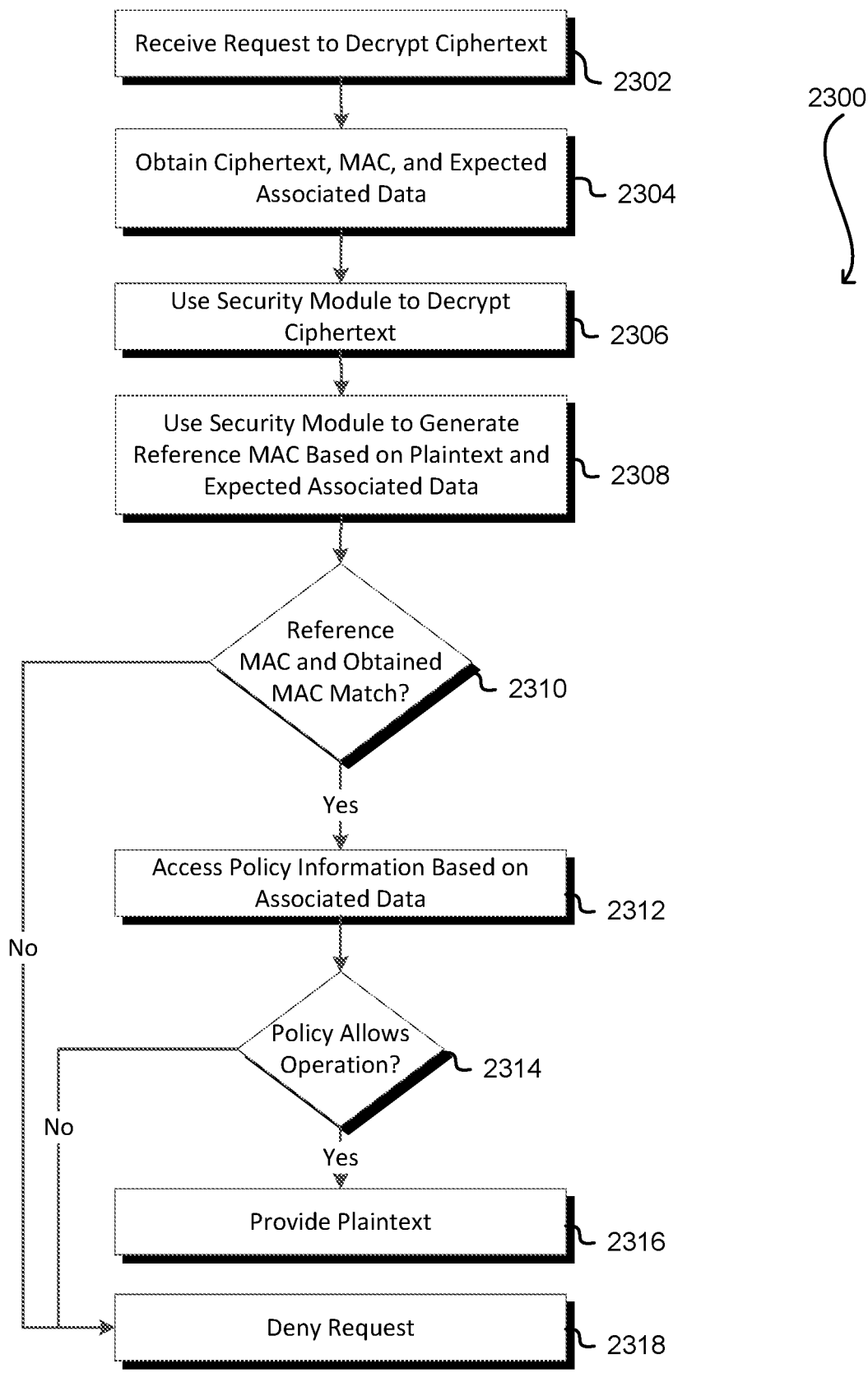
FIG. 23 shows an illustrative example of a process for enforcing policy using associated data and a security module in accordance with at least one embodiment.

FIG. 23 shows an illustrative example of a process 2300 which is a variation of the process 2200 discussed above in connection with FIG. 22, where the variation illustrates the use of a security module in enforcing policy, in accordance with various embodiments. In an embodiment, the process 2300 includes receiving 2302 a request to decrypt ciphertext, which may be an encrypted key or other encrypted data. The process 2300 also includes obtaining 2304 the ciphertext, MAC, and expected associated data, such as described above in connection with FIG. 22. As illustrated in FIG. 23, in an embodiment, the process 2300 includes using 2306 a security module to decrypt the ciphertext. Using 2306 a security module may also include selecting a security module from a plurality of security modules operable to decrypt the ciphertext, thereby producing plaintext. The security module may also be used 2308 to generate a reference MAC based at least in part on the plaintext and the expected associated data. It should be noted that, while shown as two separate steps in FIG. 23, using the security module to decrypt the ciphertext and generate the reference MAC may be performed in a single operation (e.g., a single request to the security module). Once obtained from the security module, the process 2300 includes determining 2310 whether the reference MAC and the obtained MAC match, such as described above in connection with FIG. 22. It should be noted, however, that in some embodiments, the process 2300 may be modified so that the security module is provided the reference MAC and determines whether the reference MAC and the obtained MAC match. In this variation, the security module may provide a response indicating whether there is a match.

Returning to the embodiment illustrated in FIG. 23, if it is determined 2310 that the reference MAC and obtained MAC match, the process 2300 includes accessing 2312 policy information based at least in part on the associated data, such as described above in connection with FIG. 22. Also, as above, while not illustrated as such, additional policy information regarding policies not based at least in part on associated data may also be accessed. A determination may be made 2314 whether policy allows the operation. If determined 2314 that policy does allow the operation, the plaintext may be provided 2316. As above in connection with FIG. 22, if determined 2314 that policy does not allow the operation and/or if determined that the reference MAC does not match the obtained MAC, the process may include denying 2318 the request, such as described above.

While various embodiments of the present disclosure are illustrated using associated data of an authentication mode of a cipher, other embodiments are also considered as being within the scope of the present disclosure. For example, embodiments of the present disclosure generally apply to the use of data that is verifiable with ciphertext to enforce policy. As an illustrative example, a representation of a policy can be combined with a first plaintext to generate a new plaintext (e.g., a new plaintext comprising the plaintext and the policy). The new plaintext can be encrypted using a suitable cipher, such as AES, to produce a ciphertext. When a request to decrypt the ciphertext is received, a system receiving the request may decrypt the ciphertext, extract the policy from the new plaintext, and check whether the policy allows the first plaintext to be provided. If policy does not allow for the first plaintext to be provided, the request may be denied. Such embodiments may be used instead of or in addition to the embodiments discussed above in connection with associated data of an authentication mode of a cipher.

Various embodiments of the present disclosure also allow for policies on keys that specify conditions for how auditing takes place. For example, a policy on a key may specify an audit level for a key, where the audit level is a parameter for a cryptography service that is determinative of how the cryptography service audits key use. Auditing may be performed by any suitable system. For example, referring to FIG. 16, the request processing unit may communicate with an auditing system (not shown) that may be part of or separate from the cryptography service. When events occur in connection with the performance of cryptographic operations, relevant information may be provided to the auditing system that logs the information. Events may be requests to perform cryptographic operations and/or information indicating whether the requested operations were performed. For example, if a user successfully requests the cryptography service to perform a decryption operation, the cryptography service may provide the auditing system information to enable the request and that the operation was performed. Administrative access events and, generally, any interaction or operation of the cryptography service may be logged with relevant information which may identify entities involved in the events, information describing the events, a timestamp of the events, and/or other information.

In an embodiment, audit levels include a high-durability level and a low-durability level. For a low-durability level, audit operations for a key may be performed by a cryptography service on a best-effort basis. With auditing according to a low-durability level, during normal operation, all operations are audited but, in the event of a failure of a component of the cryptography service, some audit data may be lost. With auditing according to a high-durability level, before revealing the result of a cryptographic operation, an assurance, that an audit record that the operation has occurred has been durably committed to memory, is obtained. Because of the acknowledgment needed, operations in high durability audit mode are slower than operations in low durability audit mode. The assurance that the audit record has been durably committed to memory may include an acknowledgment from one or more other systems used to store audit records. Thus, referring to the previous paragraph, a cryptography service may delay providing plaintext to a user until an acknowledgement from the auditing system that a record of the decryption resulting in the plaintext has been durably committed to memory. Durably committed to memory may mean that the data has been stored in accordance with one or more conditions for durability. For example, the data may be durably committed to memory when the data is written to non-volatile memory and/or the data has been redundantly stored among a plurality of data storage devices (e.g., using an erasure coding or other redundancy encoding scheme).

In an embodiment, a cryptography service uses sub-levels for the low-durability and high-durability audit levels. For example, in an embodiment, each level corresponds to two separate states, an immutable state and a mutable state. Whether the state is immutable or immutable may determine how and whether transitions between states are to occur. For example, using the illustrative example of audit durability, policy on a key may be able to change between low-durability mutable and high-durability mutable, from low-durability mutable to low-durability immutable, and from high-durability mutable to high-durability immutable. However, a cryptography service may be configured such that, once the policy for the key is in either low-durability immutable or high-durability immutable, transition is prohibited. Thus, once the policy for a key is in an immutable state, the policy cannot be changed.

Figure 24:
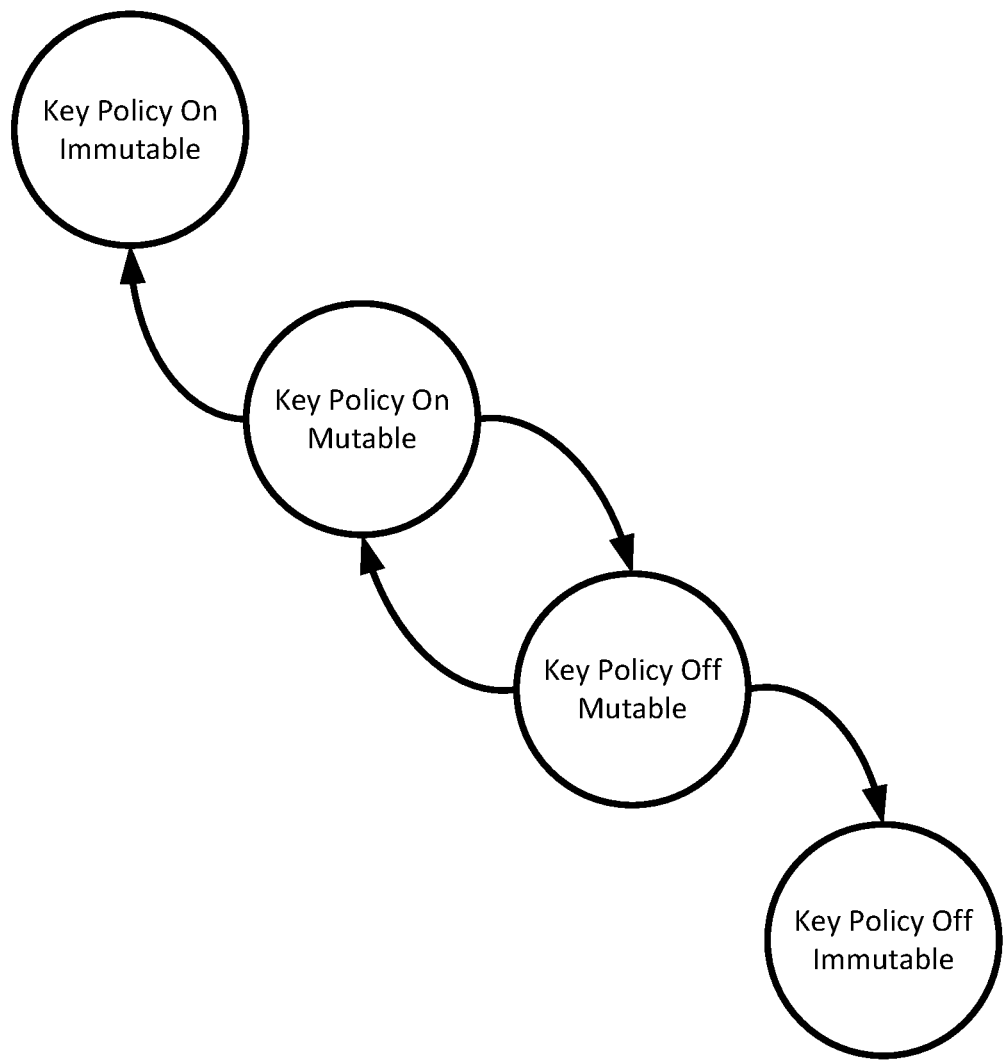
FIG. 24 shows an illustrative example of a state diagram for a policy, in accordance with at least one embodiment.

FIG. 24 shows an illustrative example of a state diagram for such a system, generalized to a policy that can be on (enforced) and off (unenforced). As illustrated in FIG. 24, the policy for a key can be on or off. When on and immutable, the policy can be changed to on and immutable (unchangeable) or to off and mutable (changeable). Similarly, when the policy is off but mutable, the policy can be changed to be on but mutable or to be off and immutable. It should be noted that other transitions may also be available, such as a direct transition from the policy being off but mutable to on and immutable. Further, not all transitions shown may be available. For example, the key may not have an off and immutable state in some instances.

Figure 25:
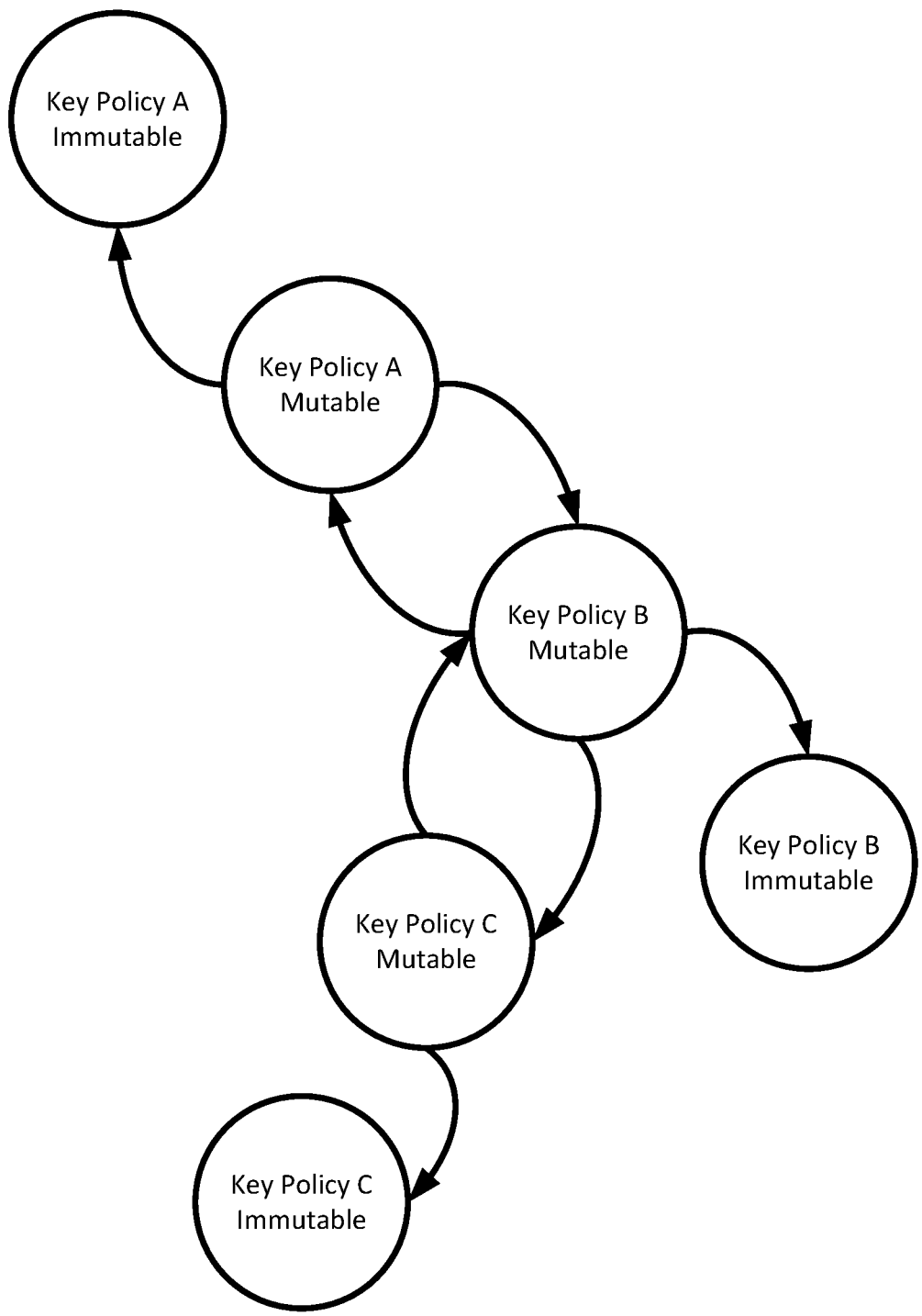
FIG. 25 shows an illustrative example of another state diagram for a policy, in accordance with at least one embodiment.

FIG. 25 shows a generalized state diagram showing how a system may allow transitions among various policies applicable to a key. In this example, three policies, Policy A, Policy B and Policy C are shown. Each of these policies has a mutable and immutable state and transitions allowable between the states and the policies are shown. For example, transitions out of an immutable state are not allowed. However, a policy in a mutable state can be changed to another policy in a mutable state. For instance, the policy on the key may be changed from Policy A (mutable) to Policy B (mutable). As illustrated with Policy B, there may be transitions available to multiple policies. For example, from Policy B, the policy can be changed to either Policy C or Policy A. As with FIG. 24, other transitions and policies may be included and not all policies may have all states. Further, while various examples show a policy with an immutable and mutable state, policies may have more than two states, where each state corresponds to a set of actions that can or cannot be performed. For example, a semi-mutable state may allow some, but not all transitions that would be available under a mutable state.

As noted, policies can be used for various operations in addition to auditing. For example, the above restrictions on policy transitions may be applied to key shredability. For instance, a policy may indicate whether a key may be shredded (irrevocably lost). The policy may have four states: shredable-mutable; shredable-immutable; unshredable-mutable; and unshredable-immutable. As above, when in an immutable state, the policy may not be changed. As another example, a policy on whether a key can be exported from a security module may also have such a quad-state policy.

Policies may also be associated with keys to prevent key use from enabling vulnerabilities to security attacks. For example, in an embodiment, one or more keys are associated with an automatic rotation policy that causes keys to be retired (e.g., marked so as to be no longer usable for encryption) after a certain amount of use. Such a policy may be a user-configurable (e.g., customer-configurable) policy that users (e.g., customers) activate and/or provide parameters for. The policy may also be a global policy applicable to a larger set of keys (such as a set comprising at least all keys managed by a cryptography service on behalf of its customers). In this manner, keys can be retired before they are used enough times to enable cryptographic attacks where knowledge of enough plaintexts and corresponding ciphertexts provide an ability to determine the key.

Figure 26:
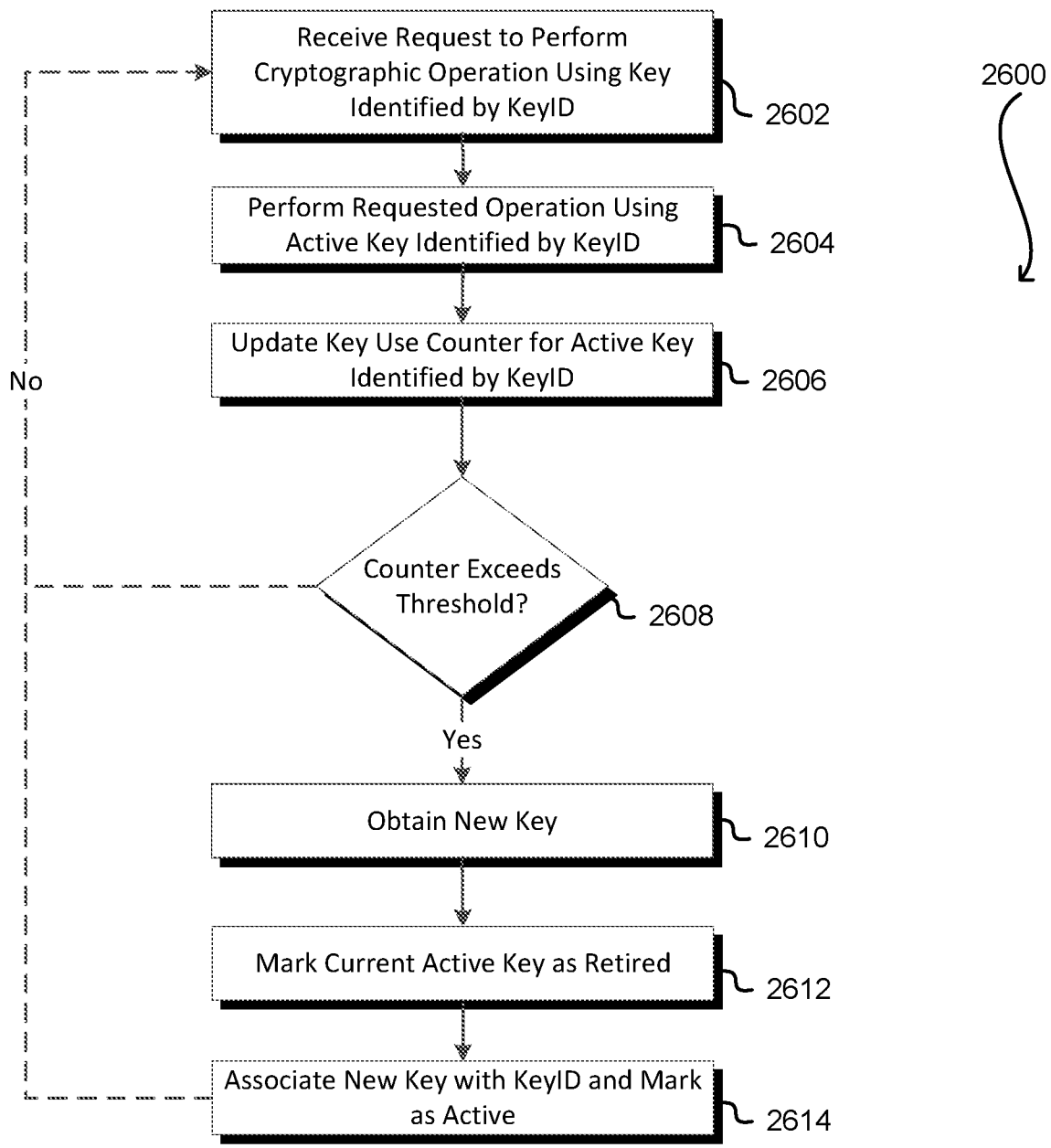
FIG. 26 shows an illustrative example of a process for automatically rotating keys in accordance with at least one embodiment.

FIG. 26 shows an illustrative example of a process 2600 which may be used to rotate keys at appropriate intervals, in accordance with various embodiments. The process 2600 may be performed by any suitable device, such as a security module discussed above. In an embodiment, the process 2600 includes receiving 2602 a request to perform a cryptographic operation using a key identified by a KeyID. The request may be a request received from a cryptography service request processor, such as described above. The request may be a request to encrypt or decrypt data or, generally, to perform any cryptographic operation using the key identified by the KeyID, such as generation of an electronic signature, another key, or other information based at least in part on the key. Upon receipt 2602 of the request, the process 2600 includes performing 2604 the requested operation. Performing the requested operation may include additional operations, such as selecting an appropriate version of the key to perform the operation. For example, if the operation is encryption, a key marked as active may be used to encrypt. If the operation is decrypted, performing the operation may include selecting an appropriate version of the key identified by the KeyID to decrypt, which, in various embodiments, is the key originally used to encrypt the data. The key may be selected through various ways. For example, in some embodiments, the ciphertext may include metadata that identifies a version, serial number, date, or other information that enables selection of the key. In some embodiments, each possible key may be tried until data is properly decrypted, where proper decryption may be determined by a hash of plaintext output associated with the ciphertext or by the correctness of associated data.

Once the cryptographic operation has been performed 2604, the process 2600 includes updating 2606 a key use counter for an active key identified by the KeyID. For example, if the cryptographic operation results in a single use of the key, the counter may be incremented by one. Similarly, if the cryptographic operation results in N (N a positive integer) uses of the key, the counter may be incremented by N. A determination may be made 2608 whether the counter exceeds a threshold. The threshold may be a number of uses allocated to a version of the key identified by the KeyID. The threshold may be provided by a component of a cryptography service that manages allocation of operations for keys. The threshold may also be a default number of operations. If determined 2608 that the counter exceeds the threshold, in an embodiment, the process 2600 includes obtaining 2610 a new key. Obtaining the new key may be performed in any suitable manner. For example, if the process 2600 is performed by a security module, obtaining the new key may include generating the new key or obtaining the new key from another security module, which may be orchestrated by an operator of the cryptography service. Passing keys from one security module to the other may be performed by encrypting the key with a key to which the providing and receiving security modules have access. The security module performing the process 2600 may receive and decrypt the encrypted key. Public-key key exchange techniques may also be used.

Once a new key has been obtained, in an embodiment, the process 2600 may include marking 2612 the current active key as retired. Marking the current active key as retired may be performed in any suitable manner, such as by changing an appropriate value in a database maintained by the security module. Further, the process 2600 may include associating 2614 the new key with the KeyID and marking the new key as active, such as by updating a database maintained by the security module. While not illustrated, the process 2600 may also include providing the new key for use by another security module. As indicated by the dashed line, at some point after the new key is ready for use by the security module (or other system) performing the process 2600, the process may include receiving 2602 a request to perform another cryptographic operation and the process 2600 may proceed as discussed above. Further, if it is determined 2608 that the counter does not exceed the threshold, the process 2600 may end and/or repeat once another request is received 2602.

Figure 27:
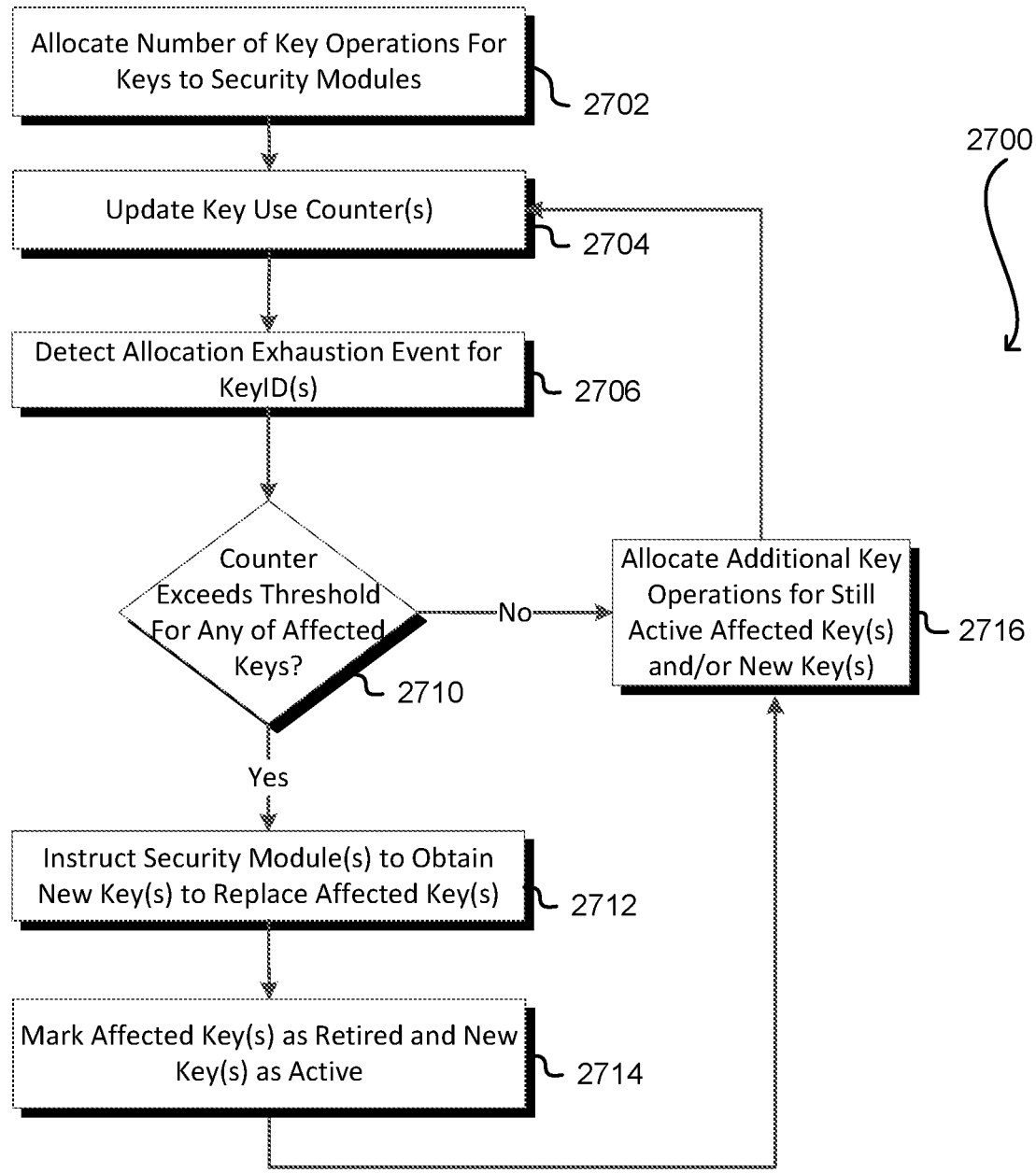
FIG. 27 shows an illustrative example of a process for automatically rotating keys in accordance with at least one embodiment.

FIG. 27 shows an illustrative example of a process 2700 that may be used to perform automatic rotation of keys in a cryptography service or other environment, in accordance with various embodiments. The process 2700 may be performed by any suitable system, such as s component of a cryptography service that tracks key usage and orchestrates key rotation in accordance with the various embodiments. As illustrated in FIG. 27, the process 2700 includes allocating 2702 a number of key operations for keys (e.g., a number of operations for each of a plurality of keys) to one or more security modules. As a specific example, in an environment utilizing five security modules to redundantly store/use a set of keys, each security module may be allocated one million operations for each of the keys it manages. Security modules (or other computer systems) to which operations are allocated may be hosted in the same data center of among multiple data centers. For example, in some embodiments, a computing resource provider utilizes security modules in multiple data centers in multiple geographic areas to implement a geographically distributed cryptography or other service.

It should be noted, however, that allocations may be made for some, but not all keys, and the allocation for each key may not be equal. Allocating the key operations may include providing notice of the allocation to each security module to which key operations have been allocated. The notice may specify the number that has been allocated for each key or, in some embodiments, the notice to a security module may indicate to the security module to reinitialize a counter that is pre-programmed into the security module or to add a preprogrammed number to a counter. Upon allocating 2702 the key operations to the security modules, a key use counter for each of the keys for which operations have been allocated may be updated. Continuing the above concrete example, if each of the five security modules has been allocated one million operations for a key identified by a particular KeyID, a counter for the KeyID may be incremented (upward or downward, depending on whether counting is performed upward or downward) by five million.

Upon having been allocated key operations, security modules may perform cryptographic operations such as described above. Security modules may maintain their own counters that are based, at least in part, on the allocations that have been made. With the above example, if a security module has been allocated one million operations for a key identified by a particular KeyID, the security module may set the counter to one million (or more than a million if an existing counter had remaining operations). Upon performing cryptographic operations using the key, the security module may increment its own counter accordingly.

At some point, an allocation exhaustion event for one or more KeyIDs may be detected 2706. An exhaustion event may be any event for which one or more security modules loses or exhausts its allocation. As one example, a security module may use its allocation of operations for a key identified by a particular KeyID and detection of an exhaustion event may include receiving, from the security module, a notification that the security module has exhausted its allocation for the KeyID by performing a corresponding number of operations (or is within some predetermined threshold of exhausting its allocation or is otherwise predicted to soon exhaust its allocation). As another example, in some embodiments, security modules are configured to lose access to keys stored therein (and data associated with the keys, such as counters) upon certain events, such as a malfunction, a detection of intrusion or other tampering, or when an operator needs access to the security module for maintenance. Accordingly, an exhaustion event may comprise a loss (possibly temporary) of a security module due to malfunction or detection of tampering/intrusion an intentional action (such as taking the security module out of commission temporarily for maintenance). In this example, a security module may be treated as if it used its allocation even though it did not necessarily perform the allocated number of operations. It should be noted, however, that all such events may not comprise exhaustion events in certain embodiments, such as when counters are persistently stored and, therefore, recoverable even upon loss to access to corresponding keys. It should also be noted that an exhaustion event may affect more than one security module. For example, a power outage affecting multiple security modules in a data center may result in an exhaustion event affecting multiple security modules.

Upon detection of the exhaustion event, a determination may be made 2710 whether a counter exceeds a threshold for any of the keys associated with the exhaustion event. The threshold may be a predetermined number of operations based at least in part on mathematical properties of a cipher used to perform cryptographic operations. For example, for ciphers with CBC modes, the number of operations may be or may otherwise be based at least in part on the size of the key space divided by the product of the squares of: (1) the length of the ciphertexts, expressed in blocks; and (2) the number of ciphertexts. For ciphers with CTR modes (such as AES-GCM), the number of operations may be or may otherwise be based at least in part on the size of the key space divided by the product of: (1) the square of the length of the ciphertext in blocks; and (2) the number of ciphertexts. If determined 2710 that the counter exceeds the threshold for any of the keys affected by the exhaustion event, the process 2700 may include instructing 2712 one or more security modules (i.e., the one or more security modules associated with the exhaustion event) to obtain one or more new keys for which the allocation of operations has been exhausted and replace the affected key(s) with the new key(s). For example, if a security module went offline temporarily (thereby causing the exhaustion event) and, as a result, caused a counter for a KeyID (but not necessarily all KeyIDs) to exceed the threshold, the security module may be instructed to obtain a new key, such as described above (e.g., by generating a new key, accessing a pre-generated key from data storage or obtaining a new key from another security module). It should be noted, however, that a different security module from the security module affected by the exhaustion event may be instructed to obtain a new key, such as when one security module is brought offline and a new security module is brought online. Replacing an affected key (identified by a KeyID) with a new key may include marking the affected key as retired, associating the new key with the KeyID (e.g., in a database) and marking the new key as active. Replacing the affected key with the new key may also include initializing a counter (maintained by the security module replacing the affected key with the new key) for the new key, which may be a preprogrammed value or may be a value obtained from a system performing the process 2700. The process 2700 may also include marking 2714 the affected key(s) as retired and the new key(s) as active, such as by updating a database accordingly. It should be noted that a system performing the process 2700 may not have access to the affected and/or new key(s) and, as a result, marking the affected key(s) as retired and the new key(s) as active may include associating identifiers of the keys with values indicative of being retired or new, as appropriate.

In an embodiment, upon marking 2714 if it is determined 2710 that none of the affected keys have a counter exceeding the threshold, the process 2700 may include 2716 allocating additional key operations for the still active affected key(s) and/or any new key(s) that were obtained as a result of performing operations of the process 2700. Upon allocation of additional key operations, appropriate key use counter(s) may be updated 2704, such as described above.

As with all process described herein, variations are considered as being within the scope of the present disclosure. For example, in some embodiments, security modules do not track their use of a key, but another component of a cryptography or other service updates the counter for a key for each request submitted to any security module to perform one or more operations using the key. In such embodiments, for each key of a plurality of keys, the component of the security module may track requests to perform operations using the key (or track the operations performed, e.g., through acknowledgements or other indications that the requests were successfully fulfilled), updating a counter for the key accordingly. When the counter reaches the threshold, the system maintaining the counter may cause all appropriate security modules to retire the key and replace the key with a new key (or perform some other operation that causes the key to be retired, such as causing the security modules having the key to retire the key and causing one or more other security modules to start using a new key). As another example of a variation being within the scope of the present disclosure, in some embodiments, when a security module uses its allocation of key operations and causes the counter to exceed the threshold, the security module may be instructed to obtain a new key, such as described above. Other security modules may continue using the key until they use their allocations. When a security module uses its allocation, it can obtain the new key that has replaced the key in the security module that caused the counter to exceed the threshold. In other words, security modules may be allowed to use up their allocations of key operations before having to obtain a new key.

FIG. 28 shows an illustrative example representation of a database used to maintain track of key usage. The database may be maintained by an appropriate system, such as a system performing the process 2700. In the database illustrated, columns correspond to, respectively, KeyIDs, key versions, usability, and a counter. The KeyIDs and Key Versions may be as described above. A value in the usability column may indicate whether the key is retired or active (or whether the key has another state, should such other states be supported by various implementations of the present disclosure). As illustrated in FIG. 28, the database has a row for each version of a key identified by a KeyID, including all retired versions and the active version. It should be noted, however, that a database may lack all versions of a key. For instance, keys may be permanently removed from storage for various security reasons. Removal may be, for instance, pursuant to a customer request or enforcement of a policy.

As illustrated in FIG. 28, the database illustrated also includes a counter for each active key. Also, in this particular example, the database includes a counter for inactive keys (e.g., showing a value for each key that exceeds a threshold, thereby causing a new key to be obtained). Counter values for inactive keys, however, may not be retained in some embodiments. A counter may be updated by a system that maintains the database as key operations are allocated to security modules. Once a value in the counter row exceeds a threshold value, a new row may be added to the database to accommodate a new key to replace the key whose counter value exceeded the threshold.

Security modules may maintain similar databases for their own purposes. For example, a security module may track its own use of keys and, when use of a key by the security module exhausts the number allocated to the security module, the security module may notify a key rotation management component of a cryptography service (or of another service using a security module) which may, for instance, perform a process such as the process 2700 described above to either reallocate additional operations to the security module or to cause the security module to obtain a new key if a number of key operations available for a key have been exhausted.

Databases used to track key use may vary from that which is illustrated in FIG. 28 and described above. For example, additional information may be included in a database, such as metadata associated with the key, such as a time of generation, a time of retirement, information about a customer for whom the key is used, and/or other information which may be useful in the various embodiments. Further, while a relational table is provided for the purpose of illustration, other ways of storing data in support of the various embodiments may be used.

Figure 29:
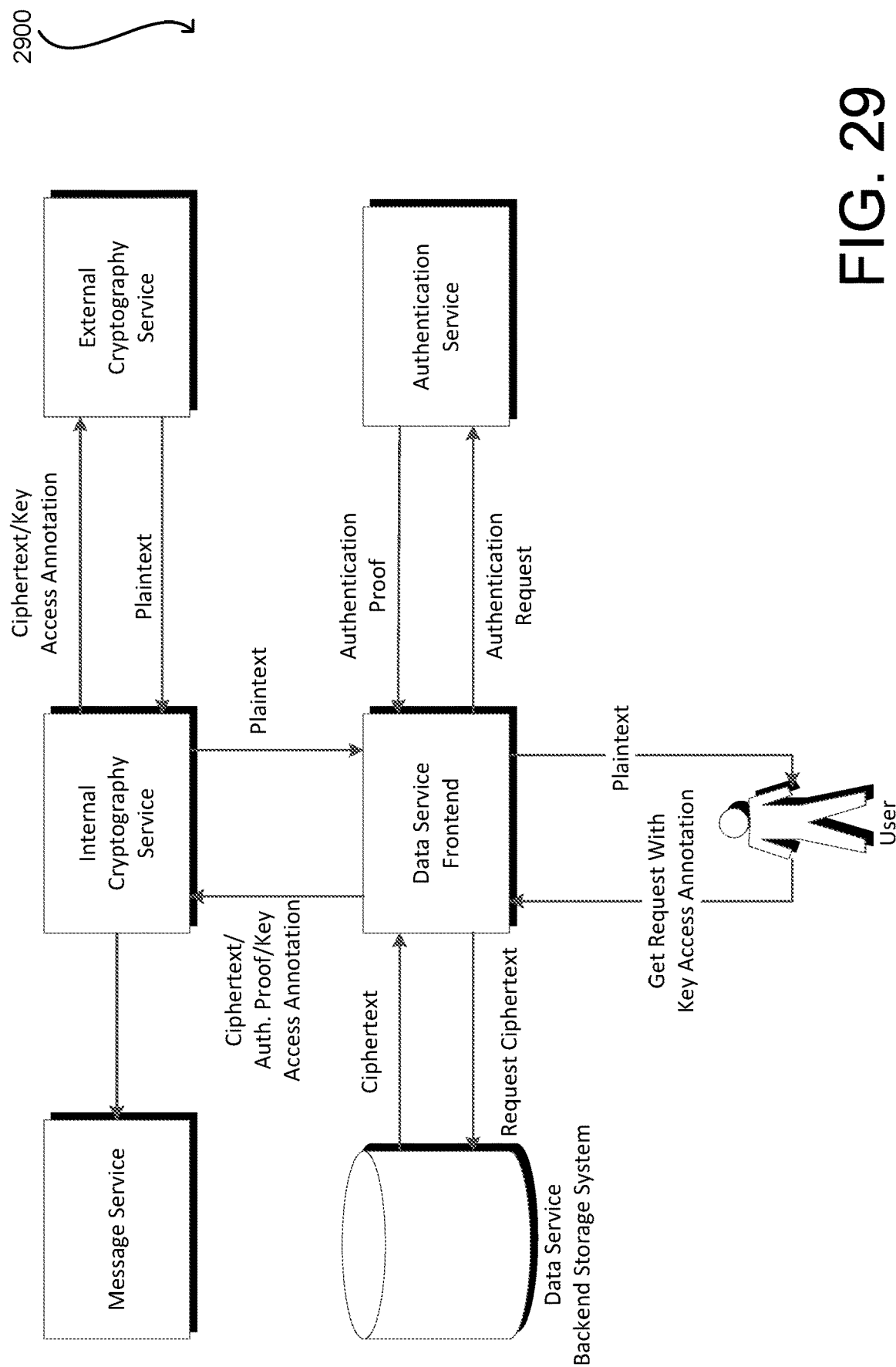
FIG. 29 shows an illustrative example of an environment in which various embodiments can be implemented.

Information used to enforce policy may be obtained by a cryptography service in various ways. FIG. 29 shows an illustrative example of an environment 2900 in which various embodiments of the present disclosure may be practiced. Components of the environment 2900 may include components such as those discussed above. For example, as illustrated, the environment 2900 includes a user that, through a user device, interacts with a data service frontend system (data service frontend), although in place of a user may be any computer system configured to interact with the data service frontend. Further, as illustrated, the environment includes a data service backend storage system and an authentication service, which may be as described above. In addition, the environment includes a cryptography service which, in FIG. 29, is labeled as an internal cryptography service to distinguish from another cryptography service, labeled in the figure as an external cryptography service. Either or both of the internal and external cryptography services may operate as a cryptography service, such as described above. As with all environments described herein, variations are considered within the scope of the present disclosure. For example, while FIG. 29 shows a user communicating with the data service frontend, the user may communicate with the cryptography service without the data service frontend, such as described above.

Further included in the environment 2900 is a message service which, in an embodiment, is a computer system (e.g., computer or network of computers) configured to at least, in response to a request from the internal cryptography service, publish messages to one or more subscribers, which may be represented by accounts. As discussed in more detail below, some requests may trigger components in the environment 2900 to operate so as to use the message service to transmit messages about the requests. For example, some data may be stored encrypted under a key that has an associated policy that responses to decryption requests must be delayed by a specified amount of time. If a request to decrypt the data is submitted, enforcement of policy may result in a delayed response and notifications to be sent by the message service. In this manner, a user or computer system monitoring the messages may have, during the delay, the opportunity to submit a request to cancel the decryption request or otherwise cause the decryption request to be cancelled. The message service may transmit messages to one or more subscribers using one or more technologies including, but not limited to, electronic mail, short message service (SMS), telephone, paging, facsimile, and/or any suitable technology usable for the transmission of information from the message service to another entity.

As illustrated in FIG. 29, requests submitted to the data service frontend may include a key access annotation. For example, as shown, a get request submitted by the user includes a key access annotation. A key access annotation may include information necessary for the enforcement of policy by one or more components of the environment 2900. The key access annotation may include or otherwise be provided with an electronic signature generated using a key. The key used to generate the signature may be a key shared between the user and a component of the environment 2900 enforcing policy or, in some embodiments that utilize a public key digital signature scheme, the key may be a private key of the user, thereby rendering the signature verifiable using a corresponding public key. A component of the environment 2900 enforcing policy may use the electronic signature to verify the authenticity of the information in the key access annotation and may use the information in the key access annotation to determine whether policy allows the request to be filled.

As illustrated in FIG. 29, any of several components of the environment 2900 may receive the key access annotation and use the key access annotation for enforcement in policy. For example, the data service frontend may pass the key access annotation to the internal cryptography service along with ciphertext and authorization proof, which may be used as described above. The internal cryptography service may use the key access annotation to verify policy on a key managed by the internal cryptography service. In some embodiments, the key access annotation includes information identifying another service, such as the external cryptography service. The internal cryptography service may, upon detecting the information identifying the external cryptography service, provide the key access annotation to the external cryptography service, which may be one of multiple cryptography or other services that uses the key access annotation, although such other services are not illustrated in FIG. 29.

Figure 30:
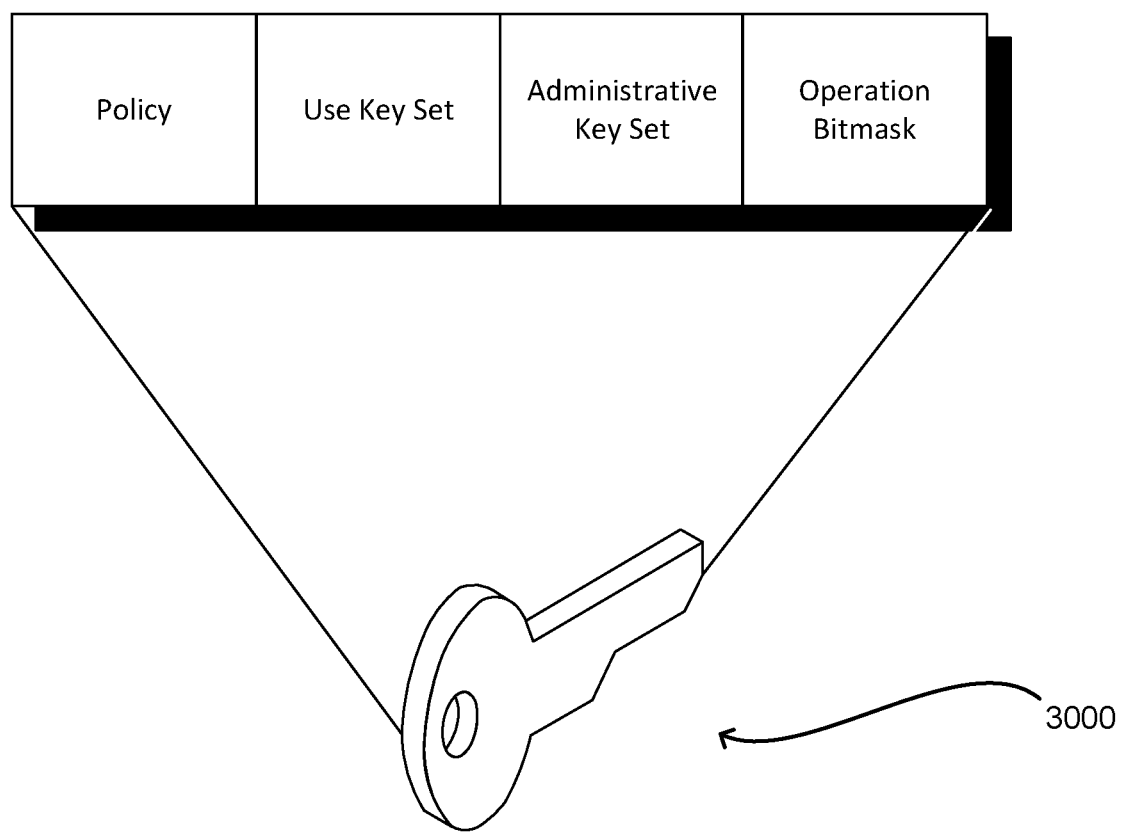
FIG. 30 shows a diagrammatic representation of information that may be associated with a key in accordance with at least one embodiment.

As discussed above, keys managed in accordance with the various embodiments may be associated with policies that encode restrictions and/or privileges of the keys' use. Other information relevant to policy enforcement may also be associated with such keys, in accordance with the various embodiments. FIG. 30 shows an illustrative example of a key 3000 (such as a key managed by a cryptography service, as described above) and example information that may be maintained (e.g., by a cryptography service) in association with the key 3000. As illustrated, policy information encoding one or more policies for the key 3000 is maintained in association with the key 3000, such as described above. In an embodiment, sets of keys are also maintained in association (e.g., associated with the key 3000 by a database or other data storage system) with the key 3000. The association may be maintained in any suitable manner. For example, a relational table or other mechanism may directly relate the key 3000 with keys in the sets of keys. As another example, a relational table or other mechanism may relate the key 3000 with identifiers of and/or references to the keys in the sets associated with the key 3000.

For instance, in some embodiments, one or more keys from a use key set and one or more keys from an administrative key set are maintained in association with the key 3000. In an embodiment, a cryptography service is configured such that keys in the use key set, in some embodiments, are necessary for at least some requests to be fulfilled. In particular, in some embodiments, for a request to perform an operation using a key identified by a KeyID, fulfillment of the request may require, possibly among other things, a key access annotation to be electronically (i.e., digitally) signed by a key corresponding to a key in the use key set (e.g., any key in the use key set or a key in the use key set specified by or otherwise in connection with the key access annotation). If such a signature is not present, a request may be denied. The key corresponding to a key in the use key set may be a key in the use key set or a reference thereto, or may be a private key corresponding to a public key in the use key set (where the public key and private key are used in a public key digital signature scheme).

In an embodiment, keys in the administrative key set are used for the purpose of modifying the sets of keys associated with the key 3000. For example, in some embodiments, for a request to modify either the use key set or the administrative key set (or both) to be fulfilled, an electronic signature using a key corresponding to a key in the administrative key set may be required. Modification may include adding a key to a key set, removing a key from a key set, replacing a key in a key set with another key, reassociating a key in the key set with another entity, and/or other modifications. In other words, proof of access to an administrative key is required to modify the use key set and/or the administrative key set. Administrative keys may also be used in a similar way for other purposes, such as for modifications of policy applicable to the key 3000 and/or other administrative actions. As illustrated in FIG. 30, the key 3000 may also be associated with an operation bitmask. The information bitmask may be information that encodes a set of operations for which the key 3000 may be used, although such information may be encoded by policy.

Use of various key sets in association with a key managed by a security module provides numerous technical advantages. For example, referring to FIG. 30, if a key in a key set associated with the key 3000 is compromised, the key set can be modified to protect against data insecurity without having to change the key 3000. As another example, third-party keys can be used so that no single entity has access to both ciphertext and keys needed to decrypt ciphertext so that collusion between entities is required to access plaintext.

Figure 31:
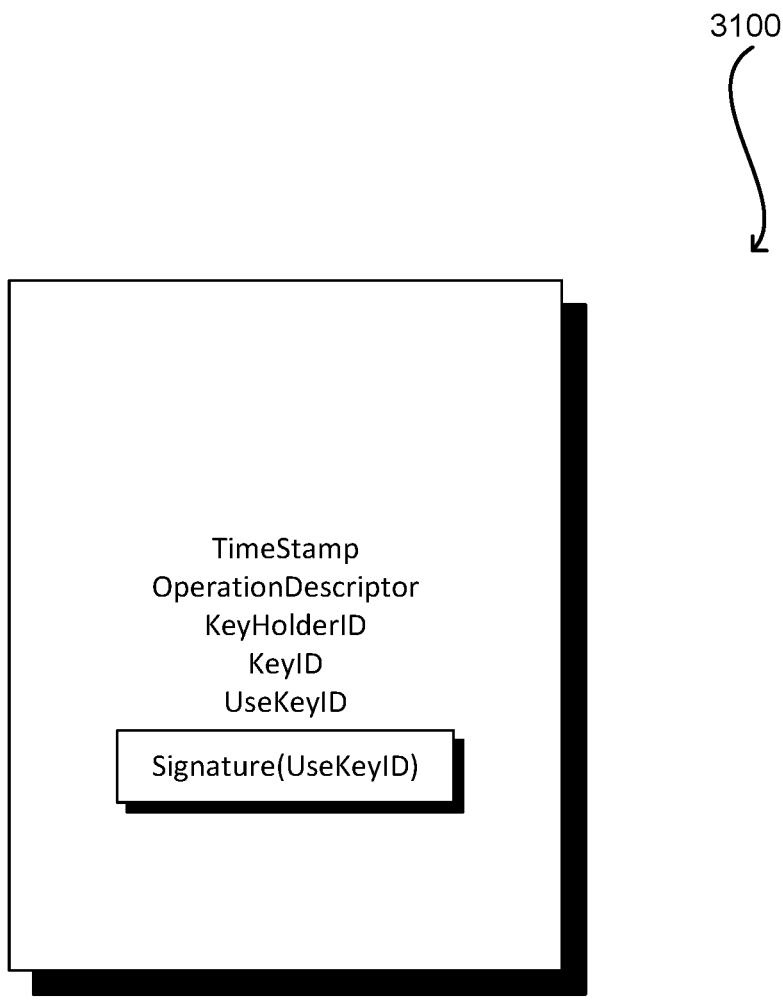
FIG. 31 shows a diagrammatic representation of a key access annotation that may be included in connection with a request, in accordance with at least one embodiment.

FIG. 31 shows an illustrative representation of an example key access annotation 3100, in accordance with an embodiment. In FIG. 30, the key access annotation 3100 includes information relevant to the enforcement of policy in connection with a request for which the key access annotation is included. In this example, the key access annotation includes a time stamp (TimeStamp), and operation descriptor (OperationDescriptor), key holder identifier (KeyHolderID), a KeyID, and an identifier of a key from a use key set or an administrative key set, although less or more information may be included.

In an embodiment, information in the key access annotation 3100 is used to determine whether a request can be fulfilled. In particular, in some embodiments, information in the key access annotation 3100 must satisfy one or more conditions (in addition to the requisite electronic signature being present) for the request to be fulfilled. For example, in some embodiments, the time stamp must indicate a time that is within some threshold amount of time of when the request is received. As another example, the key access annotation must be within an operation count window, must authorize a particular operation in connection with a particular piece of data, or must otherwise satisfy one or more conditions enforced by an entity that has received the key access annotation.

The KeyHolderID may enable a federated key management in accordance with various embodiments of the present disclosure. Referring to FIG. 29, for example, the KeyHolderID may be information that identifies or otherwise enables identification of a key specified by the KeyID. The KeyHolderID may be, for instance, a uniform resource locator (URL), Internet Protocol (IP) address, or other information that enables use of the KeyHolderID to provide the key access annotation (e.g., by forwarding a request including the annotation) to a corresponding entity. In some embodiments, the KeyHolderID is encoded in the KeyID so that a receiver of a request can extract the KeyHolderID and, if appropriate, forward the request to an appropriate third party. The internal cryptography service of the environment 2900 may, for instance, be configured to detect whether the KeyHolderID of a request specifies a different entity and, upon detection of the KeyHolderID specifying a different entity, forward the request (or other information based at least in part on the request) to the different entity, which may be an external cryptography service, such as described above (e.g., a cryptography service of a different computing resource provider). The different entity may utilize various embodiments of the present disclosure to determine whether to respond to the request and, if applicable, provide a response to the request, which may be provided through the cryptography service. If the key access annotation lacks a KeyHolderID (or the KeyHolderID specifies the internal cryptography service), the internal cryptography service may fulfill the request itself, assuming compliance with policy and other prerequisites for request fulfillment.

Figure 32:
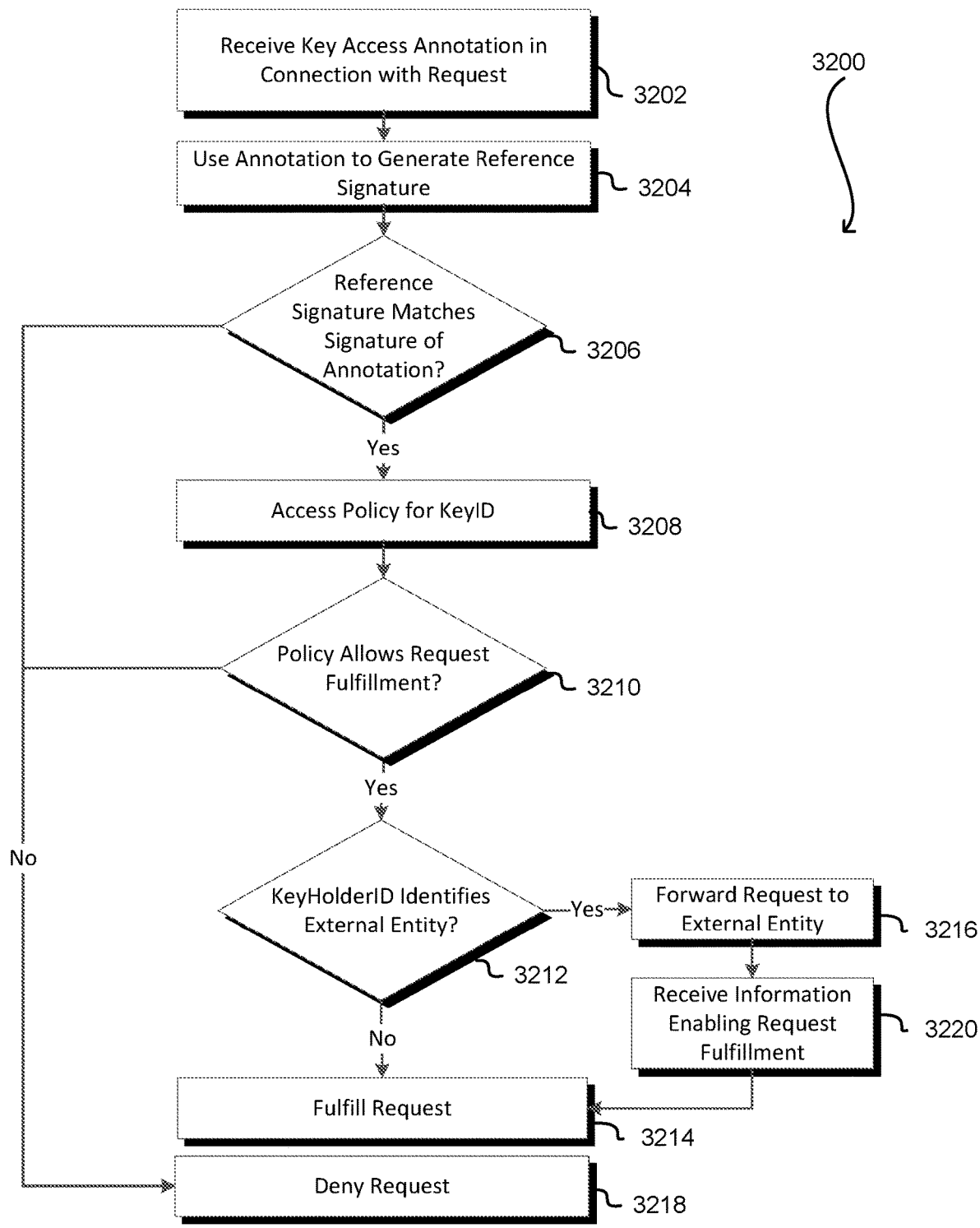
FIG. 32 shows an illustrative example of a process for processing requests, in accordance with at least one embodiment.

FIG. 32 shows an illustrative example of a process 3200 which may be used to enforce policy in connection with requests submitted in connection with key access annotations, such as described above. The process 3200 may be performed by any suitable device, such as a device of a cryptography service involved in request processing (e.g., a device implementing a frontend API for the cryptography service). The cryptography service may be an internal or external cryptography service, such as described above.

In an embodiment, the process 3200 includes receiving 3202 a key access annotation in connection with a request. The key access annotation may be an annotation included with the request, or may be received in other ways. For example, a request with the key access annotation may be processed and, as part of processing, the key access annotation may be provided to a device performing the process 3200 (or a variation thereof). Once the key access annotation is received, in an embodiment, the process 3200 includes using 3204 the annotation to generate a reference signature, such as described above. A determination may be made 3206 whether the reference signature matches the signature of the annotation. It should be noted that, in alternate embodiments, the process 3200 includes providing the key access annotation to a security module with information that enables the security module to generate the reference signature and check if the reference signature matches the signature of the key access annotation. In other words, determining whether the signature of the key access annotation is valid may be performed by obtaining such a determination from a security module.

If determined 3206 that the reference signature matches the signature of the annotation, the process 3200 may include accessing 3208 any policy associated with a KeyID specified in the request. Assuming that policy exists for the KeyID, the process 3200 includes determining 3210 whether the accessed policy allows fulfillment of the request. If determined 3210 that policy allows fulfillment of the request, the process 3200 may include determining 3212 whether a KeyHolderID (such as described above) identifies an external entity. Determining 3212 whether a KeyHolderID identifies an external entity may be performed in various ways in accordance with the various embodiments. For example, the absence of a KeyHolderID in the key access annotation may indicate a negative determination whereas the presence of a KeyHolderID in the key access annotation may indicate a positive determination. As another example, the KeyHolderID may be a required value that either indicates an internal entity (e.g., internal cryptography service) or external entity (e.g., external cryptography service).

If it is determined 3212 that a KeyHolderID does not identify an external entity, the process 3200 may include fulfilling 3214 the request, such as described above. If, however, it is determined 3212 that a KeyHolderID does identify an external entity, the process 3200 may include forwarding 3216 the request to the identified external entity and receiving 3216, in response, information enabling request fulfillment. The information may be, for example, plaintext obtained by decrypting ciphertext by the external entity and/or information based at least in part on a cryptographic operation performed by the external entity. While not illustrated, other information may also be received in addition or as an alternative. For example, if the external entity independently determines not to allow fulfillment of the request (e.g., because policy enforced by the external entity does not allow the request to be fulfilled), information indicating a denial 3218 may be provided. Assuming that the information enabling request fulfillment is received 3216, the process may include fulfilling 3214 the request, such as described above. For instance, the received information enabling request fulfillment may be provided to the requestor.

Variations in addition to those explicitly described above are also considered as being within the scope of the present disclosure. For example, FIG. 32 illustrates, for a request, verifying an electronic signature and policy and subsequent forwarding of the request (or information based at least in part thereon) to an external entity. As with all processes illustrated herein, the order of operations may vary. For instance, the process 3200 may be modified such that the request is forwarded before any signature and/or policy verification takes place. The external entity may perform signature and/or policy verification in addition to or instead of a system performing the process 3200. For example, in some embodiments, a system performing operations of the process 3200 does not perform signature and/or policy verification, but leaves such verification to the external entity. In other embodiments, a system performing operations of the process 3200 performs signature and/or policy verification and the external entity performs additional signature and/or policy verification. The external entity may, for instance, have a different key and/or different policies in place that are checked before a request is fulfilled.

Embodiments of the present disclosure also utilize techniques that provide enhanced data security. For example, despite best efforts, security breaches often occur in connection with various systems. To mitigate the effects of such breaches, various embodiments of the present disclosure allow for request processing in a manner that provides time to detect breaches and respond accordingly. For example, in some embodiments, decryption of encrypted data and/or access to data that has been decrypted requires a delay. The delay may be required, for instance, by a system's configuration or by a policy enforced by the system where the policy is configured in accordance with the various embodiments described herein). Such delays may be useful, for example, in circumstances where quick access to encrypted data is unnecessary, such as where regulatory or other requirements require that certain data be archived, but not necessarily that the data be immediately available.

Figure 33:
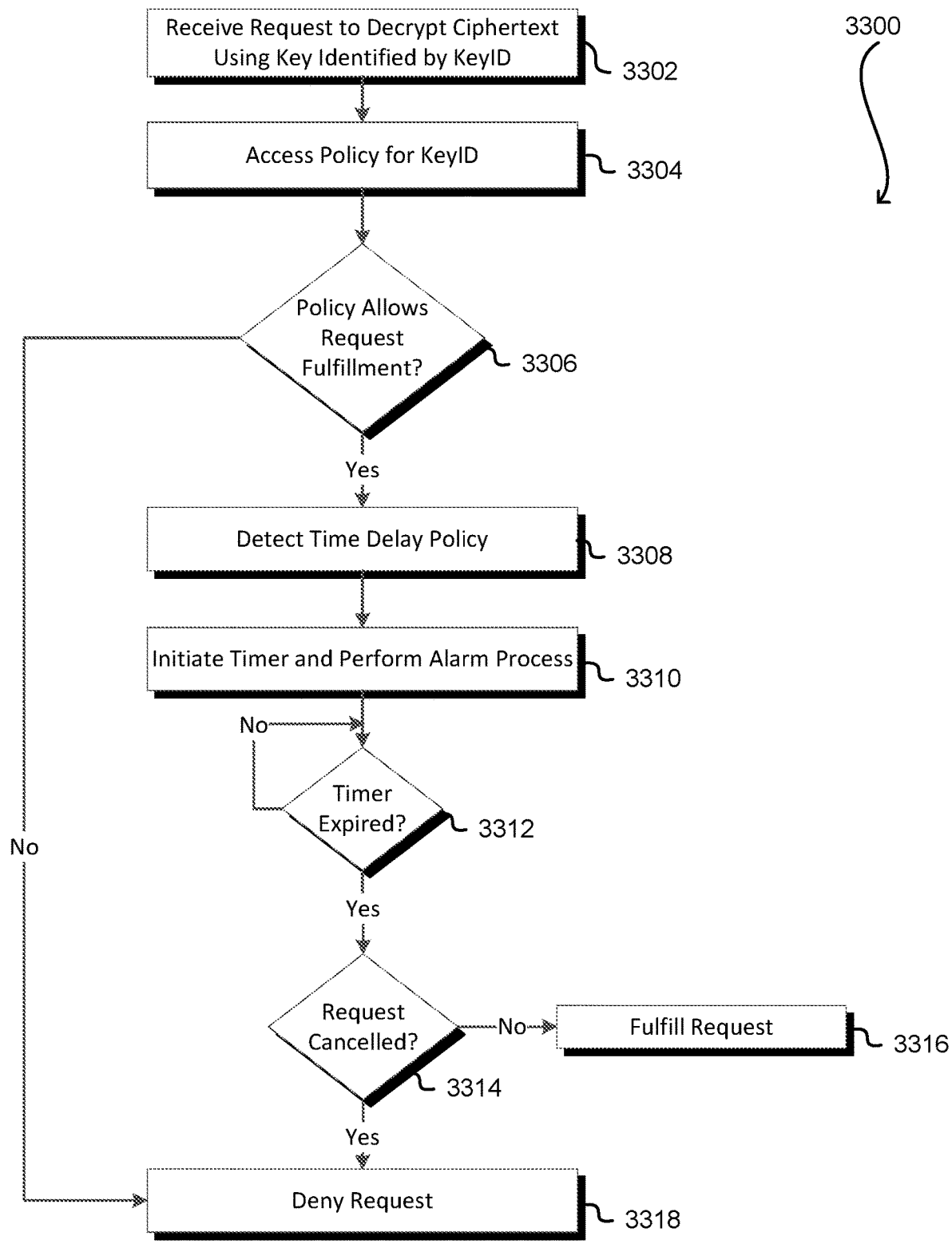
FIG. 33 shows an illustrative example of a process for processing requests, in accordance with at least one embodiment.

FIG. 33 shows an illustrative example of a process 3300 for providing such a delay in accordance with various embodiments. The process 3300 may be performed by a cryptography service, such as an internal or external cryptography service, such as described above. In an embodiment, the process 3300 includes receiving 3302 a request to decrypt ciphertext using a key identified by a KeyID. The request may be received in any suitable manner. For example, the request may be received from a user or from a data service, such as described above. In an embodiment, policy associated with the KeyID is accessed 3304. It should be noted, however, that policy may be enforced automatically in some embodiments and, as a result, policy may not be accessed in some implementations. With respect to the embodiment illustrated in FIG. 33, the process 3300 includes determining 3306 whether policy allows request fulfillment. The determination 3306 whether the policy allows request fulfillment may be performed in any suitable manner, such as described above.

If determined 3306 that the accessed policy allows fulfillment of the request, the process 3300 may include detection 3308 of a time delay policy among one or more of the accessed policies. As noted above, however, in some embodiments, time delay may be automatic and, as a result, detection of such a policy may not occur. The process 3300 may include initiating 3310 a timer and performing an alarm process. The timer may be a timer for a determined amount of time, which, in some embodiments, is a configurable amount that may be, for instance, configured as part of a time delay policy. The timer may also be predetermined into system configuration settings for a system performing the process 3300. The alarm process may include execution of a workflow configured to cause the performance of various alarm actions. The alarm actions may include, for example, causing a notification system (such as described above) to transmit one or more messages to one or more individuals or systems. For example, a compliance officer of an organization associated with the encrypted data may be notified. As another example, an alarm action may comprise causing an auditing system to perform enhanced auditing where, for example, more information is collected in connection with various accesses to the system. In some embodiments, alarm actions may also include alarm signaling which may include audible and/or visual indications of the alarm. Other alarm actions are considered as being within the scope of the present disclosure.

Upon initiation of the timer, the process 3300 may include performing checks 3312 whether the timer has expired until a determination is made 3312 that the timer has, in fact, expired. In some embodiments, the request may be cancelled before its fulfillment. Cancelling the request may require less stringent requirements than the request to decrypt the information. For example, in some embodiments, the request may be cancelled trivially by anybody with access to the system. As another example, an alarm action may include transmission of a message including a hyperlink that, when selected, causes a request to cancel the request to be cancelled, in some embodiments, without authentication by the receiver of the message. Other methods of enabling the request to be cancelled may also be used. Accordingly, in an embodiment, once the timer has expired (or at other times, such as before timer expiration) a determination may be made 3314 whether the request has been cancelled. If determined 3314 that the request has been cancelled, the process 3300 may include fulfilling 3316 the request, e.g., by using the key identified by the KeyID to decrypt the ciphertext and provide the resulting plaintext or by causing a security module to decrypt the ciphertext and provide the corresponding plaintext and then transferring the plaintext to the requestor or otherwise providing access to the plaintext. If, however, determined 3314 that the request has not been cancelled and/or if determined 3306 that the policy does not allow fulfillment of the request, the process 3300 may include denying the request 3318, such as described above.

Numerous other variations are within the scope of the present disclosure. For example, in some embodiments keys are associated with policies that specify effective dates or otherwise indicate some determined period of validity that is not indefinite. For instance, in some embodiments, a key may be associated with a policy that specifies that the key should be destroyed after a certain amount of time, on a certain date, or otherwise upon the satisfaction of one or more conditions. As an example, an organizational and/or governmental rule, law, policy or regulation may specify that data should be retained for a certain amount of time. A policy on a key used to encrypt such data (e.g., a key used in a cipher to encrypt the data or a key used in a cipher to encrypt another key under which the data is encrypted) may specify that the key should be destroyed (i.e., caused to be irrevocably inaccessible to anyone) upon passage of a required amount of time. A cryptography service or other system may detect passage of the required amount of time and destroy the key accordingly. The cryptography service may detect the passage of the required amount of time in many ways. For example, in some embodiments, the cryptography service maintains a database having stored therein information indicating times for key destruction. A periodic process executed by the cryptography service may destroy keys indicated in the database as destructible.

Policy effective dates may also be used in other ways. For example, time delays enforced for decryption of data may change as time passes. For instance, as data encrypted under a key ages, the time delay that is enforced for decrypting the data may decrease. As another example, principals may have privileges to have cryptographic operations performed using a key only for a specified period of time, which may be renewable through an API of the cryptography service. In this manner, the ability for individuals to cause cryptographic operations to be performed in connection with a key may expire automatically.

In some embodiments, requests may be made for other purposes in addition to or as an alternative to requests to decrypt ciphertext. For example, the various techniques described above may be adapted for various types of policy enforcement. For instance, policies utilized in connection with various embodiments of the present disclosure may utilize effective times for policies. A policy update may have an effective time that indicates a point in the future when the policy update become effective in a system enforcing the policy. An existing policy may require that some or all policy changes are allowable under particular conditions, one of which is that a policy update have an effective time that is a specified amount of time into the future (e.g., 48 hours). A request may be made to change a policy to allow for the retrieval of data, which may involve decryption of the data. The request may, for example, be a request to weaken conditions required to be satisfied before the data may be retrieved. The request may specify an effective time for the policy change. A system enforcing policy in connection with the principals to which the policy applies may approve or deny the request based at least in part on whether the effective time is in compliance with existing policy. If the system approves the policy change, the system may initiate a timer (which may be based at least in part on the effective time) and perform an alarm process, such as described above. Further, policy change may be cancellable until the request is fulfilled, such as described above. In this manner, interested parties may be provided notice and opportunity to prevent unauthorized access to data.

Other variations are also considered as being within the scope of the present disclosure. For instance, in some embodiments, a data storage system may have an inherent latency for request processing that is sufficient for providing time to cancel requests and/or otherwise protect against potential security breaches. For instance, an archival data storage system may utilize asynchronous request processing where data responsive to a request may be available hours after the request is submitted. Further, data responsive to requests may be available after different amounts of time, which may depend on factors such as system. With such systems, a timer may be unnecessary due to the inherent latency.

Figure 34:
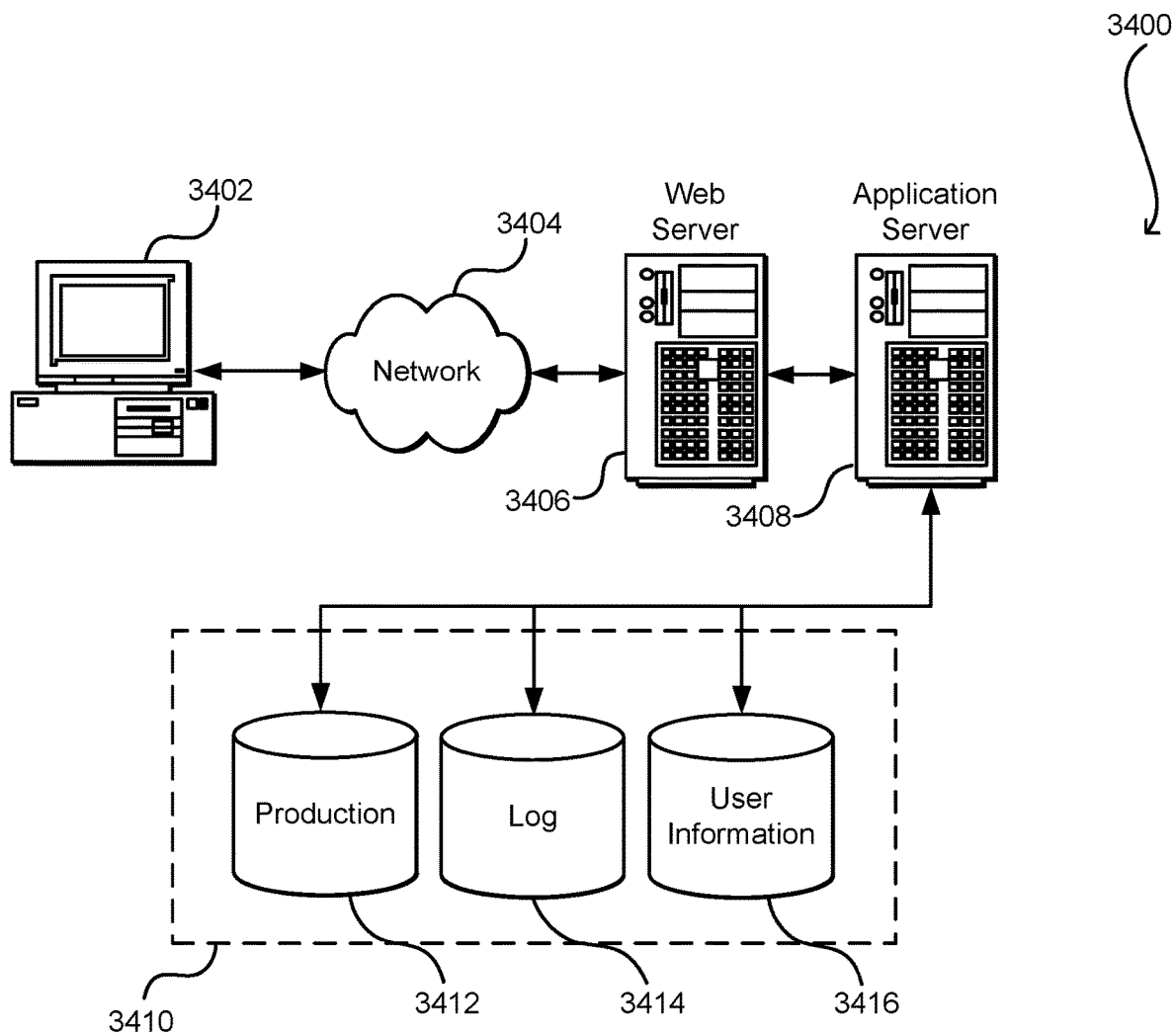
FIG. 34 illustrates an environment in which various embodiments can be implemented.

FIG. 34 illustrates aspects of an example environment 3400 for implementing aspects in accordance with various embodiments. As will be appreciated, although a Web-based environment is used for purposes of explanation, different environments may be used, as appropriate, to implement various embodiments. The environment includes an electronic client device 3402, which can include any appropriate device operable to send and receive requests, messages or information over an appropriate network 3404 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 3406 for receiving requests and serving content in response thereto, although for other networks an alternative device serving a similar purpose could be used as would be apparent to one of ordinary skill in the art.

The illustrative environment includes at least one application server 3408 and a data store 3410. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 3402 and the application server 3408, can be handled by the Web server. It should be understood that the Web and application servers are not required and are merely example components, as structured code discussed herein can be executed on any appropriate device or host machine as discussed elsewhere herein.

The data store 3410 can include several separate data tables, databases or other data storage mechanisms and media for storing data relating to a particular aspect. For example, the data store illustrated includes mechanisms for storing production data 3412 and user information 3416, which can be used to serve content for the production side. The data store also is shown to include a mechanism for storing log data 3414, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 3410. The data store 3410 is operable, through logic associated therewith, to receive instructions from the application server 3408 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 3402. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein. In some embodiments, an operating system may be configured in accordance with or validated under one or more validation regimes such as Evaluation Assurance Level (EAL) level 4.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 34. Thus, the depiction of the system 3400 in FIG. 34 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially available models and protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc. Various embodiments of the present disclosure may also be implemented using custom hardware including, but not limited, custom cryptographic processors, smart cards, and/or hardware security modules.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system comprising:
   one or more processors; and
   memory including instructions that, as a result of being executed by the one or more processors, cause the system to:
     in response to a first request:
       associate a key stored in an external cryptography service with a policy associated with the system; and
       cause the external cryptography service to automatically generate a plurality of versions of the key by at least performing a key rotation;
     receive a second request to obtain access to the key to perform a cryptographic operation, the second request comprising an indication of a version of the plurality of versions of the key; and
     cause the external cryptography service to:
       make a determination that the system has access to the key based at least in part on the policy; and
       provide the access to the key based at least in part on the determination and the indication.

2. The system of claim 1, wherein:
   the key is a master key that is usable to decrypt a second key; and
   the second key is associated with an entity that transmitted the second request.

3. The system of claim 1, wherein the second request comprises a KeyId that indicates the key.

4. The system of claim 1, wherein the cryptographic operation comprises creating a digital signature using the key.

5. The system of claim 1, wherein the external cryptography service comprises a Hardware Security Module (HSM) to store the key.

6. The system of claim 1, wherein the cryptographic operation is performed using Advanced Encryption Standard (AES).

7. A computer-implemented method, comprising:
   receiving, from an entity, a first request to associate a key stored in an external cryptography service with a policy and to cause the external cryptography service to generate a plurality of versions of the key by at least performing a key rotation;

receiving, from the entity, a second request to access the key to perform a cryptographic operation, the second request comprising a selection of a version of the plurality of versions; and causing the external cryptography service to provide access to the key to the entity based at least in part on a determination that the entity has access to the key in accordance with the policy and the selection.

8. The computer-implemented method of claim 7, wherein:

the key is a first key;

the cryptographic operation comprises decrypting a second key using the first key; and the second key is associated with the entity.

9. The computer-implemented method of claim 7, wherein the external cryptography service includes one or more Hardware Security Modules (HSMs) to store a plurality of keys that include the key.

10. The computer-implemented method of claim 7, wherein the cryptographic operation is performed using Advanced Encryption Standard (AES).

11. The computer-implemented method of claim 7, wherein:

the key is a first key;

the cryptographic operation comprises generating a second key based at least in part on the first key; and the second key is usable by the entity.

12. The computer-implemented method of claim 7, further comprising causing the external cryptography service to rotate the key.

13. The computer-implemented method of claim 7, wherein the second request comprises a key identifier that indicates the key.

14. A non-transitory computer-readable medium storing thereon executable instructions that, as a result of being executed by one or more processors of a computer system, cause the computer system to:

create a policy that corresponds to a key that is stored in an external cryptography service;

cause the external cryptography service to perform a key rotation to generate two or more versions of the key; and in response to a request to use the key to perform one or more cryptographic operations, cause the external cryptography service to:

make a determination, based at least in part on the policy, that the computer system has access to the key; and provide, to the computer system, access to the key based at least in part on the determination and a version of the two or more versions of the key indicated by the request.

15. The non-transitory computer-readable medium of claim 14, wherein the one or more cryptographic operations include creating a digital signature using the key.

16. The non-transitory computer-readable medium of claim 14, wherein the one or more cryptographic operations are performed using Advanced Encryption Standard (AES).

17. The non-transitory computer-readable medium of claim 14, wherein the request includes a key identifier that indicates the key.

18. The non-transitory computer-readable medium of claim 14, wherein:

the one or more cryptographic operations include at least generating an additional key based at least in part on the key; and the additional key is usable by an entity that transmitted the request.

19. The non-transitory computer-readable medium of claim 14, wherein the external cryptography service comprises a Hardware Security Module (HSM) to store the key.

20. The non-transitory computer-readable medium of claim 14, wherein the key is a master key that is usable to decrypt a second key that is associated with an entity that transmitted the request.

* * * * *